United States Patent
Ehrlich

(10) Patent No.: US 11,862,196 B1
(45) Date of Patent: Jan. 2, 2024

(54) SPLIT-ACTUATOR DRIVE THAT COORDINATES FRACTIONAL-WEDGE TIMING OF AGGRESSOR AND VICTIM FOR EFFECTIVE VICTIM FEEDFORWARD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Richard M. Ehrlich, Saratoga, CA (US)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/878,838

(22) Filed: Aug. 1, 2022

(51) Int. Cl.
G11B 21/10 (2006.01)

(52) U.S. Cl.
CPC .................. G11B 21/106 (2013.01)

(58) Field of Classification Search
None
See application file for complete search history.

(56) References Cited

U.S. PATENT DOCUMENTS

| | | | |
|---|---|---|---|
| 6,067,206 A * | 5/2000 | Hull | G11B 5/59688 360/77.02 |
| 6,493,172 B1 | 12/2002 | Morris et al. | |
| 6,538,839 B1 * | 3/2003 | Ryan | G11B 5/59694 360/77.02 |
| 7,450,336 B1 * | 11/2008 | Wang | G11B 5/59627 360/78.04 |
| 8,477,444 B1 * | 7/2013 | Zou | G11B 5/746 360/78.09 |
| 9,934,803 B1 | 4/2018 | Semba et al. | |
| 9,953,672 B1 * | 4/2018 | Szita | G11B 5/5547 |
| 11,189,309 B1 * | 11/2021 | Ehrlich | G11B 5/553 |
| 2004/0246833 A1 * | 12/2004 | Ehrlich | G11B 5/5582 369/47.36 |
| 2018/0114540 A1 * | 4/2018 | Szita | G11B 5/5547 |
| 2021/0366512 A1 * | 11/2021 | Calfee | G11B 5/5547 |

* cited by examiner

Primary Examiner — Peter Vincent Agustin
(74) Attorney, Agent, or Firm — Kim & Stewart LLP

(57) ABSTRACT

A method reduces the effect of accelerating/decelerating an "aggressor actuator" in a multi-actuator drive on a "victim actuator" in the drive. Measurements of fractional-wedge timing-offsets for an aggressor head are used to adjust the aggressor actuator commands that are inputted to a victim disturbance feedforward signal generator when a timing offset exists between the currently-used aggressor head and the aggressor head that was used to measure transfer functions for determining victim feedforward signals. When such a timing offset is equivalent to a specific fraction of the time period separating servo wedges, values of the aggressor actuator commands that are inputted to the victim disturbance feedforward signal generator may be modified based on the specific fraction. Feedforward signals may be modified when a timing offset exists between and the current timing of the currently-used victim head and an original timing of the currently-used victim head.

20 Claims, 22 Drawing Sheets

774

| VCM Command Entries 801 | Servo Wedge Number 802 |
|---|---|
| +25 | 103 |
| +18 | 104 |
| -11 | 105 |
| +10 | 106 |
| -6 | 107 |
| +15 | 108 |
| -16 | 109 |
| +12 | 110 |
| +11 | 111 |
| -23 | 112 |
| +12 | 113 |
| ⋮ | ⋮ |

| VCM Command Entries 801 | VCM Command Entries 801 | Servo Wedge Number 802 |
|---|---|---|
| +25 | +22 | 103 |
| +18 | +16 | 104 |
| -11 | -12 | 105 |
| +10 | +10 | 106 |
| -6 | -5 | 107 |
| +15 | +17 | 108 |
| -16 | -18 | 109 |
| +12 | +14 | 110 |
| +11 | +13 | 111 |
| -23 | -28 | 112 |
| +12 | +14 | 113 |
| ⋮ | ⋮ | ⋮ |

| VCM Command Entries 851 | Servo Wedge Number 852 |
|---|---|
| +25 | 103 |
| +18 | 104 |
| +12 | 105 |
| ⋮ | ⋮ |

| Victim Feedforward Entries 901 | Servo Wedge Number 902 |
|---|---|
| -32 | 103 |
| -28 | 104 |
| -22 | 105 |
| -17 | 106 |
| -9 | 107 |
| -5 | 108 |
| +10 | 109 |
| +2 | 110 |
| -1 | 111 |
| -17 | 112 |
| -19 | 113 |
| ⋮ | ⋮ |

FIG. 9

SPLIT-ACTUATOR DRIVE THAT COORDINATES FRACTIONAL-WEDGE TIMING OF AGGRESSOR AND VICTIM FOR EFFECTIVE VICTIM FEEDFORWARD

BACKGROUND

Magnetic hard disk drives (HDDs) have been employed in information technology as a low-cost means for providing random access to large quantities of data. As the need for data storage has expanded, the areal density of information stored in HDDs has continuously increased. In addition to high storage capacity, the ability of an HDD to access stored data quickly is also important. To meet the ever-increasing requirements for high access performance and faster throughput, HDDs have been configured with multiple rotary actuators and associated read/write channels that are designed to operate simultaneously. Thus, each rotary actuator enables the independent positioning of one or more magnetic heads for reading and writing data, thereby greatly increasing the throughput of such HDDs.

One drawback to the use of independent rotary actuators is that the mechanical interaction between such actuators can affect positioning accuracy of the magnetic heads when both actuators are in motion. For example, when one actuator is seeking to a targeted data track, the high accelerations and changes in acceleration of the actuator can generate vibrations which will significantly affect the positioning accuracy of the other actuator while the other actuator is track following. To reduce the effect of one actuator in a multi-actuator drive (the so-called "aggressor actuator") on the positioning accuracy of another actuator in the multi-actuator drive (the so-called "victim actuator"), a victim feedforward signal is added to a microactuator control signal of the victim actuator in response to a voice-coil motor (VCM) control signal that is asserted by the aggressor actuator. This victim feedforward signal is configured to compensate for disturbances in the radial position of a victim head caused by assertion of the aggressor VCM control signal.

Generally, a suitable victim feedforward signal can be generated based on a transfer function that models the feedforward signal for the victim actuator as a function of a control signal asserted by the aggressor actuator. During manufacture, such a transfer function can be determined for each head of an HDD by injecting known disturbances into a control signal for the aggressor actuator and measuring changes to the radial position of the victim head as the response. Such transfer functions are based on the assumption that the difference in timing between a victim head and an aggressor head crossing a particular point on a disk is relatively small and remains unchanged. In practice, the servo information on each disk of an HDD is not perfectly aligned with the servo information on each other disk of the HDD. Therefore, the time at which each head of the HDD crosses a particular point on the associated disk can vary slightly. Further, over the life of an HDD, mechanical shocks, changes in temperature, changes in the relative position of the disks, and changes in the relative positions of the heads can result in further drift in timing between the various heads of the HDD. As a result, transfer functions for determining victim feedforward signals can become increasingly inaccurate, and disturbances caused by aggressor actuator acceleration and deceleration are more likely to affect victim head position. Consequently, there is a need in the art for better reducing the effect of movements of one actuator in a multi-actuator drive on the positioning accuracy of another actuator in the multi-actuator drive.

SUMMARY

One or more embodiments provide systems and methods for reducing or compensating for the effect of accelerating/decelerating an "aggressor actuator" in a multi-actuator drive on a "victim actuator" in the drive. Specifically, measurements of fractional-wedge timing-offsets for an aggressor head are used to adjust the aggressor actuator commands that are inputted to a victim disturbance feedforward signal generator when a timing offset exists between the currently-used aggressor head and the aggressor head that was used to measure transfer functions for determining victim feedforward signals. When such a timing offset is equivalent to a specific fraction of the time period separating servo wedges, values of the aggressor actuator commands that are inputted to the victim disturbance feedforward signal generator are modified based on the specific fraction. Additionally or alternatively, in some embodiments, feedforward signals generated by the victim disturbance feedforward signal generator are modified when a timing offset exists between and the current timing of the currently-used victim head and an original timing of the currently-used victim head, where the original timing was used to measure transfer functions for determining victim feedforward signals. When such a timing offset is equivalent to a specific fraction of the time period separating servo wedges, values of feedforward signals generated by the victim disturbance feedforward signal generator are modified based on the specific fraction. Additionally or alternatively, in some embodiments, timing offsets between aggressor heads and victim heads are measured for drift throughout the lifetime of the HDD. In such embodiments, values of the aggressor actuator commands that are inputted to the victim disturbance feedforward signal generator are modified based on the newly measured timing offsets and/or feedforward signals generated by the victim disturbance feedforward signal generator are modified based on the newly measured timing offsets.

According to an embodiment, a computer-implemented method of controlling magnetic head position in a disk drive that includes a first head for accessing a first recording surface and a second head for accessing a second recording surface includes: determining first and second control signals that each cause a first actuator to position the first head relative to the first recording surface, wherein the first control signal is based on a first position signal generated by the first head passing over a first servo wedge disposed on the first recording surface and the second control signal is based on a second position signal generated by the first head passing over a second servo wedge disposed on the first recording surface; determining a feedforward value that modifies a third control signal that is determined based on a third position signal, wherein the third position signal is generated by the second head passing over a third servo wedge disposed on the second recording surface and the third control signal causes a second actuator that is coupled to the second head to position the second head relative to the second recording surface; determining that the third position signal is generated by the second head passing over the third servo wedge; and modifying the third control signal with the feedforward value in response to the second head passing over the third servo wedge, wherein the feedforward value is generated based on the first and second control signals.

According to an embodiment, a disk drive includes a first head for accessing a first recording surface of the disk drive and a second head for accessing a second recording surface of the disk drive and a controller. The controller is configured to perform the steps of.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

FIG. 8A schematically illustrates an aggressor VCM command buffer, according to an embodiment.

FIG. 8B schematically illustrates an aggressor VCM command buffer, according to another embodiment.

FIG. 8C schematically illustrates a recent aggressor VCM command buffer, according to an embodiment.

FIG. 9 schematically illustrates a victim feedforward value buffer, according to an embodiment.

For clarity, identical reference numbers have been used, where applicable, to designate identical elements that are common between figures. It is contemplated that features of one embodiment may be incorporated in other embodiments without further recitation.

DETAILED DESCRIPTION

System Overview

Figure 1:
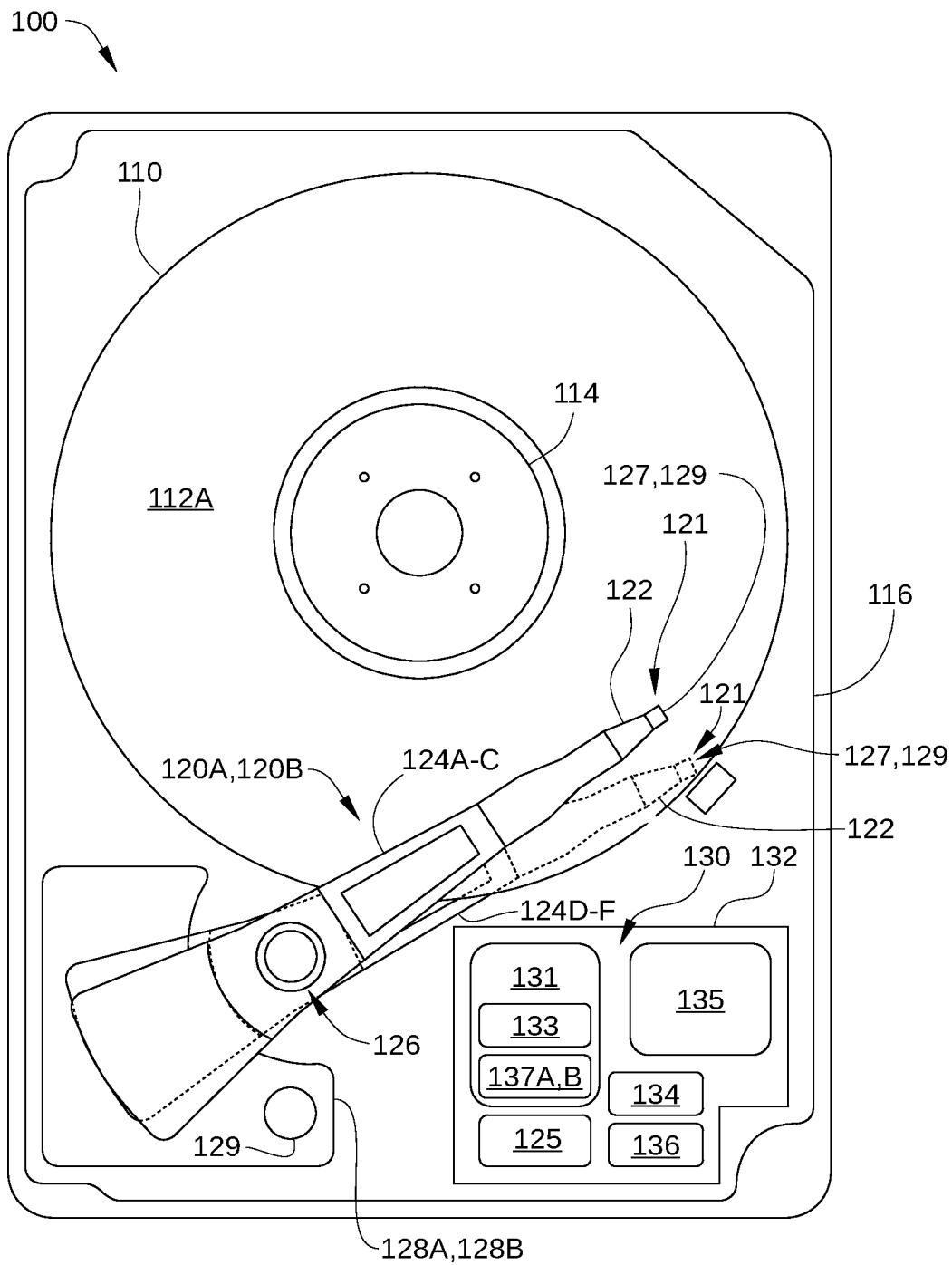
FIG. 1 is a schematic view of an exemplary hard disk drive (HDD), according to an embodiment.

FIG. 1 is a schematic view of an exemplary hard disk drive (HDD) 100, according to one embodiment. For clarity, HDD 100 is illustrated without a top cover. HDD 100 is a multiple actuator drive, and includes one or more storage disks 110, each including one or two recording surfaces on which a plurality of concentric data storage tracks are disposed. In FIG. 1, only the top recording surface 112A of storage disk 110 is visible. The one or more storage disks 110 are coupled to and rotated by a spindle motor 114 that is mounted on a base plate 116. Two or more actuator arm assemblies 120A and 120B are also mounted on base plate 116, and each of the assemblies includes one or more arm-mounted sliders 121 with one or more magnetic read/write heads 127 that read data from and write data to the data storage tracks of an associated recording surface, such as recording surface 112A.

One or more actuator arms 124 are included in actuator arm assembly 120A, and one or more actuator arms 124 are included in actuator arm assembly 120B. Actuator arm assembly 120A and the one or more actuator arms 124 included therein are rotated together about a bearing assembly 126 by a voice coil motor (VCM) 128A independently from actuator arm assembly 120B. Likewise, actuator arm assembly 120B and the one or more actuator arms 124 included therein are rotated together about bearing assembly 126 by a VCM 128B independently from actuator arm assembly 120A. Thus, each of VCMs 128A and 128B moves a group of the sliders 121 and read/write heads 127 radially relative to a respective recording surface of a storage disk 110 included in HDD 100, thereby providing radial positioning of a corresponding read/write head 127 over a desired concentric data on a recording surface, for example on recording surface 112A. Spindle motor 114, the read/ write heads 127, and VCMs 128A and 128B are coupled to electronic circuits 130, which are mounted on a printed circuit board 132.

Electronic circuits 130 include read channels 137A and 137B, a microprocessor-based controller 133, random-access memory (RAM) 134 (which may be a dynamic RAM and is used as one or more data buffers) and/or a flash memory device 135, and, in some embodiments, a flash manager device 136. In some embodiments, read channels 137A and 137B and microprocessor-based controller 133 are included in a single chip, such as a system-on-chip (SoC) 131. HDD 100 further includes a motor-driver chip 125 that accepts commands from microprocessor-based controller 133 and drives spindle motor 114, and VCMs 128A and 128B and microactuators 228 and/or 229 (not shown in FIG. 1). In the embodiment illustrated in FIG. 1, HDD 100 is shown with a single motor-driver chip 125 that drives spindle motor 114 and VCMs 128A and 128B. In other embodiments, HDD 100 includes multiple motor-driver chips. In one such embodiment, for example, one motor-driver chip drives spindle motor 114, one actuator (e.g., VCM 128A), and one microactuator (e.g., microactuator 228), and the other motor-driver chip drives the other actuator (e.g., VCM 128B) and another microactuator (e.g., microactuator 229). Further, in other embodiments, any other partition of the jobs of spindle motor control, actuator control, and microactuator control can be implemented. Via a preamplifier (not shown), read/write channel 137A communicates with read/write heads 127 of actuator arm assembly 120A and read/write channel 137B communicates with read/write heads 127 of actuator arm assembly 120B. The preamplifiers are mounted on a flex-cable, which is mounted on either base plate 116, one of actuators 120A or 120B, or both.

When data are transferred to or from a particular recording surface of HDD 100, one of the actuator arm assemblies 120A or 120B moves in an arc between the inner diameter (ID) and the outer diameter (OD) of the storage disk 110. The actuator arm assembly accelerates in one angular direction when current is passed in one direction through the voice coil of the corresponding VCM and accelerates in an opposite direction when the current is reversed, thereby allowing coarse control of the radial position of the actuator arm assembly and the attached read/write head with respect to the particular storage disk 110.

Fine radial positioning of each read/write head 127 is accomplished with a respective microactuator 129. The microactuator 129 for each read/write head 127 is mechanically coupled to the actuator arm 124 that corresponds to the read/write head 127. Each microactuator 129 typically includes one or more piezoelectric elements and is configured to move a corresponding read/write head 127 radially a small distance, for example on the order of a few tens or hundreds of nanometers. When employed together, microactuators 129 and voice coil motors 128A and 128B are sometimes referred to as dual-stage actuators, where voice coil motor 128A or 128B is the prime mover and each microactuator 129 is a second-stage actuator. Dual-stage actuators enable the servo system of HDD 100 to attain more accurate tracking control.

In some embodiments, each microactuator 129 is mounted on a respective flexure arm 122, at a gimbal between the respective flexure arm 122 and the corresponding slider 121. In such embodiments, each microactuator 129 rotates the corresponding slider 121, causing radial motion (relative to corresponding recording surface) of the corresponding read/write head 127. Alternatively or additionally, in some embodiments, each microactuator 129 is mounted on an end of an actuator arm 124 or on the flexure arm, itself, and moves the flexure arm 122 through a relatively large arc, for example on the order of a hundred track widths. In yet other embodiments, each microactuator 129 includes a first piezoelectric or other movable element at the gimbal between the respective flexure arm 122 and the corresponding slider 121 and a second piezoelectric or other movable element at the end of the actuator arm 124 or on the flexure arm. In such embodiments, each read/write head 127 is provided with three-stage actuation in the radial direction.

In the embodiment illustrated in FIG. 1, only one slider 121, one flexure arm 122, one actuator arm 124, and one read/write head 127 are shown for actuator arm assembly 120A and only one slider 121, one flexure arm 122, one actuator arm 124, and one read/write head 127 are shown for actuator arm assembly 120B. In other embodiments, each of actuator arm assemblies 120A and 120B can include a plurality of actuator arms, sliders, flexure arms, and read/write heads. Further, in some embodiments, HDD 100 can include more than two actuator arm assemblies, each rotated about bearing assembly 126 by a respective VCM independently from each other. In other embodiments, additional actuators may rotate about other bearing assemblies.

Figure 2:
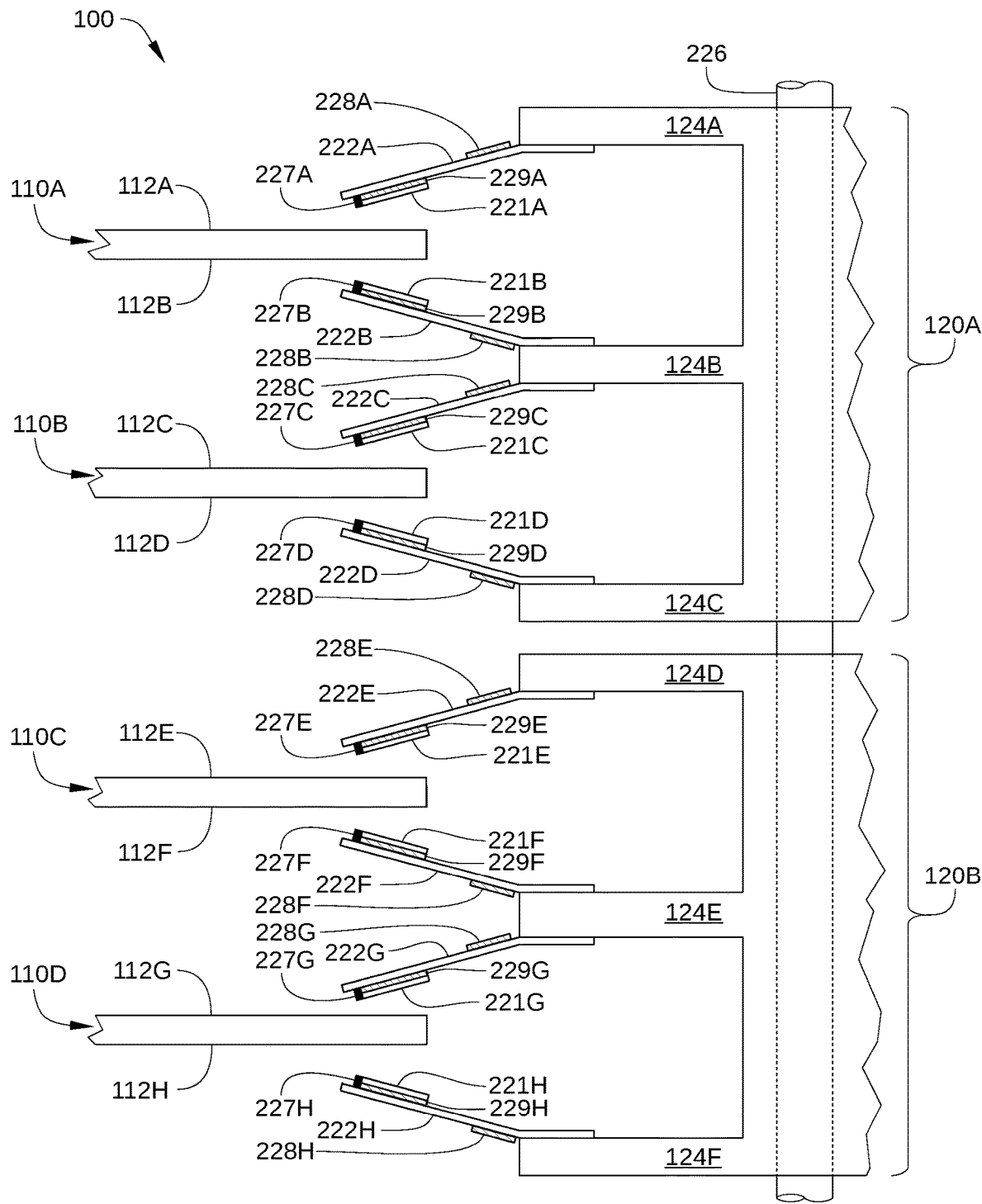
FIG. 2 schematically illustrates a partial side-view of multiple storage disks and two independent actuator arm assemblies of the HDD of FIG. 1.

FIG. 2 schematically illustrates a partial side-view of multiple storage disks 110A-110D and two independent actuator arm assemblies 120A and 120B of HDD 100, according to an embodiment. The recording surfaces of multiple storage disks 110A and 110B are each accessed by one of the read/write heads included in the independent actuator arm assembly 120A (e.g., read/write heads 227A, 227B, 227C, and 227D), and the recording surfaces of multiple storage disks 110C and 110D are each accessed by the read/write heads included in the independent actuator arm assembly 120B (e.g., read/write heads 227E, 227F, 227G, and 227H). Thus, in the embodiment illustrated in FIG. 2, HDD 100 is configured with multiple storage disks 110A-110D having a total of eight recording surfaces 112A-112H and multiple read/write heads 227A-227H, each corresponding to one of these recording surfaces. Specifically, in the embodiment illustrated in FIG. 2, HDD 100 includes: a storage disk 110A with recording surfaces 112A and 112B; a storage disk 110B with recording surfaces 112C and 112D; a storage disk 110C with recording surfaces 112E and 112F; and a storage disk 110D with recording surfaces 112G and 112H. Thus, read/write head 227A reads data from and writes data to recording surface 112A, read/write head 227B reads data from and writes data to corresponding recording surface 112B, and so on.

Read/write heads 227A-227H are disposed on sliders 221A-221H, respectively, and sliders 221A-221H (referred to collectively herein as sliders 221) are respectively coupled to actuator arms 124A-124F via flexure arms 222A-222H (referred to collectively herein as flexure arms 222) as shown. In some embodiments, each of sliders 221A-221H is mounted on a corresponding one of flexure arms 222 via a microactuator 229A-229H (referred to collectively herein as microactuators 229), such as a micro-actuator (MA) second stage that includes two lead zirconate titanate piezoelectric actuators attached to a baseplate of the corresponding flexure arm 222. Alternatively, in some embodiments, each of sliders 221A-221H is mounted directly on a corresponding one of flexure arms 222.

In the embodiment illustrated in FIG. 2, flexure arm 222A is coupled to an actuator arm 124A, flexure arms 222B and 222C are coupled to an actuator arm 124B, flexure arm 222D is coupled to an actuator arm 124C, flexure arm 222E is coupled to an actuator arm 124D, flexure arms 222F and 222G are coupled to an actuator arm 124E, and flexure arm 222H is coupled to an actuator arm 124F. Actuator arms 124A-124F are referred to collectively herein as actuator arms 124. In the embodiment illustrated in FIG. 2, each of microactuators 228A-228H (referred to collectively herein as microactuators 228) is disposed at a base of flexure arms 222A-222H, respectively, i.e., at an end of one of actuator arms 124. Alternatively or additionally, in some embodiments, microactuators 229A-229H can be disposed proximate sliders 221A-221H, respectively, i.e., at a tip of flexure arms 222A-222H, respectively. In embodiments in which microactuators 229 are disposed proximate sliders 221, each of microactuators 229 can include a gimbal microactuator. In either case, each of microactuators 229 and/or 228 compensates for perturbations in the radial position of sliders 221, so that read/write heads 227A-227H follow the proper data track on recording surfaces 112. Thus, microactuators 229 can compensate for vibrations of the disk, inertial events such as impacts to HDD 100, and irregularities in recording surfaces 112 or in the written servo-pattern.

Actuator arms 124A-124C are included in actuator arm assembly 120A, and actuator arms 124D-124F are included in actuator arm assembly 120B. In an embodiment of the invention, actuator arm assemblies 120A and 120B are independently controlled and both rotate about bearing assembly 126 (which includes a same shaft axis 226).

In positioning one of read/write heads 227A-227H over a corresponding recording surface (i.e., one of recording surfaces 112A-112H), the servo system determines an appropriate current to drive through the voice coil of the appropriate voice coil motor (i.e., either VCM 128A or 128B), and drives said current using a current driver and associated circuitry, e.g., included in motor-driver chip 125. Typically, the appropriate current is determined based in part on a position feedback signal of the read/write head 127, i.e., a position error signal (PES). The PES is typically generated by using servo patterns included in the servo wedges on the recording surface as a reference. One embodiment of such a recording surface 112 is illustrated in FIG. 3.

Figure 3:
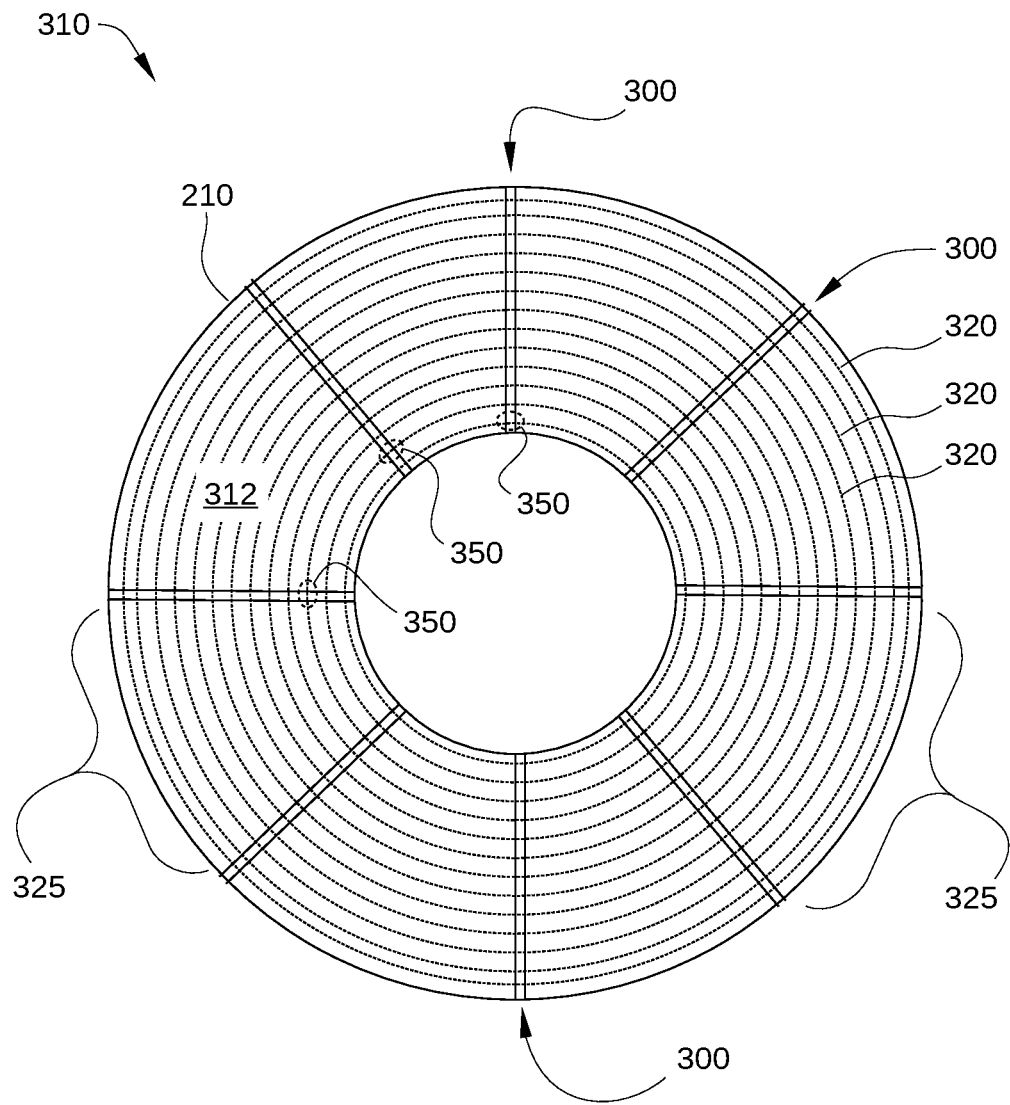
FIG. 3 illustrates a recording surface of a storage disk with servo wedges and concentric data storage tracks formed thereon, according to an embodiment.

FIG. 3 illustrates a recording surface 312 of a storage disk 310 with servo wedges 300 and concentric data storage tracks 320 formed thereon, according to an embodiment. Recording surface 312 can be any of recording surfaces 112A-112H in FIG. 2. Servo wedges 300 may be written on recording surface 312 by either a media writer, or by HDD 100 itself via a self-servo-write (SSW) process. Servo wedges 300 are typically radially aligned. In practice, servo wedges 300 may be somewhat curved. For example, servo wedges 300 may be configured in a spiral pattern that mirrors the path that would be followed by a corresponding read/write head 127 (shown in FIG. 1) if the read/write head 127 were to be moved across the stroke of one of actuator arm assemblies 120A or 120B while storage disk 310 is not spinning. Such a curved pattern advantageously results in the wedge-to-wedge timing being independent of the radial position of the read/write head 127. For simplicity, servo wedges 300 are depicted as substantially straight lines in FIG. 3. Each servo wedge 300 includes a plurality of servo sectors 350 containing servo information that defines the radial position and track pitch, i.e., spacing, of data storage tracks 320.

Data storage tracks 320 for storing data are located in data sectors 325, and are positionally defined by the servo information written in servo sectors 350. The region between two servo sectors may contain more than, equal to, or less than one data sector, including the possibility of fractional data-sectors. Each servo sector 350 encodes a reference signal that is read by the read/write head 127 as the read/write head 127 passes over the servo sector. Thus, during read and write operations, the read/write head 127 can be positioned above a desired data storage track 320. Typically, the actual number of data storage tracks 320 and servo wedges 300 included on recording surface 312 is considerably larger than that illustrated in FIG. 3. For example, recording surface 312 may include hundreds of thousands of concentric data storage tracks 320 and hundreds of servo wedges 300.

Timing Offsets in Multi-Actuator HDDs

As noted previously, when one actuator of a multiple-actuator HDD (the so-called "aggressor actuator") is seeking to a targeted data storage track, cross-actuator coupling can generate vibrations which can significantly affect the positioning accuracy of the other actuator (the so-called "victim actuator"). In particular, the high accelerations and changes in acceleration of the aggressor actuator are likely to affect the positioning accuracy of the victim actuator when the victim actuator is attempting to closely follow a specific data track, for example during a read or write operation. To reduce the effects of these inter-mechanical interactions between an aggressor and a victim actuator, victim disturbance feedforward control schemes have been developed, in which a feedforward control signal is asserted by a victim actuator. The feedforward control signal is determined as a function of the VCM commands asserted by the aggressor actuator, and is intended to reduce or compensate for the effect on the victim actuator of the VCM commands asserted by the aggressor actuator. However, the effectiveness of such victim disturbance feedforward control signals can be adversely affected by differences in timing (referred to herein as "timing offsets") between a victim head and an aggressor head. Such timing offsets are described below in conjunction with FIG. 4A-4C, FIG. 5, and FIG. 6.

Figure 4A:
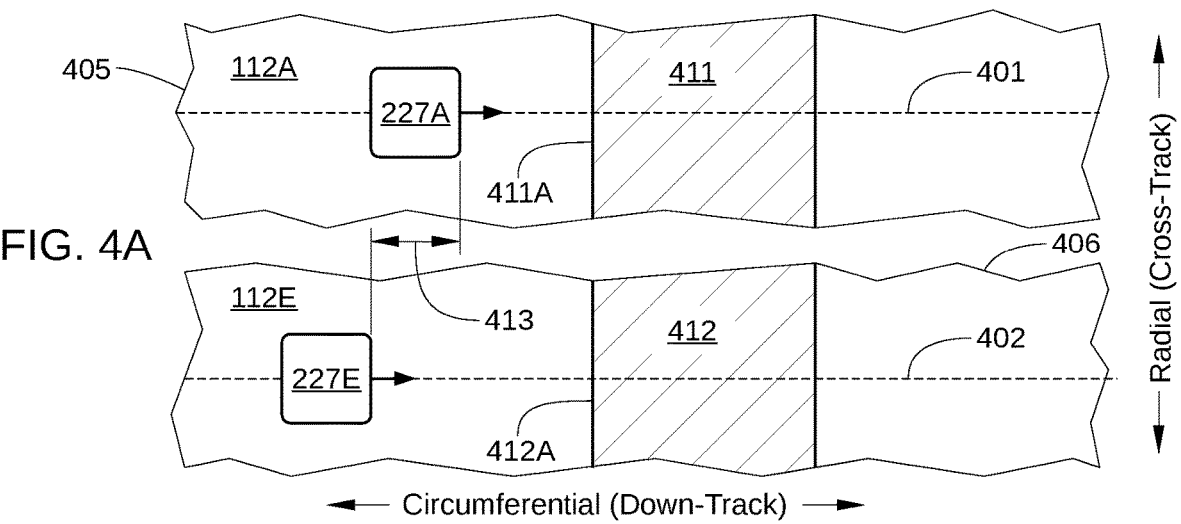
FIGS. 4A-4C schematically illustrate various timing offsets that can occur between two different read/write heads and/or servo wedges of the HDD of FIG. 1
Figure 4B:
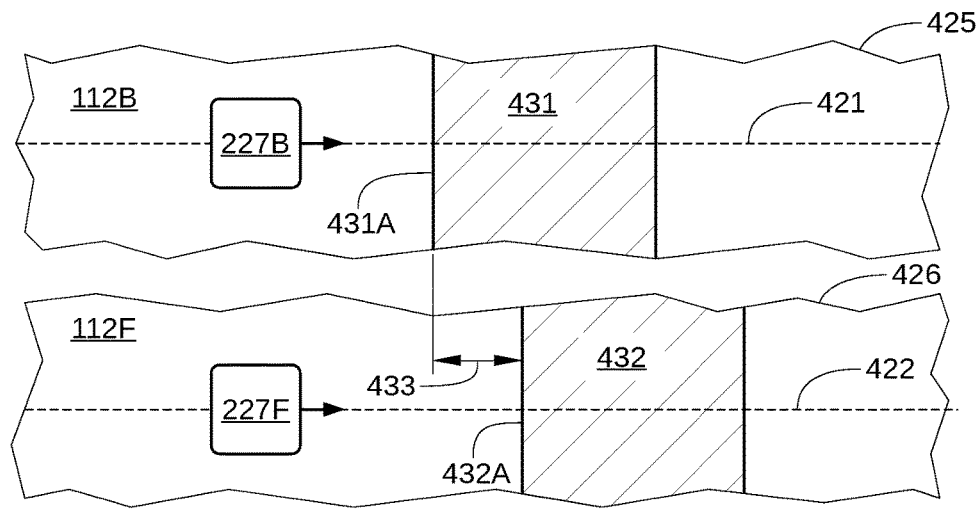
Figure 4C:
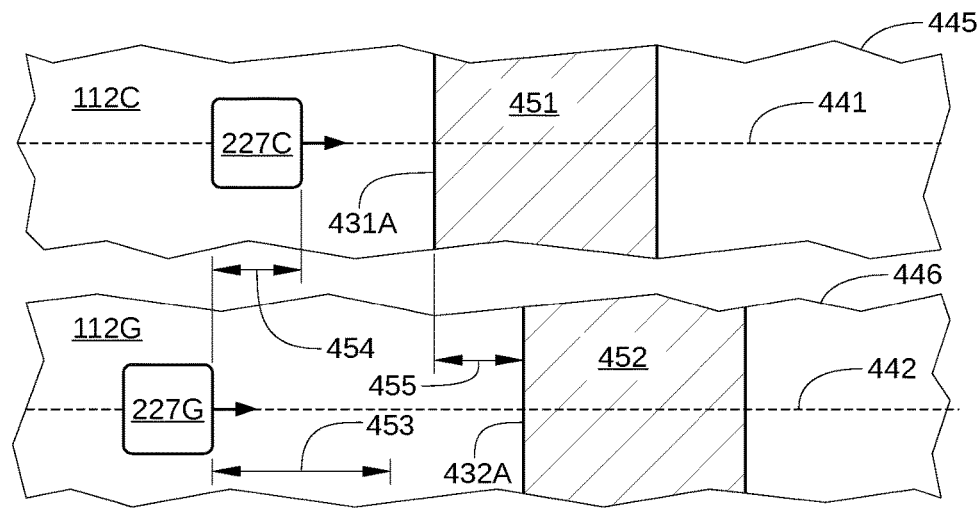

FIGS. 4A-4C schematically illustrate various timing offsets that can occur between two different read/write heads of HDD 100. FIG. 4A illustrates a timing offset 413 caused by a circumferential displacement between the two different read/write heads; FIG. 4B illustrates a timing offset 433 caused by a circumferential displacement between servo wedges associated with the two different read/write heads; and FIG. 4C illustrates a timing offset 453 caused by a combination of a circumferential displacement between the two different read/write heads and a circumferential displacement between servo wedges associated with the two different read/write heads.

For ease of description, in FIGS. 4A-4C, timing offset 413, timing offset 433, and timing offset 453 are each depicted as a physical displacement in the circumferential (down-track) direction. One of skill in the art will readily understand that, in practice, timing offset 413 corresponds to the duration of time required for a read/write head to move across the physical displacement depicted as timing offset 413, timing offset 433 corresponds to the duration of time required for a read/write head to move across the physical displacement depicted as timing offset 433, and timing offset 453 corresponds to the duration of time required for a read/write head to move across the physical displacement depicted as timing offset 453. Further, timing offset 413, timing offset 433, and timing offset 453 are depicted between read/write heads that are each associated with a different actuator arm assembly of an HDD. However, such timing offsets can also occur between read/write heads that are both associated with the same actuator arm assembly.

In FIG. 4A, read/write head 227A moves circumferentially relative to a portion 405 of recording surface 112A along a data track 401 while read/write head 227E moves circumferentially relative to a portion 406 of recording surface 112E along a data track 402. As shown, read/write head 227A is offset from read/write head 227E in the circumferential (down-track) direction and, as a result, crosses a rising edge 411A of a servo wedge 411 on recording surface 112A substantially sooner than read/write head 227E crosses a rising edge 412A of a servo wedge 412 on recording surface 112E. That is, there is a timing offset 413 between the time that read/write head 227A crosses rising edge 411A and the time that read/write head 227E crosses rising edge 412A. It is noted that in FIG. 4A, timing offset 413 occurs even though rising edge 411A and rising edge 412A are closely aligned circumferentially.

In some instances, timing offset 413 can be caused at the time of manufacture by misalignment of read/write head 227A and read/write head 227E in the circumferential direction, differential thermal expansion during operation between the actuator arm coupled to read/write head 227A and the actuator arm coupled to read/write head 227E, shifts in the relative position of read/write head 227A and read/write head 227E due to shocks experienced during the lifetime of HDD 100, and the like. In such instances, the timing offset 413 associated with a particular servo wedge of recording surface 112A and recording surface 112E can often be substantially the same for each servo wedge of recording surface 112A and recording surface 112E. In some instances, the magnitude of timing offset 413 can be a significant fraction of the time interval required for a read/write head to move across the circumferential separation between adjacent servo wedges, for example 5%, 10%, 20%, or more.

In FIG. 4B, read/write head 227B moves circumferentially relative to a portion 425 of recording surface 112B along a data track 421 while read/write head 227F moves circumferentially relative to a portion 426 of recording surface 112F along a data track 422. As shown, read/write head 227B and read/write head 227F are substantially aligned in the circumferential direction. However, a servo wedge 431 on recording surface 112B is circumferentially offset from a corresponding servo wedge 432 on recording surface 112F. As a result, read/write head 227B crosses a rising edge 431A of a servo wedge 431 before read/write head 227F crosses a rising edge 432A of a servo wedge 432. That is, there is a timing offset 433 between the time that read/write head 227B crosses rising edge 431A and the time that read/write head 227F crosses rising edge 432A.

In some instances, timing offset 433 can be caused by servo wedges that are imprecisely written on recording surface 112B and/or recording surface 112F at the time of manufacture. In such instances, the timing offset 433 associated with a particular servo wedge of recording surface 112B and recording surface 112F can often be substantially the same for each servo wedge of recording surface 112B and recording surface 112F. Alternatively or additionally, in some instances, timing offset 433 can be caused by a shift in relative position between recording surface 112B and recording surface 112F, for example due to an impact or other physical shock experienced during the lifetime of HDD 100. In such instances, the timing offset 433 associated with a particular servo wedge of recording surface 112B and recording surface 112F generally varies for each servo wedge of recording surface 112A and recording surface 112E, for example sinusoidally. In some instances, the magnitude of timing offset 433 can be a significant fraction of the time interval required for a read/write head to move across the circumferential separation between adjacent servo wedges, for example 5%, 10%, 20%, or more.

In FIG. 4C, read/write head 227C moves circumferentially relative to a portion 445 of recording surface 112C along a data track 441 while read/write head 227G moves circumferentially relative to a portion 446 of recording surface 112G along a data track 442. As shown, a servo wedge 451 on recording surface 112C is circumferentially offset from a corresponding servo wedge 452 on recording surface 112G by a circumferential displacement 455. Further, read/write head 227C and read/write head 227G are also circumferentially offset from each other. Therefore, read/write head 227G trails read/write head 227C circumferentially by a circumferential displacement 454. As a result, read/write head 227C crosses a rising edge 451A of servo wedge 451 before read/write head 227G crosses a rising edge 452A of servo wedge 452. That is, there is a timing offset 453 that corresponds to the time interval required for read/write head 227G to move across a circumferential distance equivalent to the sum of circumferential displacement 454 and circumferential displacement 455. Timing offset 453 can have a magnitude similar to or greater than timing offset 413, timing offset 433, or a combination of both.

Ideally, read/write heads and servo wedges of an HDD are aligned circumferentially so that the above-described timing offset 413, timing offset 433, and timing offset 453, are of insignificant magnitude. In practice, such timing offsets can be a significant fraction of the time interval required for a read/write head to move across the circumferential separation between adjacent servo wedges, as described below in conjunction with FIG. 5.

Figure 5:
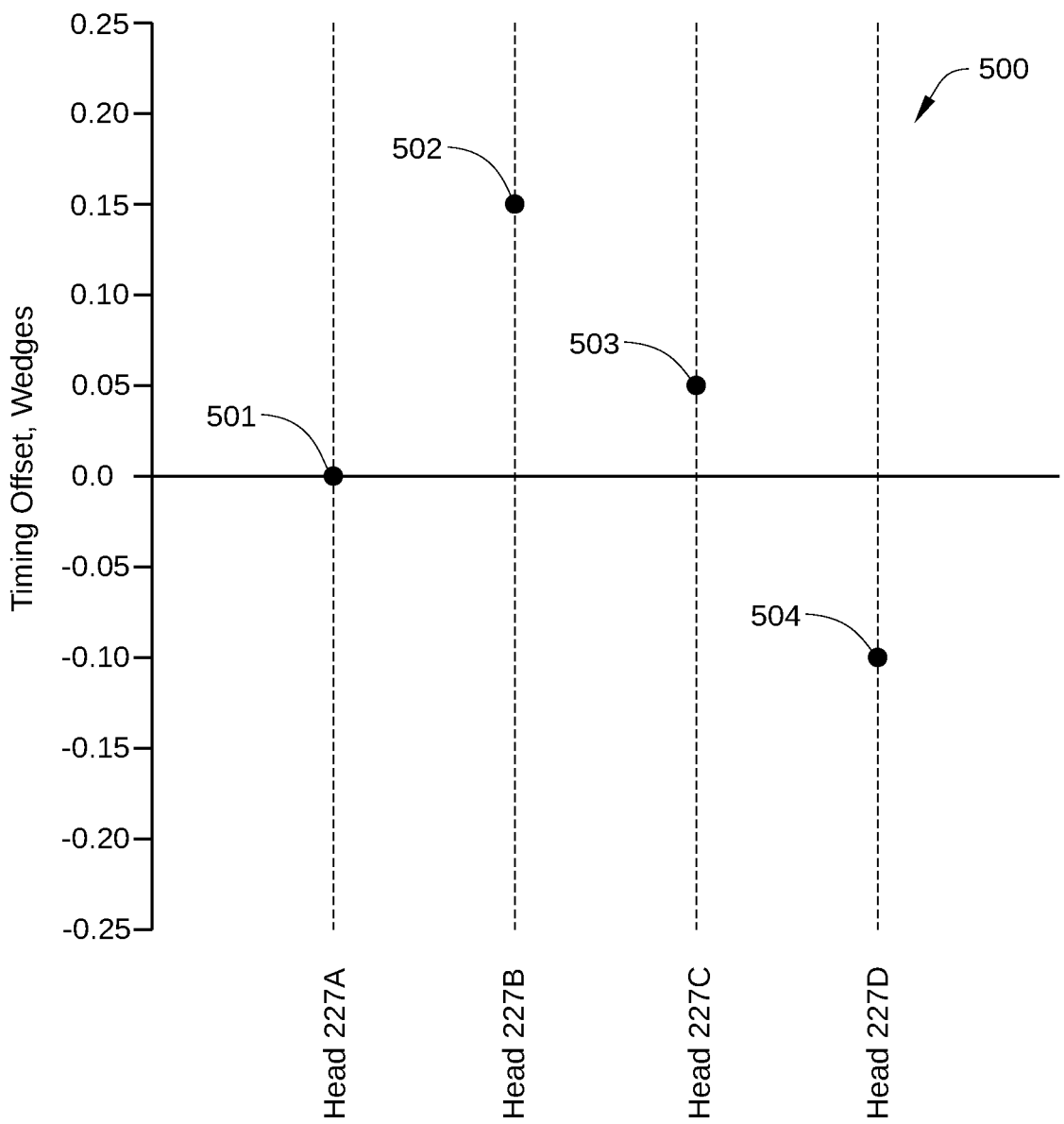
FIG. 5 is a plot of timing offset magnitude between the read/write heads of an actuator arm assembly, according to some embodiments.

FIG. 5 is a plot of timing offset magnitude between read/write heads 227A-227D of actuator arm assembly 120A, according to some embodiments. More specifically, FIG. 5 shows timing offset magnitudes (referred to collectively herein as "timing offsets 500") for read/write heads 227A-227D relative to read/write head 227A. As shown, read/write head 227A has a timing offset 501 relative to read/write head 227A, read/write head 227B has a timing offset 502 relative to read/write head 227A, read/write head 227C has a timing offset 503 relative to read/write head 227A, and read/write head 227D has a timing offset 504 relative to read/write head 227A.

In FIG. 5, the magnitudes of timing offsets 500 are depicted in terms of "wedges," where one "wedge" references a time interval $T_{wedge}$ that is required for a read/write head to move across the circumferential separation between the starts of two adjacent servo wedges. For example, timing offset 502 of read/write head 227B has a magnitude of 0.15 servo wedges. As such, timing offset 502 indicates that read/write head 227B lags behind read/write head 227A by 0.15 servo wedges. That is, given that read/write head 227A crosses at a time T0 a reference point (such as a leading edge) associated with a first servo wedge on the recording surface that corresponds to read/write head 227A, therefore read/write head 227B crosses a similar reference point on the recording surface that corresponds to read/write head 227B at a time T1, where time $T1=T0+0.15(T_{wedge})$. Similarly, timing offset 503 indicates that read/write head 227C lags behind read/write head 227A by 0.05 servo wedges, and therefore crosses a similar reference point on the recording surface that corresponds to read/write head 227C at a time T2, where time $T2=T0+0.05(T_{wedge})$. Further, timing offset 504 indicates that read/write head 227D leads read/write head 227A by 0.10 servo wedges, and therefore crosses a similar reference point on the recording surface that corresponds to read/write head 227D at a time T3, where time $T3=T0-0.10(T_{wedge})$. As shown, read/write head 227A has no timing offset with itself, and therefore has a timing offset of 0.

In some instances, timing offsets 500 can vary for each servo wedge that is crossed by read/write heads 227A-227D. In such instances, when recording surfaces of HDD 100 include K servo wedges, there are K different timing offsets 501 for read/write head 227A, K different timing offsets 502 for read/write head 227B, K different timing offsets 503 for read/write head 227C, and K different timing offsets 504 of read/write head 227D. Thus, in such instances, FIG. 5 shows timing differences 500 for a single servo wedge.

Timing offsets 500 of FIG. 5 are associated with the various read/write heads of a single actuator of HDD 100, such as VCM 128A. In a multi-actuator HDD, there are generally timing offsets between each of the multiple read/write heads of one actuator and the multiple read/write heads of the other actuator. Such timing offsets are described below in conjunction with FIG. 6.

Figure 6:
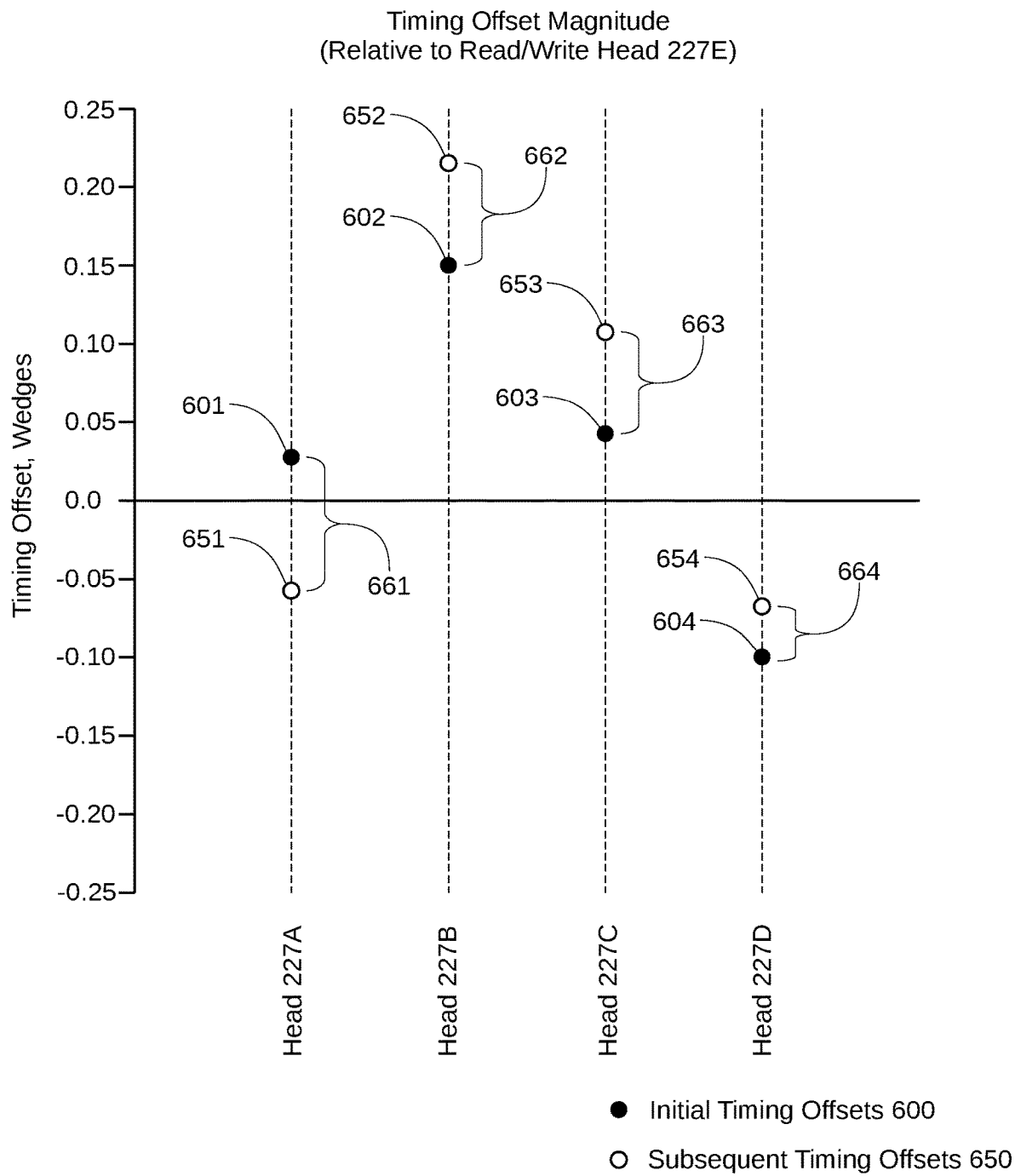
FIG. 6 is a plot of timing offset magnitude between the read/write heads of a first actuator arm assembly of a multi-actuator drive and one read/write head of a second actuator arm assembly of the multi-actuator drive, according to some embodiments.

FIG. 6 is a plot of timing offset magnitude between the read/write heads of a first actuator arm assembly of a multi-actuator drive and one read/write head of a second actuator arm assembly of the multi-actuator drive, according to some embodiments. FIG. 6 includes initial timing offsets 600, which are present between the read/write heads of the first actuator arm assembly and one read/write head of the second actuator arm assembly at the time of manufacture of HDD 100. In the embodiment illustrated in FIG. 6, initial timing offsets 600 for read/write heads 227A-227D of actuator arm assembly 120A (shown in FIG. 2) relative to read/write head 227E of actuator arm assembly 120B (shown in FIG. 2) are shown. Initial timing offsets 600 include an initial timing offset 601 of read/write head 227A relative to read/write head 227E, an initial timing offset 602 of read/write head 227B relative to read/write head 227E, an initial timing offset 603 of read/write head 227C relative to read/write head 227E, and an initial timing offset 604 of read/write head 227D relative to read/write head 227E.

Similar to timing offsets 500 of FIG. 5, initial timing offsets 600 indicate that each of read/write heads 227A-227D can either lag behind or lead read/write head 227E. Further, in some instances, initial timing offsets 600 can vary for each servo wedge that is crossed by read/write heads 227A-227E. In such instances, when recording surfaces of HDD 100 include K servo wedges, there are K different initial timing offsets 601 for read/write head 227A, K different initial timing offsets 602 for read/write head 227B, K different initial timing offsets 603 for read/write head 227C, and K different initial timing offsets 604 of read/write head 227D. Thus, in such instances, FIG. 6 shows initial timing differences 600 for a single servo wedge.

FIG. 6 also shows subsequent timing offsets 650, which are timing offsets for read/write heads 227A-227D relative to read/write head 227E at some time during the lifetime of HDD 100. Subsequent timing offsets 650 include a subsequent timing offset 651 of read/write head 227A relative to read/write head 227E, a subsequent timing offset 652 of read/write head 227B relative to read/write head 227E, a subsequent timing offset 653 of read/write head 227C relative to read/write head 227E, and a subsequent timing offset 654 of read/write head 227D relative to read/write head 227E.

Subsequent timing offsets 650 may develop or be present in HDD 100 after a specific period of time, a specific quantity of operating time by HDD 100, and/or after a physical shock is experienced by HDD 100. Subsequent timing offsets 650 illustrate that the magnitude of timing offsets between the read/write heads of one actuator arm assembly of a multi-actuator drive and one read/write head of another actuator arm assembly of the multi-actuator drive can vary or drift over time from initial timing offsets 600. That is, a shift can occur in the timing relationship between one or more read/write heads of one actuator arm assembly and one or more read/write heads of the another actuator arm assembly of the multi-actuator drive. Such shifts are referred to herein as "timing shifts," and, in some embodiments, can significantly affect the accuracy of certain victim disturbance feedforward control schemes. For example, in the embodiment illustrated in FIG. 6, there is a timing shift 661 between initial timing offset 601 and timing offset 651, a timing shift 662 between initial timing offset 602 and timing offset 652, a timing shift 663 between initial timing offset 603 and timing offset 653, and a timing shift 664 between initial timing offset 604 and timing offset 654 (referred to collectively herein as "timing shifts 660"). Generally, a feedforward transfer function that generates a feedforward control signal for a victim actuator may assume an initial timing offset 600 exists between an aggressor head and a victim head that is changed by a timing shift 660. As a result, the presence of timing shifts 660 can reduce the accuracy of the feedforward control signal that is generated based on such a transfer function.

In some instances, a particular timing shift 660 can be caused by a change in the timing of a single read/write head. For example, in some instances, timing shift 661 occurs due to a circumferential displacement (or other timing change) of either read/write head 227A or read/write head 227E. It is noted that when a circumferential displacement (or other timing change) of read/write head 227E occurs, the effect of such a timing change affects all of subsequent timing offsets 650. Additionally or alternatively, in some instances, a particular timing shift 660 can be caused by a change in the timing of both read/write heads associated with the timing shift. For example, in such an instance, timing shift 661 occurs due to a circumferential displacement (or other timing change) of read/write head 227A and of read/write head 227E. Further, similar to timing offsets 500 and initial timing offsets 600, timing shifts 660 can vary for each servo wedge that is crossed by read/write heads 227A-227D.

Feedforward Control Signal Based on Aggressor Operation

In some embodiments, to reduce or compensate for the effect of the VCM commands asserted by the aggressor actuator on the position of a victim head, a feedforward signal for a victim actuator is determined as a function of the VCM commands asserted by the aggressor actuator. In such embodiments, the feedforward control signal may be generated based on a transfer function that models a feedforward correction signal for the victim head as a function of a control signal supplied to the aggressor actuator. For example, determination of the transfer function for a particular victim head can include a procedure that involves adding known disturbances to a control signal for an actuator that is currently designated as the aggressor actuator and measuring the radial position of the victim head in response to each of the added disturbances.

It is noted that the mechanical disturbances that affect victim head position are caused by the accelerations and decelerations of the aggressor actuator itself, and therefore are independent of which particular aggressor head is the active head when determining the above-described transfer function. Thus, in some embodiments, the same aggressor head can be used when determining the transfer function for each different victim head, and is referred to herein as a "base aggressor head" for purposes of description. In such embodiments, the fractional-wedge timing offsets between each particular victim head and the base aggressor head are generally different, and can have a magnitude that is a significant fraction of a wedge, as illustrated by timing offsets 600. However, in such embodiments, the effect on the response in position of a particular victim head by the timing offset between that particular victim head and the base aggressor head is incorporated into the transfer function of that particular victim head. Consequently, in operation, when the base aggressor head is the active head, the timing offset between that particular victim head and the aggressor head is inherently accounted for, as long as that timing offset remains substantially the same and does not drift to another value. By contrast, when the base aggressor head is not the active head, the timing offset between that particular victim head and the aggressor head can affect the accuracy of the feedforward correction signal for that particular victim head. This is because, as illustrated by timing offsets 500 in FIG. 5, each read/write head associated with a particular actuator can have a timing offset from each of the other read/write heads that is a significant fraction of a servo wedge in magnitude. As a result, the transfer function on which the feedforward correction signal is based is determined via measurements of victim head response that assume a different timing offset between the victim head and the aggressor head than is actually present. Thus, in such an instance, the effectiveness of the victim disturbance feedforward control signal can be degraded.

According to various embodiments, measurements of fractional-wedge timing-offsets between an aggressor head and a victim head are used to adjust the aggressor actuator commands that are inputted to a victim disturbance feedforward signal generator. In some embodiments, when a timing offset exists between the aggressor head and the victim head that is equivalent to a specific fraction of the timing difference between the starts of adjacent servo wedges, values of the aggressor actuator commands that are inputted to the victim disturbance feedforward signal generator are modified based on the specific fraction. Additionally or alternatively, in some embodiments, feedforward signals generated by the victim disturbance feedforward signal generator are modified based on the specific fraction. In some embodiments, the victim disturbance feedforward signal is added to a microactuator control signal of the victim actuator in response to a VCM control signal that is applied to the aggressor actuator. One such embodiment is described below in conjunction with FIGS. 7-11.

Figure 7:
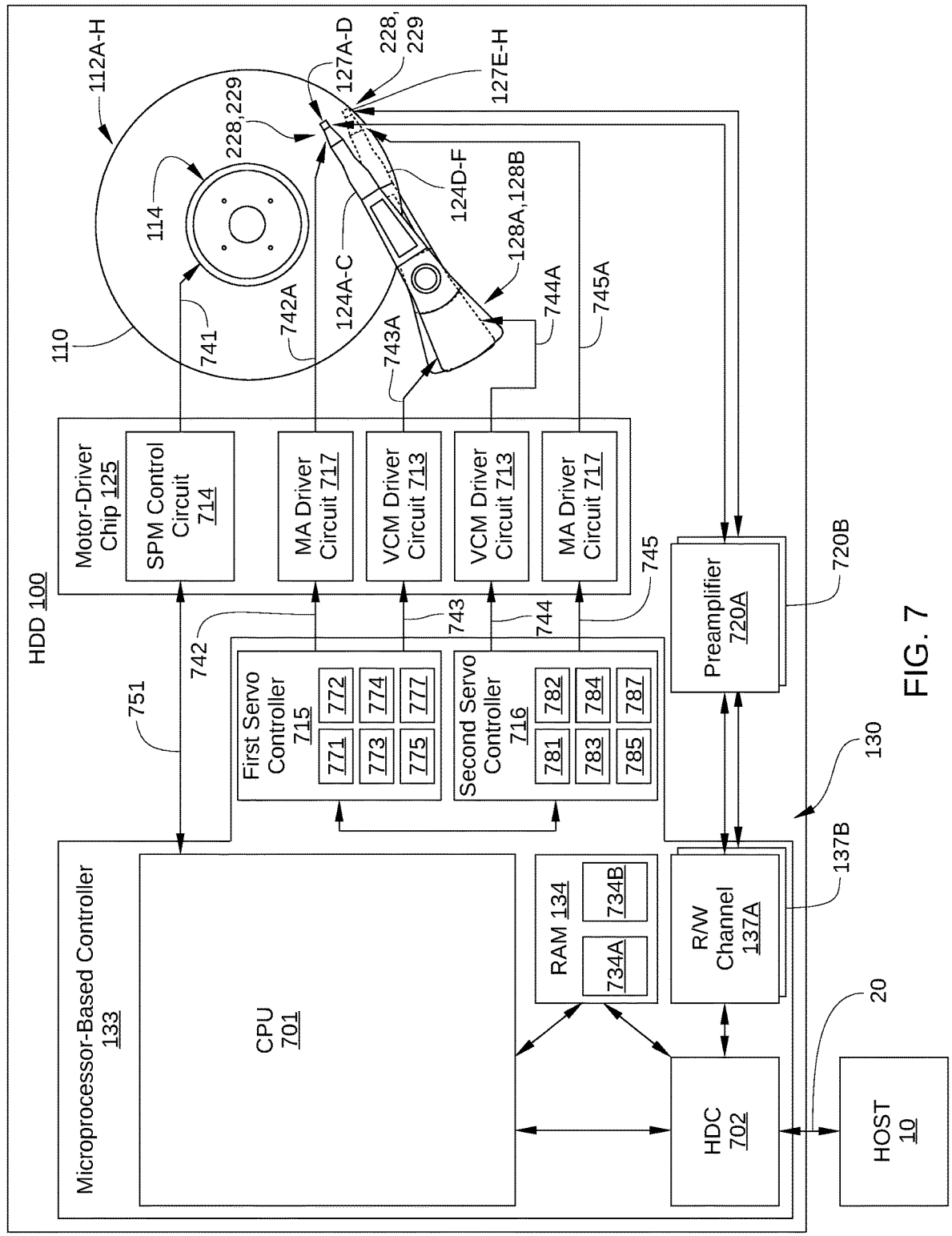
FIG. 7 illustrates an operational diagram of the HDD of FIG. 1, with some elements of electronic circuits and a motor-driver chip shown configured according to one embodiment.

FIG. 7 illustrates an operational diagram of HDD 100, with some elements of electronic circuits 130 and motor-driver chip 125 shown configured according to one embodiment. As shown in FIG. 7, HDD 100 is configured to coordinate fractional-wedge timing of aggressor and victim actuators, according to various embodiments. For example, in some embodiments, values of the aggressor actuator commands that are inputted to a victim disturbance feedforward signal generator are modified based on a specific fractional-wedge timing offset, and in some embodiments, values of feedforward signals generated by the victim disturbance feedforward signal generator are modified based on a specific fractional-wedge timing offset. Generally, an actuator of HDD 100 is considered a victim actuator while performing a position-sensitive operation, such as servoing over a data track to read data from and/or write data to the data track. An actuator of HDD 100 is considered an aggressor actuator when performing a seek operation while another actuator of the multi-actuator HDD is currently a victim actuator.

HDD 100 is connected to a host 10, such as a host computer, via a host interface 20, such as a serial advanced technology attachment (SATA) bus or a Serial Attached Small Computer System Interface (SAS) bus. As shown, microprocessor-based controller 133 includes one or more central processing units (CPU) 701 or other processors, a first servo controller 715, a second servo controller 716, a hard disk controller (HDC) 702, a DRAM 134, and read/write channels 137A and 137B. Motor-driver chip 125 includes VCM driver circuits 713, MA driver circuits 717, and a spindle motor (SPM) control circuit 714. DRAM 134 may be integrated on the same die as the controller 133, included in a separate die in the same package as the controller 133, or included in a separate package mounted on circuit board 130.

HDD 100 further includes preamplifiers 720A and 720B, which can be each mounted on actuator arm assemblies 120A and 120B or elsewhere within the head and disk assembly (HDA) of HDD 100. Preamplifier 720A supplies a write signal (e.g., current) to read/write head 127A in response to write data input from read/write channel 137A. Similarly, preamplifier 720B supplies a write signal (e.g., current) to read/write head 127B in response to write data input from read/write channel 137B. In addition, preamplifier 720A amplifies a read signal output from to read/write head 127A and transmits the amplified read signal to read/write channel 137A, and preamplifier 720B amplifies a read signal output from to read/write head 127B and transmits the amplified read signal to read/write channel 137B.

CPU 701 controls HDD 100, for example according to firmware stored in flash memory device 135 or another nonvolatile memory, such as portions of recording surfaces 112A-112H. For example, CPU 701 manages various processes performed by HDC 702, read/write channels 137A and 137B, read/write heads 127A-127H, recording surfaces 112A-112H, and/or motor-driver chip 125. Such processes include a writing process for writing data onto recording surfaces 112A-112H and a reading process for reading data from recording surfaces 112A-112H.

In some embodiments, the first servo system of HDD 100 (e.g., CPU 701, read/write channel 137A, preamplifier 720A, first servo controller 715, voice-coil motor 128A, and a suitable microactuator 228 or 229) performs positioning of a read/write head 127 included in actuator arm assembly 120A (e.g., read/write head 127A) over a corresponding recording surface (e.g., recording surface 112A), during which CPU 701 determines an appropriate current to drive through the voice coil of VCM 128A. Typically, the appropriate current is determined based in part on a position feedback signal of the read/write head, i.e., a position error signal (PES). Similarly, the second servo system of HDD 100 (e.g., CPU 701, read/write channel 137B, preamplifier 720B, second servo controller 716, voice-coil motor 128B, and a suitable microactuator 228 or 229) performs positioning of a read/write head 127 included in actuator arm assembly 120B (e.g., read/write head 127D) over a corresponding recording surface (e.g., recording surface 112D), during which CPU 701 determines an appropriate current to drive through the voice coil of VCM 128B. Although a single CPU 701 is shown here, it is possible that multiple CPUs might be used (for example, one or more CPUs for each actuator).

In the embodiment illustrated in FIG. 7, various links are shown between certain elements of HDD 100 for enablement of certain embodiments. In some embodiments, additional and/or alternative links between certain elements of HDD 100 may exist for operation of HDD 100, but are not shown for clarity and ease of description. Such additional and/or alternative links would be known to one of ordinary skill in the art.

In the embodiment illustrated in FIG. 7, microprocessor-based controller 133 includes a single CPU 701 incorporated into a single SoC 131. In alternative embodiments, microprocessor-based controller 133 includes more than one CPU. In such embodiments, HDD 100 can include two CPUs; one devoted to servo/spindle control and the other devoted to a combination of host-based and disk-control activities. In other alternate embodiments, HDD 100 can include a CPU and one or more separate servo controllers, such as first servo controller 715 and second servo controller 716 shown in FIG. 7. Alternatively or additionally, in some embodiments, HDD 100 includes a separate SoC for each actuator, where each SoC has two such CPUs. Further, in some embodiments, microprocessor-based controller 133 includes multiple motor driver chips. For instance, in one such embodiment, a first motor driver chip is dedicated for controlling the spindle motor, a first actuator, and a first microactuator, while a second motor driver chip is dedicated for controlling a second actuator and a second microactuator.

Read/write channels 137A and 137B are signal processing circuits that encode write data input from HDC 702 and output the encoded write data to respective preamplifiers 720A and 720B. Read/write channels 137A and 137B also decode read signals transmitted from respective preamplifiers 720A and 720B into read data that are outputted to HDC 702. In some embodiments, read/write channels 137A and 137B each include a single read channel and a single write channel, whereas in other embodiments, read/write channels 137A and 137B each include multiple write channels and/or multiple read channels for read/write heads 127A-127H. HDC 702 controls access to DRAM 134 by CPU 701, HDC 702, read/write channels 137A and 137B, and host 10, and receives/transmits data from/to host 10 via interface 20. In some embodiments, the components of microprocessor-based controller 133 (e.g., CPU 701, HDC 702, DRAM 134, and read/write channels 137A, 137B) are implemented as a one-chip integrated circuit (i.e., as an SoC). Alternatively, one or more of CPU 701, HDC 702, DRAM 134, and read/write channels 137A and 137B can each be implemented as a separate chip.

Motor-driver chip 125 drives the spindle motor 114, a first actuator (that includes VCM 128A, actuator arms 124A-124C, and bearing assembly 126), and a second actuator (that includes VCM 128B, actuator arms 124D-124F, and bearing assembly 126). A first VCM driver circuit 713 of motor-driver chip 125 generates an amplified control signal 743A in response to control signals 743 from first servo controller 715, and a second VCM driver circuit 713 of motor-driver chip 125 generates an amplified control signal 744A in response to control signals 744 from second servo controller 716. Control signals 743 enable execution of disk access commands received from host 10 that are to be executed by a first servo system of HDD 100 that includes VCM 128A and control signals 744 enable execution of disk access commands received from host 10 that are to be executed by a second servo system of HDD 100 that includes VCM 128B. MA driver circuits 717 (in some embodiments included in motor-driver chip 125) generate amplified second-stage control signals 742A and 745A in response to control signals 742 and 745 (which are control values for microactuators 228 and/or microactuators 229), respectively. Control signals 742 and 745 are generated by first servo controller 715 and second servo controller 716, respectively. Thus, a first MA driver circuit 717 generates amplified second-stage control signal 742A for microactuators 228 and/or 229 associated with actuator arm assembly 120A, and a second MA driver circuit 717 generates amplified second-stage control signal 745A for microactuators 228 and/or 229 associated with actuator arm assembly 120B.

SPM control circuit 714 generates a drive signal 741 (a drive voltage or a drive current) in response to a control signal 751 received from the CPU 701 and feedback from the spindle motor 114, and supplies drive signal 741 to spindle motor 114. In this way, spindle motor 114 rotates storage disks 110A-110D.

First servo controller 715 generates a VCM control signal 743 (drive voltage or drive current) and a microactuator control signal 742 (drive voltage or drive current). First servo controller 715 supplies VCM control signal 743 to the first actuator (VCM 128A) via a VCM driver circuit 713 and microactuator control signal 742 to a suitable microactuator 228 or 229 via one of MA driver circuits 317. In this way, first servo controller 715 positions read/write heads 127A-127D radially relative to a corresponding one of recording surfaces 112A-112D. In some embodiments, first servo controller 715 includes a fine servo controller 771 that generates microactuator control signal 742, a coarse servo controller 772 that generates VCM control signal 743, and a victim feedforward signal generator 773 that generates a feedforward signal (not shown in FIG. 7) for modifying microactuator control signal 742 when VCM 128A is the victim actuator.

The functionality of victim feedforward signal generator 773 can be implemented in whole or in part as software- or firmware-implemented logic, and/or as hardware-implemented logic circuits. Further, in some embodiments, the functionality of victim feedforward signal generator 773 is distributed across multiple software- firmware- and/or hardware-entities. For example, in one such embodiment, a first portion of the functionality of victim feedforward signal generator 773 is implemented as one or more logic circuits, such as a multiply-accumulate engine, and a second portion of the functionality of victim feedforward signal generator 773 is implemented as software executed by, for example, CPU 701. In such an embodiment, the multiply-accumulate engine executes most of the operations associated with performing a convolution of previously asserted VCM commands to pre-compute a partial victim feedforward value, while the software executed by the CPU uses the pre-computed partial victim feedforward value and more recently asserted VCM commands (such as VCM commands stored in recent aggressor VCM command buffer 777) to compute a victim feedforward value for modifying microactuator control signal 742 when VCM 128A is the victim actuator. Operations performed by victim feedforward signal generator 773 to generate a victim feedforward value are described in greater detail below in conjunction with FIGS. 11-13.

According to various embodiments, first servo controller 715 further includes an aggressor VCM command buffer 774, a victim feedforward value buffer 775, and a recent aggressor VCM command buffer 777. As set forth below, aggressor VCM command buffer 774, victim feedforward value buffer 775, and recent aggressor VCM command buffer 777 facilitate the calculation and assertion of a victim feedforward signal by victim feedforward signal generator 773. In some embodiments, aggressor VCM command buffer 774, victim feedforward value buffer 775, and/or recent aggressor VCM command buffer 777 are implemented as a first-in-first-out (FIFO) memory device, a circular buffer, or any other suitable memory device that can be accessed with sufficient speed to enable embodiments described herein. Further, in some embodiments, recent aggressor VCM command buffer 777 can be a specified portion of aggressor VCM command buffer 774.

Aggressor VCM command buffer 774 is configured for storing recently asserted VCM commands issued to the aggressor actuator. Aggressor VCM command buffer 774 is configured to store a sufficient number of previously issued VCM commands to include aggressor VCM commands that can still have a significant effect on the current position of the victim head. For example, when the victim head has passed over a servo wedge N, an aggressor VCM command asserted for the aggressor actuator at servo wedge N−500 is unlikely to still have a significant effect on the position of the victim head, and can generally be ignored when calculating a feedforward signal to compensate for recent motion of the aggressor actuator. By contrast, an aggressor VCM command asserted for the aggressor actuator at servo wedge N−3 is likely to have a large effect on the position of the victim head, since the mechanical disturbance of such recent motion by the aggressor actuator is still propagating throughout HDD 100. Thus, aggressor VCM command buffer 774 can be configured to store a relatively large number of aggressor VCM commands. In some embodiments, aggressor VCM command buffer 774 is configured to store a number of aggressor VCM commands that is fewer than the number of servo wedges associated with a complete rotation of a storage disk 110. For example, in some embodiments, aggressor VCM command buffer 774 is configured to store on the order of about 100 to 200 VCM commands issued most recently to the aggressor actuator. Alternatively, in some embodiments, aggressor VCM command buffer 774 is configured to store a number of aggressor VCM commands that is approximately equal to the number of servo wedges associated with a complete rotation of a storage disk 110.

One embodiment of aggressor VCM command buffer 774 is described below in conjunction with FIG. 8A and one embodiment of recent aggressor VCM command buffer 777 is described below in conjunction with FIG. 8B.

FIG. 8A schematically illustrates an aggressor VCM command buffer 774, according to an embodiment. As shown, aggressor VCM command buffer 774 includes a plurality of VCM command entries 801 that are each associated with a corresponding servo wedge number 802. The servo wedge number 802 for a particular VCM command entry 801 indicates the servo wedge number most recently passed over by the aggressor head when the particular VCM command entry 801 is determined for the aggressor VCM. For example, when the aggressor head passes over a servo wedge N and a next VCM command is calculated for the aggressor actuator in response, the aggressor VCM command is calculated, asserted by the aggressor VCM (for example by the aggressor actuator), and stored in aggressor VCM command buffer 774 as one of VCM command entries 801. In addition, a unique value indicating servo wedge N, such as a wedge index value, is stored as the corresponding servo wedge number 802 for that VCM command entry 801.

In the embodiment illustrated in FIG. 8A, servo wedge numbers 802 are stored in aggressor VCM command buffer 774. In other embodiments, the association between VCM command entries 801 and servo wedge numbers 802 can be tracked using any other technically feasible approach. For instance, in some embodiments, aggressor VCM command buffer 774 does not store servo wedge numbers 802. In such embodiments, when command entries 801 are employed to determine a victim feedforward value, selection of each command entry 801 can be controlled, for example via a pointer, so that each command entry 801 is associated with the correct servo wedge during the victim feedforward calculation without explicitly retrieving a servo wedge number 802 from aggressor VCM command buffer 774.

In the embodiment illustrated in FIG. 8A, VCM command entries 801 are depicted as integer values, such as values sent to a digital-to-analog converter that is an input to a VCM driver 713. In some embodiments, such integer values may be appropriately re-scaled prior to being sent to the VCM driver 713. Alternatively, in some embodiments, each VCM command entry 801 includes a number representing a target current (e.g., in milliamperes), a target aggressor head acceleration (e.g., in m/sec$^2$), or the like.

The location of aggressor VCM command buffer 774 is depicted in FIG. 7 to be included in or otherwise associated with the servo controller of the aggressor actuator. That is, when VCM 128A is the aggressor actuator, aggressor VCM command buffer 774 of first servo controller 715 stores VCM commands for VCM 128A because first servo controller 715 controls the aggressor actuator (VCM 128A). In alternative embodiments, a VCM command buffer is instead included in or otherwise associated with the servo controller of the victim actuator. For example, in such embodiments, when VCM 128A is the aggressor actuator and VCM 128B is the victim actuator, an aggressor VCM command buffer 784 of second servo controller 716 stores the VCM commands for VCM 128A, because second servo controller 716 controls the victim actuator (VCM 128B).

Recent aggressor VCM command buffer 777 facilitates generation of a victim feedforward value for modifying microactuator control signal 742 when VCM 128A is the victim actuator. Specifically, in some embodiments, recent aggressor VCM command buffer 777 stores the aggressor VCM commands that have been most recently asserted by the aggressor VCM (VCM 128B). Some or all of the aggressor VCM commands stored by recent aggressor VCM command buffer 777 are employed in performing a convolution of previously asserted VCM commands to pre-compute a partial victim feedforward value. In such embodiments, a multiply-accumulate engine (or another logical circuit) associated with or included in victim feedforward signal generator 773 pre-computes a partial victim feedforward value by executing most of the operations associated with performing the convolution of previously asserted aggressor VCM commands that are likely to affect the position of the victim head, for example 100 or 200 recent aggressor VCM commands stored in aggressor VCM command buffer 774. Then, software executed by a CPU or other processor, or by another short run of the multiply-accumulate engine (or other logical circuit), uses the pre-computed partial victim feedforward value and one, some, or all of the aggressor VCM commands stored in recent aggressor VCM command buffer 777 to complete computation of a victim feedforward value for modifying microactuator control signal 742 when VCM 128A is the victim actuator.

FIG. 8B schematically illustrates an aggressor VCM command buffer 774, according to another embodiment.

Similar to the embodiment illustrated in FIG. 8A, aggressor VCM command buffer 774 includes a plurality of VCM command entries 801. Unlike the afore-mentioned embodiment, in the embodiment illustrated in FIG. 8B, aggressor VCM command buffer 774 includes two VCM commands per servo wedge. Thus, in the embodiment, aggressor VCM command buffer 774 is configured for a multi-rate control system for the aggressor actuator, in which the control signals for the aggressor actuator and the victim actuator are updated at a higher rate than the rate at which the positions of the aggressor head and the victim head are determined. For example, in an embodiment, the control signal for an aggressor actuator (and the victim actuator) is updated at twice the rate at which the read/write head position for the aggressor head and the victim head actuator is measured. Thus, in such an embodiment, two aggressor VCM commands may be associated with each servo-wedge, where these two VCM commands are the VCM commands employed by the servo system for the aggressor actuator to control the aggressor actuator for the corresponding servo wedge. A scheme for implementing embodiments in a multi-rate control system is described below in conjunction with FIGS. 12 and 13.

FIG. 8C schematically illustrates recent aggressor VCM command buffer 777, according to an embodiment. As shown, recent aggressor VCM command buffer 777 includes one or more VCM command entries 851 and one or more corresponding servo wedge numbers 852. Thus, for each VCM command entry 851, there is a corresponding servo wedge number 852. Similar to servo wedge numbers 802 of aggressor VCM command buffer 774, the servo wedge number 852 for a particular VCM command entry 851 indicates the servo wedge number most recently passed over by the aggressor head when the particular VCM command entry 851 is determined for the aggressor VCM. Thus, when the aggressor head passes over a servo wedge N and a next VCM command is calculated for the aggressor actuator in response, the aggressor VCM command is calculated, asserted (for example by the aggressor actuator), and stored in recent aggressor VCM command buffer 777 as one of VCM command entries 851. In addition, a unique value indicating servo wedge N, such as a wedge index value, is stored as the corresponding servo wedge number 852 for that VCM command entry 851. In the embodiment illustrated in FIG. 8C, VCM command entries 851 are depicted as integer values, such as values sent to a digital-to-analog converter that is an input to a VCM driver 713. Alternatively, in some embodiments, each VCM command entry 851 includes a number representing a target current (e.g., in milliamperes), a target aggressor head acceleration (e.g., in m/sec$^2$), or the like.

According to some embodiments, recent aggressor VCM command buffer 777 is configured to store a small number of VCM command entries 851, such as one, two, or three of the most recently asserted aggressor VCM commands. According to some embodiments, recent aggressor VCM command buffer 777 is configured to store only VCM command entries for the most-recent aggressor wedge.

In the embodiment illustrated in FIG. 8C, a single VCM command entry 851 is associated with each servo wedge number 852 in recent aggressor VCM command buffer 777. Similar to aggressor VCM command buffer 774, in embodiments in which HDD 100 includes a multi-rate control system for controlling the aggressor actuator and the victim actuator, recent aggressor VCM command buffer 777 may include multiple (e.g., two) VCM command entries 851 for each servo wedge number 852 in recent aggressor VCM command buffer 777.

Returning to FIG. 7, victim feedforward value buffer 775 is configured for storing one or more values of the victim feedforward signal to be added to microactuator control signal 742 when VCM 128A is the victim actuator. One embodiment of victim feedforward value buffer 775 is described below in conjunction with FIG. 9.

FIG. 9 schematically illustrates a victim feedforward value buffer 775, according to an embodiment. As shown, victim feedforward value buffer 775 includes one or more victim feedforward entries 901 and, for each victim feedforward entry 901, a corresponding servo wedge number 902. Thus, for each victim feedforward value stored in victim feedforward value buffer 775, there is a corresponding servo wedge number 902. That is, each value of the victim feedforward signal stored in victim feedforward value buffer 775 is associated with a particular servo wedge of a recording surface. According to various embodiments, a time at which a particular victim feedforward entry 901 is employed to compensate for an aggressor actuator command can be determined based on 1) the servo wedge number 902 corresponding to that particular victim feedforward entry 901 and 2) a preset wedge offset value (described below). In some embodiments, each servo wedge number 902 in victim feedforward value buffer 775 indicates a respective servo wedge of a recording surface associated with the aggressor actuator, and in other embodiments, with a respective servo wedge of a recording surface associated with the victim actuator.

In the embodiment illustrated in FIG. 9, victim feedforward entries 901 are depicted as integer values that are re-scaled prior to being sent to the MA Driver Circuit 717 to indicate a target displacement of the microactuator (for example, in units of 256 counts per servo-track). Alternatively, in some embodiments, each victim feedforward entry 901 includes a value indicating a target voltage applied to a microactuator (e.g., microactuator 228).

In embodiments in which each servo wedge number 902 indicates a respective servo wedge of a recording surface associated with the aggressor actuator, the servo wedge number 902 indicates the servo wedge most recently passed over by the aggressor head when that particular victim feedforward value was determined. For example, when the aggressor head passes over a servo wedge N and a victim feedforward entry 901 is calculated, that victim feedforward entry 901 is stored in victim feedforward value buffer 775 and the corresponding servo wedge number 902 for that victim feedforward value 901 is a unique wedge index value indicating servo wedge N.

According to such embodiments, a particular victim feedforward entry 901 is asserted at a servo wedge that does not circumferentially correspond to the servo wedge indicated by the servo wedge number 902 for that particular victim feedforward entry 901. Instead, in such embodiments, a particular victim feedforward entry 901 is asserted at a servo wedge that is circumferentially offset by a preset wedge offset value from the servo wedge indicated by the servo wedge number 902. For example, when the aggressor head passes over a servo wedge N, an aggressor VCM command is calculated in next aggressor VCM command calculation 413 for servo wedge N. Then, in a feedforward value calculation and storing operation, a victim feedforward value is calculated and is stored in victim feedforward value buffer 775 as a victim feedforward entry 901, along with an associated servo wedge number 902 (such as a unique wedge index value indicating servo wedge N). In the example, that victim feedforward entry 901 is asserted in response to the victim head passing over a servo wedge on the recording surface associated with the victim actuator that is circumferentially offset from servo wedge N by the preset wedge offset value. Thus, that victim feedforward entry 901 is not asserted in response to the victim head passing over servo wedge N on the recording surface associated with the victim actuator, and instead is asserted at a later servo wedge. For example, when the wedge offset value is set to 1, that victim feedforward entry 901 is asserted in response to the victim head passing over servo wedge N+1 on the recording surface associated with the victim actuator. Similarly, when the wedge offset value is set to 2, that victim feedforward entry 901 is asserted in response to the victim head passing over servo wedge N+2 on the recording surface associated with the victim actuator. Generally, the preset wedge offset value for an HDD is an integral value from one to the number of wedges in a revolution of the disk.

In this way, a victim feedforward value that is calculated and stored in feedforward value calculation and storing operation 527 for servo wedge N is asserted in victim actuator command assertion 526 for a subsequent servo wedge, such as servo wedge N+1 or N+2. Thus, a victim feedforward value is generated based on position information collected when the aggressor head passes over a first servo wedge of the recording surface associated with the aggressor head, and the victim feedforward value is asserted in response to the victim head passing over a second servo wedge of the recording surface associated with the victim head, where the second servo wedge does not circumferentially correspond to the first servo wedge.

In alternative embodiments, each servo wedge number 902 stored in victim feedforward value buffer 775 indicates a respective servo wedge of a recording surface associated with the victim actuator. In one such embodiment, the servo wedge number 902 for a particular victim feedforward entry 901 indicates the servo wedge to be passed over by the victim head prior to that particular victim feedforward value being asserted. In such an embodiment, the servo wedge to be passed over by the victim head is circumferentially offset by a preset wedge offset value from an aggressor servo wedge, which is a servo wedge of the recording surface associated with the aggressor head. Specifically, in this embodiment, the aggressor servo wedge is the servo wedge from which the most recent position information was collected for the aggressor head on which an aggressor VCM control signal is based that is included in the VCM control signals used to generate the particular victim feedforward entry 901. Thus, in such an embodiment, the aggressor servo wedge is the last servo wedge of the recording surface from which aggressor head position information has been collected that is included in the calculation of the particular victim feedforward entry 901.

For example, in one such embodiment, when the victim head passes over a servo wedge N, a particular victim feedforward entry 901 is employed during the next calculation of the victim microactuator command for servo wedge N. That particular victim feedforward value is calculated based on a plurality of aggressor VCM commands asserted prior to the victim head passing over servo wedge N (for example when the aggressor head passes over servo wedge N−1, N−2, etc.). That is, the particular victim feedforward entry 901 is calculated based on a plurality of aggressor VCM commands, the most recent of which is generated in response to the aggressor head passing over a servo wedge that is 1) circumferentially offset by a wedge offset value from servo wedge N and 2) is passed over by the aggressor head prior to the victim head passing over servo wedge N. Thus, when the wedge offset value is set to one, the particular victim feedforward entry 901 stored in victim feedforward value buffer 775 that is associated with servo wedge N is generated based on position information that has been collected when the aggressor head passes over servo wedge N−1 and over previous servo wedges, but not on position information that has been collected when the aggressor passes over servo wedge N. Similarly, when the wedge offset value is set to two, that particular victim feedforward entry 901 stored in victim feedforward value buffer 775 is generated based on position information that has been collected when the aggressor head passes over servo wedge N−2 and a plurality of servo wedges preceding servo wedge N−2, but not on position information that has been collected when the aggressor passes over servo wedges N or N−1.

In the embodiment, the servo wedge indicated by the servo wedge number 902 for a particular victim feedforward entry 901 is a unique index value. The unique index value indicates a servo wedge passed over by the victim head (e.g., servo wedge N) that is offset by the wedge offset value (e.g., 2) from the servo wedge passed over by the aggressor head and associated with the determination of that particular victim feedforward entry 901 (e.g., servo wedge N−2). That is, in such an embodiment, the unique index value indicates the servo wedge to be passed over by the victim head immediately prior to that particular victim feedforward value being asserted. Therefore, as with the previously described embodiment for servo wedge number 902, a victim feedforward value is generated based on position information collected when the aggressor head passes over a first servo wedge of the recording surface associated with the aggressor head, and the victim feedforward value is asserted in response to the victim head passing over a second servo wedge of the recording surface associated with the victim head, where the second servo wedge does not circumferentially correspond to the first servo wedge and is circumferentially offset from the first servo by the wedge offset value.

In the embodiment illustrated in FIG. 9, victim feedforward value buffer 775 includes 11 or more victim feedforward entries 901 and corresponding servo wedge numbers 902. In other embodiments, victim feedforward value buffer 775 includes a number of victim feedforward entries 901 and servo wedge numbers 902 equal to or greater than the number of wedges associated with one revolution of a storage disk.

Returning to FIG. 7, second servo controller 716 is similar in configuration and operation to first servo controller 715. Second servo controller 716 generates a VCM control signal 744 (drive voltage or drive current) and a microactuator control signal 745 (drive voltage or drive current), and supplies VCM control signal 744 to the second actuator (VCM 128B) via a VCM driver circuit 713 and microactuator control signal 745 to a suitable microactuator 228 or 229 via MA driver circuit 317. In this way, second servo controller 716 positions read/write heads 127E-127H radially with respect to a corresponding one of recording surface 112E-127H. In some embodiments, second servo controller 716 includes a fine servo controller 781 that generates microactuator control signal 745, a coarse servo controller 782 that generates VCM control signal 744 and a victim feedforward signal generator 783 that generates a feedforward signal (not shown in FIG. 7) for modifying microactuator control signal 745.

Similar to victim feedforward signal generator 773, the functionality of victim feedforward signal generator 783 can be implemented in whole or in part as software- or firmware-implemented logic, and/or as hardware-implemented logic circuits. Further, in some embodiments, the functionality of victim feedforward signal generator 783 is distributed across multiple software- firmware- and/or hardware-entities. Operations performed by victim feedforward signal generator 783 to generate a victim feedforward value are described in greater detail below in conjunction with FIGS. 12A, 12B, and 13.

According to various embodiments, second servo controller 716 further includes an aggressor VCM command buffer 784, a victim feedforward value buffer 785, and a recent aggressor VCM command buffer 787. Aggressor VCM command buffer 784, victim feedforward value buffer 785, and recent aggressor VCM command buffer 787 facilitate the calculation and assertion of a victim feedforward signal by victim feedforward signal generator 783 in the same way (described above) that aggressor VCM command buffer 774, victim feedforward value buffer 775, and recent aggressor VCM command buffer 777 facilitate the calculation and assertion of a victim feedforward signal by victim feedforward signal generator 773. In some embodiments, aggressor VCM command buffer 784, victim feedforward value buffer 785, and/or recent aggressor VCM command buffer 787 are implemented as a FIFO memory device, a circular buffer, or any other suitable memory device that can be accessed with sufficient speed to enable embodiments described herein.

In the embodiment described above, first servo controller 715 and second servo controller 716 each generate a feedforward signal for modifying a microactuator signal. In alternative embodiments, CPU 701 generates a feedforward signal for modifying microactuator signal 742 and another feedforward signal for modifying microactuator signal 745. Thus, in some embodiments, first servo controller 715 and second servo controller 716 are implemented in whole or in part in firmware running on CPU 701. In embodiments in which microprocessor-based controller 133 includes multiple CPUs, such firmware can run on one or more of the multiple CPUs.

In the embodiment described above, aggressor VCM command buffer 774, victim feedforward value buffer 775, and/or recent aggressor VCM command buffer 777 are included in or otherwise associated with first servo controller 715 and aggressor VCM command buffer 784, victim feedforward value buffer 785, and/or recent aggressor VCM command buffer 787 are included in or otherwise associated with second servo controller 716. In other embodiments, the functionality of aggressor VCM command buffer 774, victim feedforward value buffer 775, recent aggressor VCM command buffer 777, aggressor VCM command buffer 784, victim feedforward value buffer 785 and/or recent aggressor VCM command buffer 777 is included in RAM 134.

Fractional-Wedge Timing Compensation of Aggressor and Victim Actuators

Figure 10A:
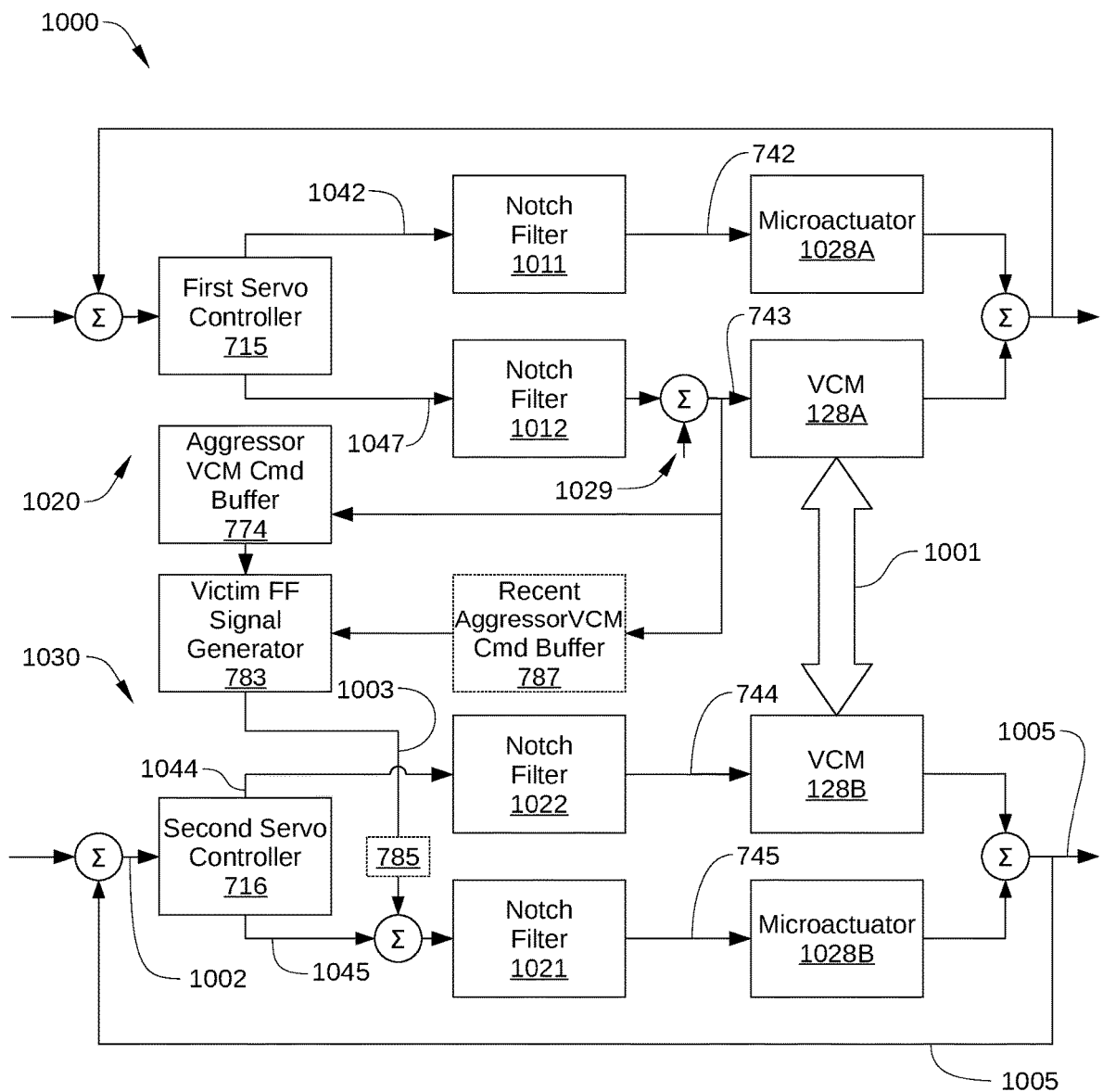
FIG. 10A is a control diagram illustrating the generation and application of a victim feedforward control signal in the hard disk drive of FIG. 1, according to various embodiments.

FIG. 10A is a control diagram 1000 illustrating the generation and application of a victim feedforward control signal in HDD 100, according to various embodiments. As shown, HDD 100 includes a first control loop 1020 associated with an aggressor actuator (in this example VCM 128A) and a second control loop 1030 associated with a victim actuator (in this example VCM 128B). In conjunction, first control loop 1020 and second control loop 1030 enable fractional-wedge timing compensation in the application of the victim feedforward control signal.

First control loop 1020 includes VCM 128A, a microactuator 1028A for the currently active read/write head associated with VCM 128A, aggressor VCM command buffer 774, and first servo controller 715. In some embodiments, first control loop 1020 further includes a notch filter 1011 for modifying microactuator control signals 1042 for microactuator 1028A and/or a notch filter 1012 for modifying VCM control signals 1047 for VCM 128A to a filtered VCM control signal 743. In some embodiments, first control loop 1020 also includes an injection point 1029. Injection point 1029 is a point in first control loop 1020 at which a disturbance can be injected into control signals that are applied to VCM 128A (e.g., VCM control signal 743) as part of measuring a transfer function is described below in conjunction with FIG. 16.

Second control loop 1030 includes VCM 128B, a microactuator 1028B for the currently active head associated with VCM 128B, second servo controller 716, and victim feedforward signal generator 783. In some embodiments, second control loop 1030 further includes recent aggressor VCM command buffer 787, and in some embodiments second control loop 1030 further includes victim feedforward value buffer 785. Additionally or alternatively, in some embodiments, second control loop 1030 further includes a notch filter 1021 for modifying microactuator control signals 1045 for microactuator 1028B and/or a notch filter 1022 for modifying VCM control signals 1044 for VCM 128B.

Figure 10B:
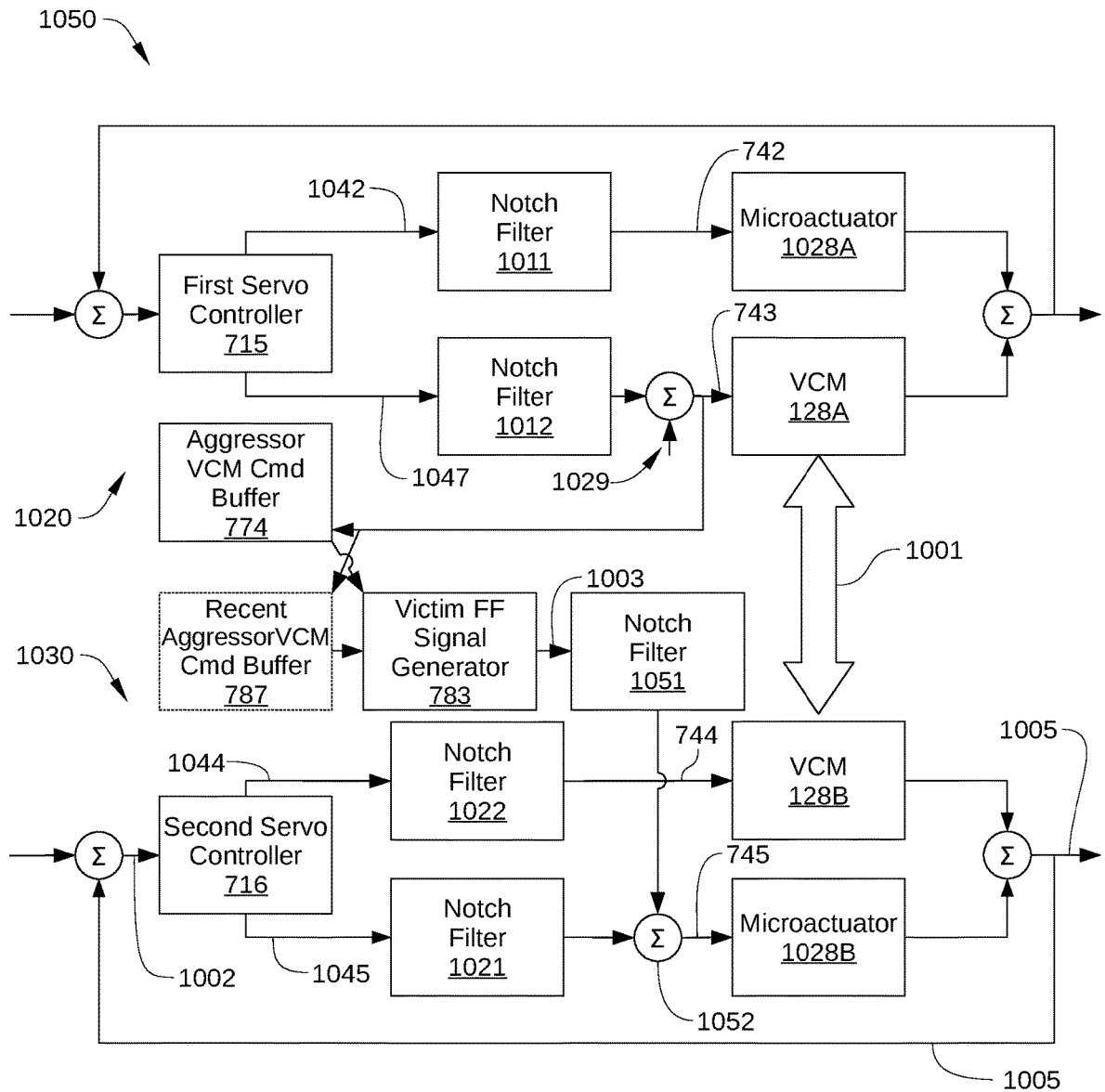
FIG. 10B is a control diagram illustrating the generation and application of a victim feedforward control signal in the hard disk drive of FIG. 1, according to various embodiments.

For clarity, VCM driver circuit 713 and MA driver circuit 717 are not shown in FIGS. 10A and 10B. Instead, the functionality of VCM driver circuit 713 is included in VCM 128A and 128B, while the functionality of MA driver circuit 717 is included in microactuator 1028A and 1028B. Further, in the embodiment illustrated in FIG. 10A, notch filters 1011 and 1012 are depicted as external to first servo controller 715 and recent aggressor VCM command buffer 787, victim feedforward signal generator 783, and notch filters 1021 and 1022 are depicted as external to second servo controller 716. In other embodiments, notch filters 1011 and/or 1012 may be implemented conceptually or physically as part of first servo controller 715, and recent aggressor VCM command buffer 787, victim feedforward signal generator 783, and/or notch filters 1021 and 1022 may be implemented conceptually or physically as part of second servo controller 716.

During operation, first servo controller 715 generates VCM control signal 743 (or alternatively VCM control signal 1047, on which VCM control signal 743 is based) for VCM 128A and microactuator control signal 742 (or alternatively microactuator control signal 1042, on which microactuator control signal 742 is based) for microactuator 1028A. Alternatively, CPU 701 generates microactuator control signal 742 for microactuator 1028A. Because of mechanical coupling 1001 between VCM 128A and VCM 128B, operations performed by VCM 128A in response to VCM control signal 743 cause a radial displacement of the currently active read/write head associated with VCM 128B. This radial displacement contributes to position error signal (PES) 1002 based on the radial position 1005 of the currently active read/write head associated with VCM 128B.

According to various embodiments, victim feedforward signal generator 783 generates a victim feedforward signal 1003, based on a transfer function. In some embodiments, the transfer function models commands added to microactuator control signal 745 for microactuator 1028B (the victim microactuator) as a function of VCM control signal 743 for VCM 128A (the aggressor actuator). Example embodiments for the determination of such a transfer function are described below in conjunction with FIGS. 15-17. Victim feedforward signal generator 783 in second servo controller 716 receives information about VCM control signal 1047 or VCM control signal 743 from first servo controller 715 via a communication link between first servo controller 715 and second servo controller 716 (shown in FIG. 7). The information about VCM control signal 1047 or VCM control signal 743 is associated with a first servo wedge. In some embodiments, feedforward signal 1003 values (for example, victim feedforward entries 901 and servo wedge numbers 902) are then stored in victim feedforward value buffer 785 and added to a subsequent microactuator control signal 1045 (or alternatively microactuator control signal 745, which is based on microactuator control signal 1045) associated with a second servo wedge that is passed over by the victim head subsequent to the aggressor head passing over the first servo wedge. In some embodiments, victim feedforward value buffer 785 may be included in, for example, victim feedforward signal generator 783 or in second servo controller 716.

Feedforward signal 1003, when added to the appropriate microactuator control signal 1045 (or alternatively to microactuator control signal 745, which is based on microactuator control signal 1045), reduces or compensates for contributions to radial position 1005 caused when VCM control signal 743 (which is based on VCM control signal 1047) is applied to VCM 128A. Victim feedforward entries 901 are employed based on the corresponding servo wedge number 901 in victim feedforward value buffer 785. As a result, the use of a particular victim feedforward entry 901 is timed to be used for an appropriate servo wedge that is crossed by the victim head (the second servo wedge) after the aggressor head has passed over a servo wedge (the first servo wedge) that is used to generate the particular victim feedforward entry 901.

Alternatively, in some embodiments, a suitable victim feedforward value is generated by victim feedforward signal generator 783 immediately before being added to the appropriate microactuator control signal 1045 and storage of victim feedforward values for one or more servo wedges is not needed. For example, in such embodiments, victim feedforward value buffer 785 is not employed. Instead, a victim feedforward value used to modify microactuator control signal 1045 (or alternatively, microactuator control signal 745, which is based on microactuator control signal 1045) that is asserted by the victim actuator for servo wedge N is calculated shortly before the victim actuator command is asserted for servo wedge N. In such embodiments, the victim feedforward value is based on aggressor actuator commands that are associated with servo wedges prior to servo wedge N, the most recent of which precedes servo wedge N by the wedge offset value for HDD 100. In such embodiments, one or more of the most recent aggressor actuator commands that are employed to generate the victim feedforward value may be stored in recent aggressor VCM command buffer 787.

In some embodiments, the transfer function for determining feedforward signal 1003, referred to herein as the feedforward transfer function, is determined as the ratio of two transfer functions that can be directly measured in the multi-actuator drive: a first transfer function modeling radial position 1005 as a function of filtered VCM control signal 743 for VCM 128A and a second transfer function modeling radial position 1005 as a function of commands 1003 that are added to microactuator control signal 1045 or microactuator control signal 745. In such embodiments, the first and second transfer functions can be determined in HDD 100 as part of a calibration/start-up process or during factory tuning of the drive. For example, in one such embodiment, values associated with the first transfer function are determined by adding various values to filtered VCM control signal 743 and measuring the resultant radial position 1005 of the victim read/write head. Similarly, values associated with the second transfer function are determined by adding various values of feedforward signal 1003 to microactuator control signal 745 and measuring the resultant radial position 1005 of the victim read/write head. In some embodiments, the second transfer function is determined by adding various values of feedforward signals directly to microactuator control signal 745. In alternative embodiments, the second transfer function is determined by adding various values of feedforward signals to the input of notch filter 1021, the output of which is microactuator control signal 745. The latter embodiment is shown in FIG. 10A. The second transfer function is determined using the same injection point that will be used to inject feedforward during operation of the HDD 100. Example embodiments for the determination of the feedforward transfer function are described below in conjunction with FIG. 16, example embodiments for the determination of the first transfer function are described below in conjunction with FIG. 17, and example embodiments for the determination of the second transfer function are described below in conjunction with FIG. 18.

In some embodiments, victim feedforward signal 1003 is generated using a kernel that is derived based on the feedforward transfer function. In such embodiments, values associated with the feedforward transfer function are determined by taking a ratio of the above-described first and second transfer functions (e.g., the first transfer function divided by the second transfer function), where the kernel is the inverse discrete Fourier transform (DFT) of the values associated with the feedforward transfer function. Subsequently, victim feedforward signal generator 783 can convolve values for filtered VCM control signal 743 with the kernel to generate feedforward signal 1003.

In the embodiment illustrated in FIG. 10A, VCM 128A is described as the aggressor actuator and VCM 128B is described as the victim actuator. In other instances, VCM 128B can operate as the aggressor actuator and VCM 128A can operate as the victim actuator. In such instances, victim feedforward signal generator 773 (shown in FIG. 7) generates a feedforward signal similar to feedforward signal 1003 and provides that feedforward signal to microactuator 1028A as a correction signal. In normal practice, VCM 128A and VCM 128B act as both the aggressor actuator and the victim actuator simultaneously.

In the embodiment illustrated in FIG. 10A, victim feedforward signal generator 783 is implemented as an element of HDD 100 that is separate from first servo controller 715 and second servo controller 716. Alternatively, victim feedforward signal generator 783 is implemented as a component of first servo controller 715, a component of second servo controller 716, or a component of both first servo controller 715 and second servo controller 716. Similarly, in instances in which VCM 128B is the aggressor actuator and VCM 128A is the victim actuator, victim feedforward signal generator 773 can be implemented as an element of HDD 100 that is separate from first servo controller 715 and second servo controller 716, as a component of first servo controller 715, a component of second servo controller 716, or a component of both first servo controller 715 and second servo controller 716.

In embodiments in which multiple read/write heads are coupled to a victim actuator, such as VCM 128A or VCM 128B, the above-described feedforward transfer function for determining feedforward signal 1003 typically varies for each such read/write head. That is, mechanical coupling 1001 between an aggressor actuator and a victim actuator can result in a different contribution to radial position 1005 of a victim head, depending on the victim head. For example, referencing the embodiment illustrated in FIG. 2, actuation of actuator arm assembly 120A can affect radial position 1005 for each of read/write heads 227E, 227F, 227G, and 227H differently. In such embodiments, a different feedforward transfer function for determining feedforward signal 1003 is determined for each read/write head 127 included in HDD 100. A process for determining different feedforward transfer functions for each read/write head 127 of HDD 100 is described below in conjunction with FIG. 16-18.

In some embodiments, first control loop 1020 includes notch filter 1011 and/or notch filter 1012 and second control loop 1030 includes notch filter 1021 and/or notch filter 1022. In such embodiments, notch filters 1012 and 1022 may be band-stop filters configured to block or attenuate portions of input signals that are likely to excite one or more resonances in or associated with VCM 128A and 128B, respectively. For first control loop 1020, properly-designed notch filters 1011 and 1012, in combination with other elements in first servo controller 715 and the mechanical system including microactuator 1028A and VCM 128A, can result in a stable servo control-loop. Without the notch filters, first control loop 1020 might be unstable, or only marginally stable. Similarly, for second control loop 1030, properly-designed notch filters 1021 and 1022 facilitate a stable servo control-loop. For example, one or more bands of an input signal, such as VCM control signal 742 or 744, are reduced in amplitude when processed by notch filter 1012 or 1022. Notch filters 1011 and 1021 are configured to remove or reduce portions of input signals that are likely to excite one or more resonances in or associated with microactuators 1028A and 1028B, respectively.

In the embodiment described above, notch filters 1011, 1012, 1021, and 1022 are employed to eliminate or greatly attenuate certain frequency components. Alternatively or additionally, in some embodiments, one or more of notch filters 1011, 1012, 1021, and 1022 are configured to modify the phase of a signal and/or to increase the gain of a signal at certain frequencies. Such filters are sometimes called "phase steering" or "loop-shaping" filters, and can be used to stabilize a system using calculations that are similar or identical to calculations included in notch filters that are designed to eliminate or greatly attenuate certain frequency components. Alternatively, in some embodiments, one or more of notch filters 1011, 1012, 1021, and 1022 are omitted from first control loop 1020 and/or second control loop 1030, and/or are included in victim feedforward signal generator 783.

FIG. 10B is a control diagram 1050 illustrating the generation and application of a victim feedforward control signal in HDD 100, according to various embodiments. Control diagram 1050 is substantially similar to control diagram 1000 in FIG. 10A, with two exceptions. First, control diagram 1050 includes a notch filter 1051 that is configured to process the output of victim feedforward signal generator 783 and victim feedforward value buffer 785, i.e., victim feedforward signal 1003. For clarity, victim feedforward value buffer 785 is omitted from FIG. 10B, but can be located between victim feedforward signal generator 783 and notch filter 1051. Second, victim feedforward signal 1003, after being modified by notch filter 1051, is added to microactuator control signal 745 in a different location, i.e., a summer 1052 disposed between notch filter 1021 and microactuator 1028A.

Victim Feedforward Signal Generation

As described above, victim feedforward signal generator 773 and victim feedforward signal generator 783 are each configured to generate a victim feedforward signal (for example victim feedforward signal 1003) for the current victim head in HDD 100. In some embodiments, such a victim feedforward signal is based on not only a transfer function specific to the current victim head, but also on a timing offset between the victim head and the aggressor head. One such embodiment is described below in conjunction with FIG. 11.

Figure 11:
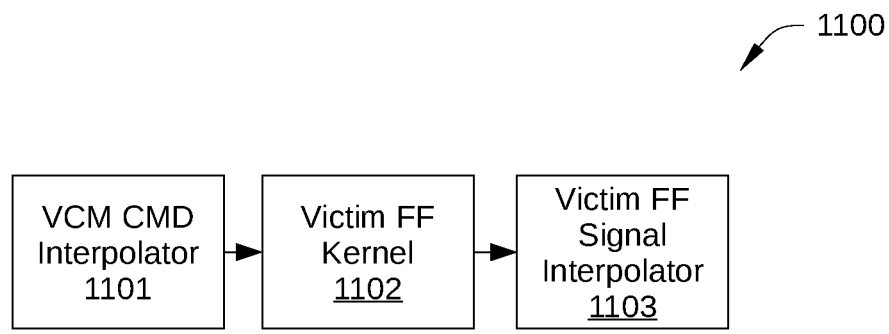
FIG. 11 is a more detailed block diagram of a victim feedforward signal generator of a servo control loop, according to various embodiments.

FIG. 11 is a more detailed block diagram of a victim feedforward signal generator 1100, according to various embodiments. For example, victim feedforward signal generator 1100 can be implemented as victim feedforward signal generator 773 and as victim feedforward signal generator 783 in HDD 100. In the embodiment illustrated in FIG. 11, victim feedforward signal generator 1100 includes a VCM command interpolator 1101, a victim feedforward kernel 1102, and a victim feedforward signal interpolator 1103. In some alternative embodiments, victim feedforward signal generator 1100 does not include VCM command interpolator 1101, and in some alternative embodiments victim feedforward signal generator 1100 does not include victim feedforward signal interpolator 1103.

Victim feedforward kernel 1102 is a kernel for a specific victim head and is derived based on the feedforward transfer function for that specific victim head. Generally, victim feedforward kernel 1102 is configured to generate a victim feedforward signal or signals (e.g., victim feedforward signal 1003 in FIG. 10A) based on aggressor VCM commands/control signals and on a set of values derived from the appropriate feedforward transfer function for the victim head. For example, in some embodiments, victim feedforward kernel 1102 generates a victim feedforward signal or signals based on VCM command entries 801 of FIG. 8A or 8B. Generation of a set of values for victim feedforward kernel 1102 for a specific victim head is described below in conjunction with FIG. 16.

VCM command interpolator 1101 is configured to modify VCM command values prior to use by victim feedforward kernel 1102 based on the timing offset between the victim head and the aggressor head. As described above, the timing offset between the victim head and the aggressor head can change over the lifetime of HDD 100, and/or the aggressor head can have a different timing offset with the victim head than the base aggressor head that was used when determining victim feedforward kernel 1102. In either case, the modified VCM command values generated by VCM command interpolator 1101 are selected to compensate for such timing offsets between the victim head and the aggressor head. For example, in some embodiments, VCM command interpolator 1101 generates a modified VCM command value for use by victim feedforward kernel 1102 by interpolating between two calculated VCM command values. Such embodiments are described below in conjunction with FIGS. 12A and 12B.

Figure 12A:
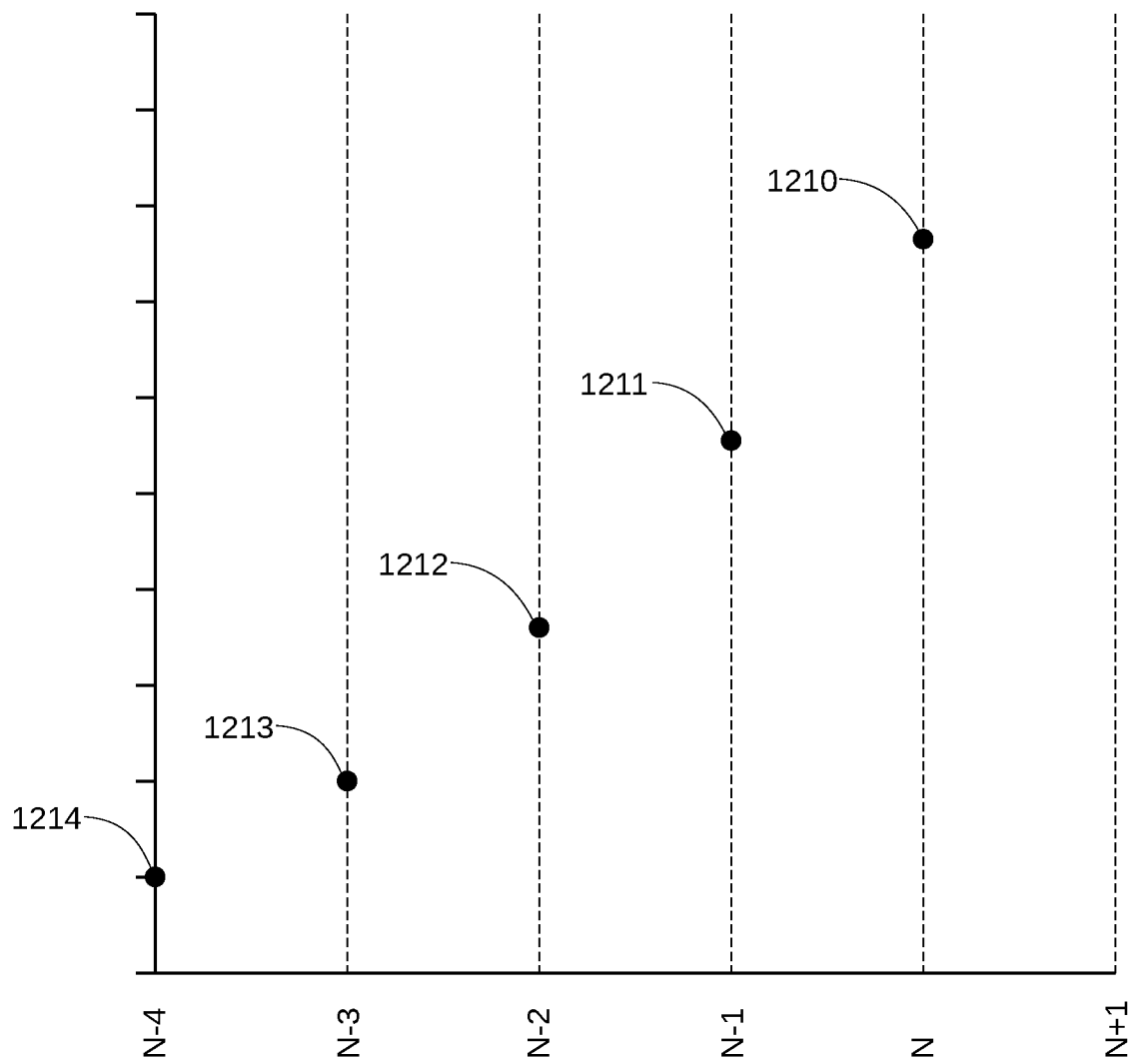
FIG. 12A is a plot of VCM command values determined for a portion of an aggressor seek performed by an aggressor head when there is no timing offset between the aggressor head and the victim head, according to various embodiments

FIG. 12A is a plot of VCM command values 1200 determined for a portion of an aggressor seek performed by an aggressor head when there is no timing offset between the aggressor head and the victim head, according to various embodiments. Each of VCM command values 1200 is associated with a different corresponding servo wedge number (e.g., N−4, N−3, N−2, N−2, N−1, or N). For example, VCM command values 1200 can correspond to VCM command entries 801 of FIG. 8A, and servo wedge numbers N−4 through N correspond to servo wedge numbers 802 of FIG. 8A. Thus, when the aggressor head crosses servo wedge N−4, a VCM command value 1214 is calculated, asserted by the aggressor actuator (for example by the aggressor VCM), and stored (for example in aggressor VCM command buffer 774 in FIG. 8A) as one of VCM command entries 801. Similarly, when the aggressor head crosses servo wedge N−3, a VCM command value 1213 is calculated, asserted, and stored; when the aggressor head crosses servo wedge N−2, a VCM command value 1212 is calculated, asserted, and stored; when the aggressor head crosses servo wedge N−1, a VCM command value 1211 is calculated, asserted, and stored; and when the aggressor head crosses servo wedge N, a VCM command value 1210 is calculated, asserted, and stored.

In some instances, the transfer function for determining the values included in victim feedforward kernel 1102 for the victim head accurately takes into account the timing relationship (e.g., the timing offset) between the victim head and the aggressor head. As a result, in such instances, VCM command interpolator 1101 does not modify VCM command values 1200. For example, in some instances, neither the victim head nor the aggressor head have undergone a significant timing shift since measurements for determining the transfer function were performed. In such instances, when the aggressor head is the base aggressor head used when determining victim feedforward kernel 1102 for the current victim head, VCM command interpolator 1101 does not modify VCM command values 1200, even when a significant timing offset is present between the victim head and the aggressor head (such as a timing offset 600 of FIG. 6). This is because the victim head can be assumed to cross servo wedge N on the victim head recording surface with an initial timing offset from when the aggressor head crosses servo wedge N on the aggressor head recording surface. Because the effects of the initial timing offset between a particular victim head and the base aggressor head are accounted for in victim feedforward kernel 1102 for the particular victim head, in such an instance, VCM command interpolator 1101 does not modify VCM command values 1200.

By contrast, in many instances there is a timing relationship difference between the victim head and the aggressor head performing the aggressor seek associated with VCM command values 1200. In some embodiments, in such instances VCM command values 1200 are modified by VCM command interpolator 1101 to compensate for such a timing relationship difference. One such embodiment is described below in conjunction with FIG. 12B.

Figure 12B:
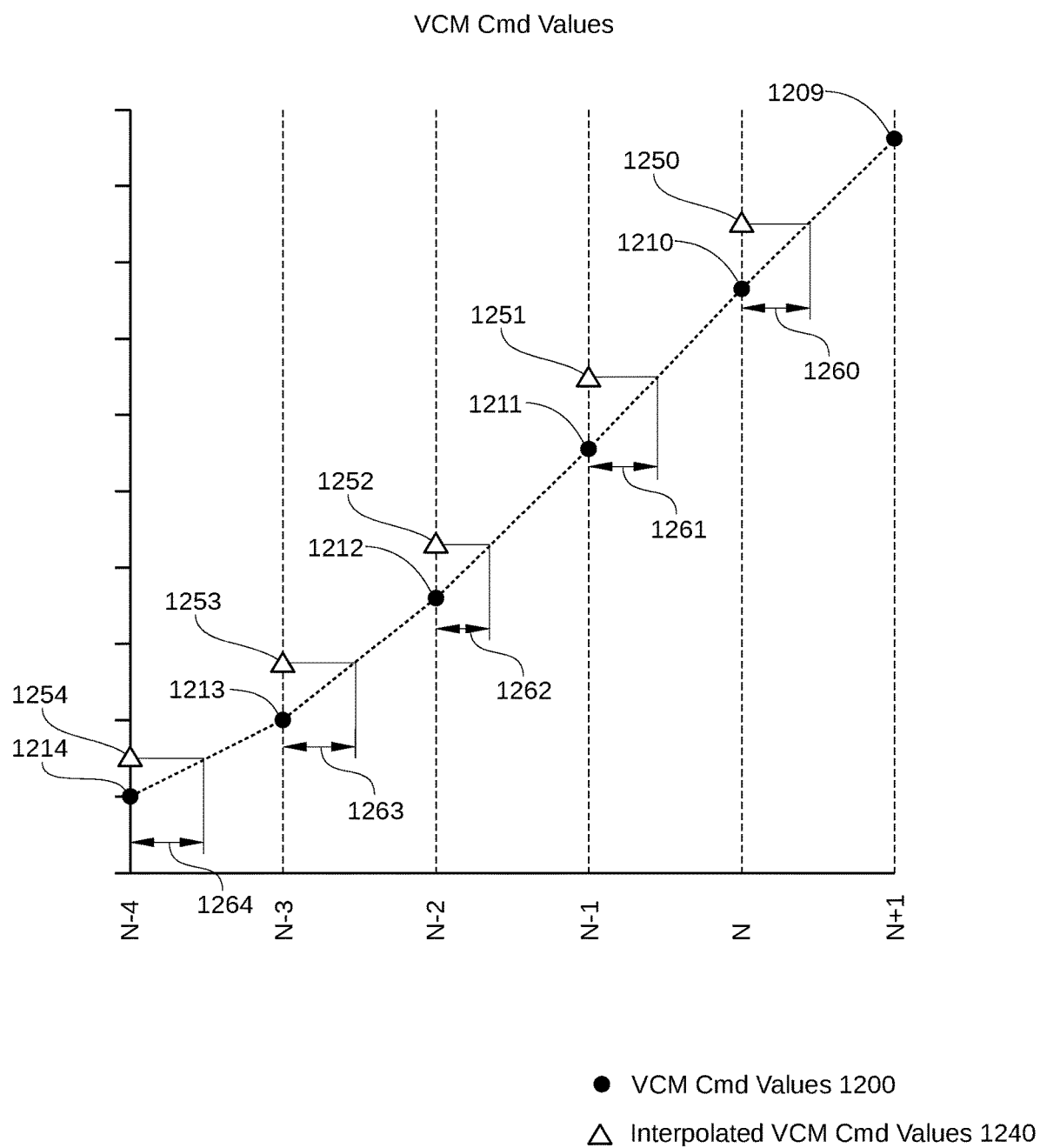
FIG. 12B is a plot of VCM command values that are initially calculated for an aggressor seek and interpolated VCM command values that are actually used for determine a victim feedforward signal, according to various embodiments.

FIG. 12B is a plot of VCM command values 1200 that are initially calculated for an aggressor seek and interpolated VCM command values 1250-1254 (referred to collectively as interpolated VCM command values 1240) that are actually used to determine a victim feedforward signal, according to various embodiments. Specifically, interpolated VCM command values 1240 for the aggressor seek are employed to compensate for certain timing relationship differences between the victim head and the aggressor head. One example of such a timing relationship difference is a timing shift that is experienced by the aggressor head, for example due to a circumferential displacement or other circumferential misalignment of the aggressor head. Such a timing shift alters the timing offset between the victim head and the aggressor head from an initial timing offset (such as an initial timing offset 600 in FIG. 6). Another example of such a timing relationship difference is a timing offset between the aggressor head and the base aggressor head that was used when determining victim feedforward kernel 1102, because victim feedforward kernel 1102 is configured based on the assumption that the aggressor head has identical timing to that of the base aggressor head.

In the embodiment illustrated in FIG. 12B, there is a timing relationship difference between the victim head and the aggressor head that is not accounted for by the victim feedforward kernel 1102 for the current victim head. In some instances, the timing relationship difference is a timing shift that is experienced by the aggressor head, and in other instances, the timing relationship difference is a timing offset between the aggressor head and the base aggressor head. As noted above, the timing relationship difference causes the transfer functions on which victim feedforward kernel 1102 is based to be less accurate, and the victim feedforward signal 1003 generated by victim feedforward kernel 1102 is less effective at canceling the effect of aggressor disturbances on victim head position. According to various embodiments, interpolated VCM command values 1240 are used by victim feedforward kernel 1102 instead of VCM command values 1200 to compensate for such a timing relationship difference between the victim head and the aggressor head.

In FIG. 12B, VCM command values 1200 are calculated for an aggressor seek. Victim feedforward kernel 1102 generates a victim feedforward signal 1003 based on a transfer function that assumes there is no timing shift, timing offset, or other timing relationship difference between the current victim head and the aggressor head that affects the accuracy of victim feedforward kernel 1102. However, in the instance illustrated in FIG. 12B, there is a timing offset 1260 that is indicated by a horizontal displacement between an assumed time that the aggressor head crosses wedge N and an actual time the aggressor head crosses wedge N. For example, timing offset 1260 can be caused by the aggressor head being a different head than the base aggressor head used to determine victim feedforward kernel 1102. Alternatively or additionally, timing offset 1260 can be caused by a timing shift that is experienced by the aggressor head. In the instance illustrated in FIG. 12B, the aggressor head crosses each servo wedge earlier than a time assumed by victim feedforward kernel 1102.

Similarly, in FIG. 12B there is a timing offset 1261 between an assumed time that the aggressor head crosses wedge N−1 and an actual time the aggressor head crosses wedge N−1, a timing offset 1262 between an assumed time that the aggressor head crosses wedge N−2 and an actual time the aggressor head crosses wedge N−2, a timing offset 1263 between an assumed time that the aggressor head crosses wedge N−3 and an actual time the aggressor head crosses wedge N−3, and a timing offset 1264 between an assumed time that the aggressor head crosses wedge N−4 and an actual time the aggressor head crosses wedge N−4. In the instance illustrated in FIG. 12B, timing offset 1260, timing offset 1261, timing offset 1262, timing offset 1263, and timing offset 1264 are substantially equal in magnitude, but in other embodiments, each timing offset can have a different magnitude for each servo wedge of a recording surface.

According to various embodiments, VCM command interpolator 1101 determines interpolated VCM command values 1240 (denoted by triangles) based on VCM command values 1200 (denoted by circles) and corresponding timing offsets. In some embodiments, an interpolated VCM command value 1240 for a particular servo wedge is linearly interpolated from the VCM command value determined for that servo wedge and the VCM command value determined for an adjacent servo wedge. In such embodiments, the magnitude of the timing offset at that particular servo wedge indicates where along the interpolation function the particular interpolated VCM command value 1240 lies. For example, in some embodiments, interpolated VCM command value 1250 is based on a VCM command value 1209 calculated for servo wedge N+1, VCM command 1210 calculated for servo wedge N, and timing offset 1260; interpolated VCM command value 1251 is based on a VCM command value 1210 calculated for servo wedge N, VCM command 1211 calculated for servo wedge N−1, and timing offset 1261; interpolated VCM command value 1252 is based on a VCM command value 1211 calculated for servo wedge N−1, VCM command 1212 calculated for servo wedge N−2, and timing offset 1262; and so on.

In an embodiment illustrated in FIG. 12B, interpolated VCM command value 1250 is linearly interpolated from VCM command value 1209 and VCM command 1210 using timing offset 1260. In other embodiments, interpolated VCM command value 1250 for servo wedge N is determined using any other technically feasible interpolation between VCM command value 1209 (calculated for servo wedge N+1) and VCM command value 1210 (calculated for servo wedge N), or including VCM command values from earlier wedges. Alternatively, in an instance in which the value of timing offset 1260 is negative, the aggressor head crosses each servo wedge later than assumed by victim feedforward kernel 1102. In some embodiments, in such an instance, interpolated VCM command value 1250 for servo wedge N is determined using any technically feasible interpolation between VCM command value 1210 (calculated for servo wedge N), VCM command 1211 (calculated for servo wedge N−1) and timing offset 1260.

In the embodiment described above in conjunction with FIG. 12B, a single VCM command value 1200 is associated with each servo wedge, and VCM command interpolator 1101 generates a single interpolated VCM command value 1240 for each servo wedge. Thus, FIG. 12B depicts the generation of interpolated VCM command values 1240 for a single-rate control system. In other embodiments, VCM command interpolator 1101 is configured for operating in conjunction with a multi-rate control system, and therefore generates multiple interpolated VCM command values 1240 for each servo wedge. In such embodiments, for each servo wedge, there are, for example, L associated multi-rate VCM command values. Consequently, VCM command interpolator 1101 generates L interpolated multi-rate VCM command values 1240 for each servo wedge, where the first interpolated multi-rate VCM command value 1240 for a servo wedge is based on the first multi-rate VCM command value determined for that servo wedge and the first multi-rate VCM command value determined for an adjacent servo wedge; the second interpolated multi-rate VCM command value 1240 for the servo wedge is based on the second multi-rate VCM command value determined for that servo wedge and the second multi-rate VCM command value determined for the adjacent servo wedge, and so on to the $L^{th}$ multi-rate VCM command value determined for that servo wedge.

Returning to FIG. 11, victim feedforward signal interpolator 1103 is configured to modify values of a victim feedforward signal prior to being stored and added to a subsequent microactuator control signal. For example, in some embodiments, victim feedforward signal interpolator 1103 modifies values of victim feedforward signal 1003 (shown in FIGS. 10A and 10B) before the values of victim feedforward signal 1003 are stored in victim feedforward value buffer 785 (shown in FIG. 8A) and added to microactuator control signal 1045 (shown in FIG. 10A). Similar to how VCM command interpolator 1101 modifies VCM command values prior to use by victim feedforward kernel 1102 based on the timing offset between the victim head and the aggressor head, victim feedforward signal interpolator 1103 modifies values of a victim feedforward signal based on the timing offset between the victim head and the aggressor head. Such embodiments are described below in conjunction with FIG. 13.

Figure 13:
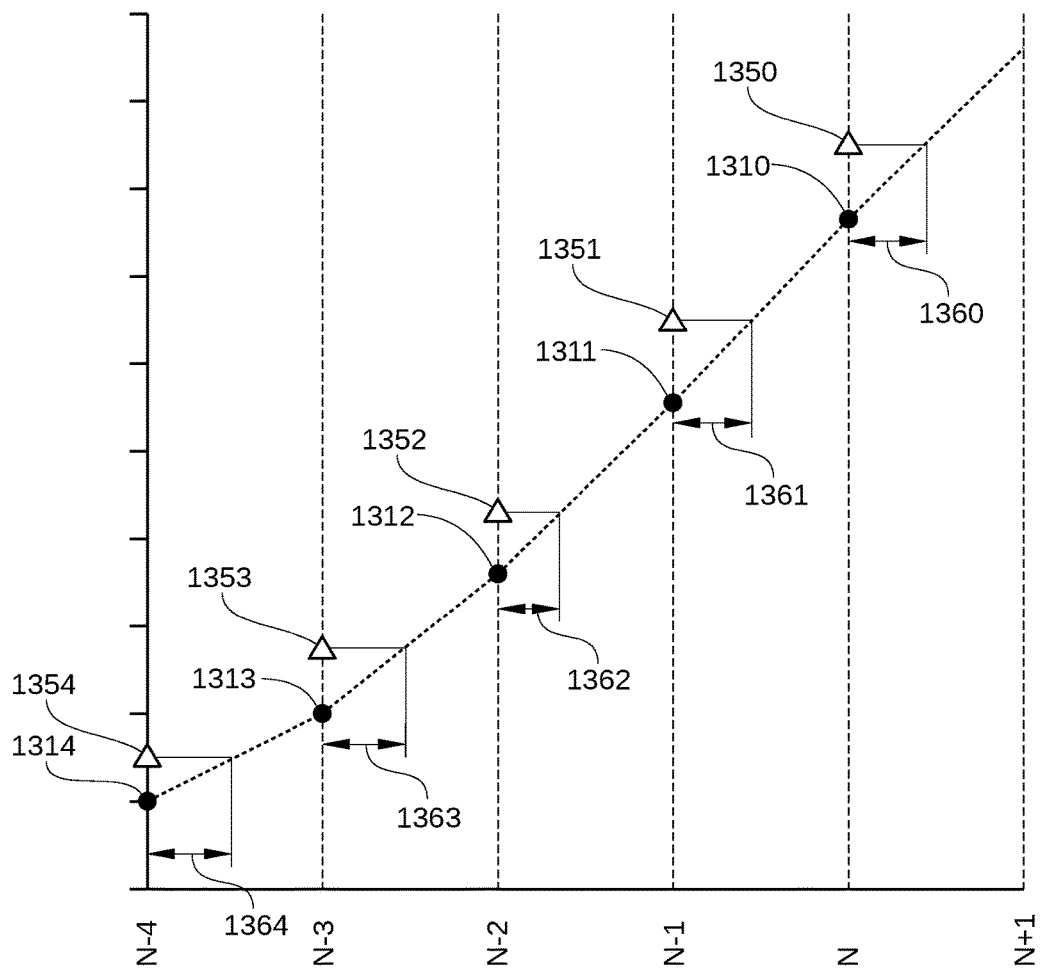
FIG. 13 is a plot of victim feedforward signal values and interpolated victim feedforward signal values, according to various embodiments.

FIG. 13 is a plot of victim feedforward signal values 1300 and interpolated victim feedforward signal values 1350-1354 (referred to collectively as interpolated victim feedforward signal values 1340), according to various embodiments. Victim feedforward signal values 1300 (denoted by circles) are initially calculated for controlling the position of a victim head that is disturbed by an aggressor seek, such as values of victim feedforward signal generated by victim feedforward kernel 1102 in FIG. 11. Interpolated victim feedforward signal values 1350-1354 (denoted by triangles) are signals that are actually used for controlling the position of a victim head that is disturbed by an aggressor seek instead of victim feedforward signal values 1300. Specifically, interpolated victim feedforward signal values 1340 are employed instead of victim feedforward signal values 1300 in order to compensate for certain timing relationship differences between the victim head and the aggressor head. One example of such a timing relationship difference is a timing shift that is experienced by the victim head, for example due to a circumferential displacement or other circumferential misalignment of the victim head. Such a timing shift alters the timing offset between the victim head and the aggressor head from an initial timing offset (such as an initial timing offset 600 in FIG. 6).

In some embodiments, when there is no timing relationship difference between the victim head and the aggressor head that is not accounted for by the victim feedforward kernel 1102 for the current victim head, victim feedforward signal values 1300 can be added to a microactuator control signal without being modified by victim feedforward signal interpolator 1103. By contrast, in the embodiment illustrated in FIG. 13, there is a timing relationship difference between the victim head and the aggressor head that is not accounted for by the victim feedforward kernel 1102 for the current victim head. As noted above, such a timing relationship difference can cause the transfer function on which victim feedforward kernel 1102 is based to be less accurate.

In FIG. 13, victim feedforward signal values 1300 are calculated for a victim head based on the assumption that there is no timing shift, timing offset, or other timing relationship difference between the current victim head and the aggressor head that affects the accuracy of victim feedforward kernel 1102. However, in the instance illustrated in FIG. 13, there is a timing offset 1360 that is indicated by a horizontal displacement between an assumed time that the aggressor head crosses wedge N and an actual time the aggressor head crosses wedge N (or alternatively, a timing offset between an assumed time that the victim head crosses a particular wedge and an actual time that the victim head crosses that wedge). Thus, the aggressor head crosses each servo wedge earlier than assumed by victim feedforward kernel 1102. That is, there is a timing offset 1360 that is indicated by a horizontal displacement in FIG. 13 between an assumed time that the aggressor head crosses wedge N and an actual time the aggressor head crosses wedge N. Similarly, in FIG. 13 there is a timing offset 1361 between an assumed time that the aggressor head crosses wedge N−1 and an actual time the aggressor head crosses wedge N−1, a timing offset 1362 between an assumed time that the aggressor head crosses wedge N−2 and an actual time the aggressor head crosses wedge N−2, a timing offset 1363 between an assumed time that the aggressor head crosses wedge N−3 and an actual time the aggressor head crosses wedge N−3, and a timing offset 1364 between an assumed time that the aggressor head crosses wedge N−4 and an actual time the aggressor head crosses wedge N−4. In the instance illustrated in FIG. 13, timing offset 1360, timing offset 1361, timing offset 1362, timing offset 1363, and timing offset 1364 are substantially equal in magnitude, but in other embodiments, each timing offset can have a different magnitude for each servo wedge.

According to various embodiments, victim feedforward signal interpolator 1103 determines each interpolated victim feedforward signal value 1340 based on victim feedforward signal values 1300 and a corresponding timing offset. In some embodiments, an interpolated victim feedforward signal value 1340 for a particular servo wedge is linearly interpolated from the victim feedforward signal value 1300 determined for that servo wedge and the victim feedforward signal value 1300 determined for an adjacent servo wedge. In such embodiments, the magnitude of the timing offset at that particular servo wedge indicates where along the interpolation function the particular interpolated victim feedforward signal value 1340 lies.

In an embodiment illustrated in FIG. 13, interpolated victim feedforward signal values 1340 are linearly interpolated from victim feedforward signal values 1300 based on timing offsets 1360-1364. In other embodiments, an interpolated victim feedforward signal value 1340 for a particular servo wedge is determined using any other technically feasible interpolation between the victim feedforward signal value 1300 for the servo wedge and the victim feedforward signal value 1300 for an adjacent servo wedge. Further, as described above for VCM command interpolator 1101, in some embodiments, victim feedforward signal interpolator 1103 is configured for operating in conjunction with a multi-rate control system, and therefore generates multiple interpolated victim feedforward signal values 1340 for each servo wedge.

Figure 14:
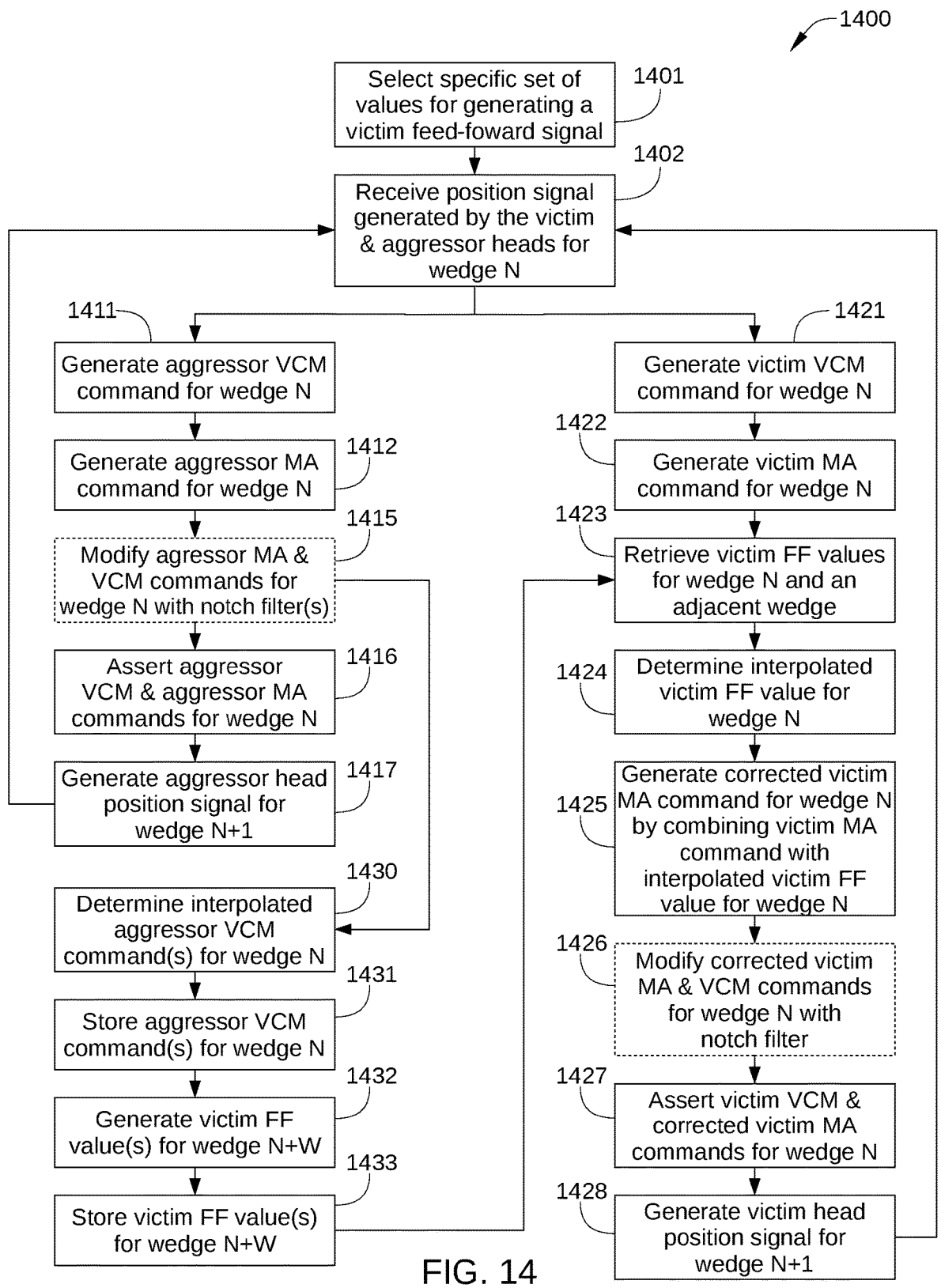
FIG. 14 sets forth a flowchart of method steps for controlling magnetic head position in a multi-actuator hard disk drive, according to an embodiment.

Using Interpolated Victim Feedforward Signal for Controlling Victim Head Position FIG. 14 sets forth a flowchart of method steps for controlling magnetic head position in a multi-actuator HDD, according to an embodiment. In some embodiments, the method steps are performed in HDD 100 during normal operation of HDD 100. Although the method steps are described in conjunction with HDD 100 of FIGS. 1-13, persons skilled in the art will understand that the method steps may be performed with other types of systems. The control algorithms for the method steps may reside in microprocessor-based controller 133, motor-driver chip 125, or a combination of both. The control algorithms can be implemented in whole or in part as software- or firmware-implemented logic, and/or as hardware-implemented logic circuits.

Figure 16:
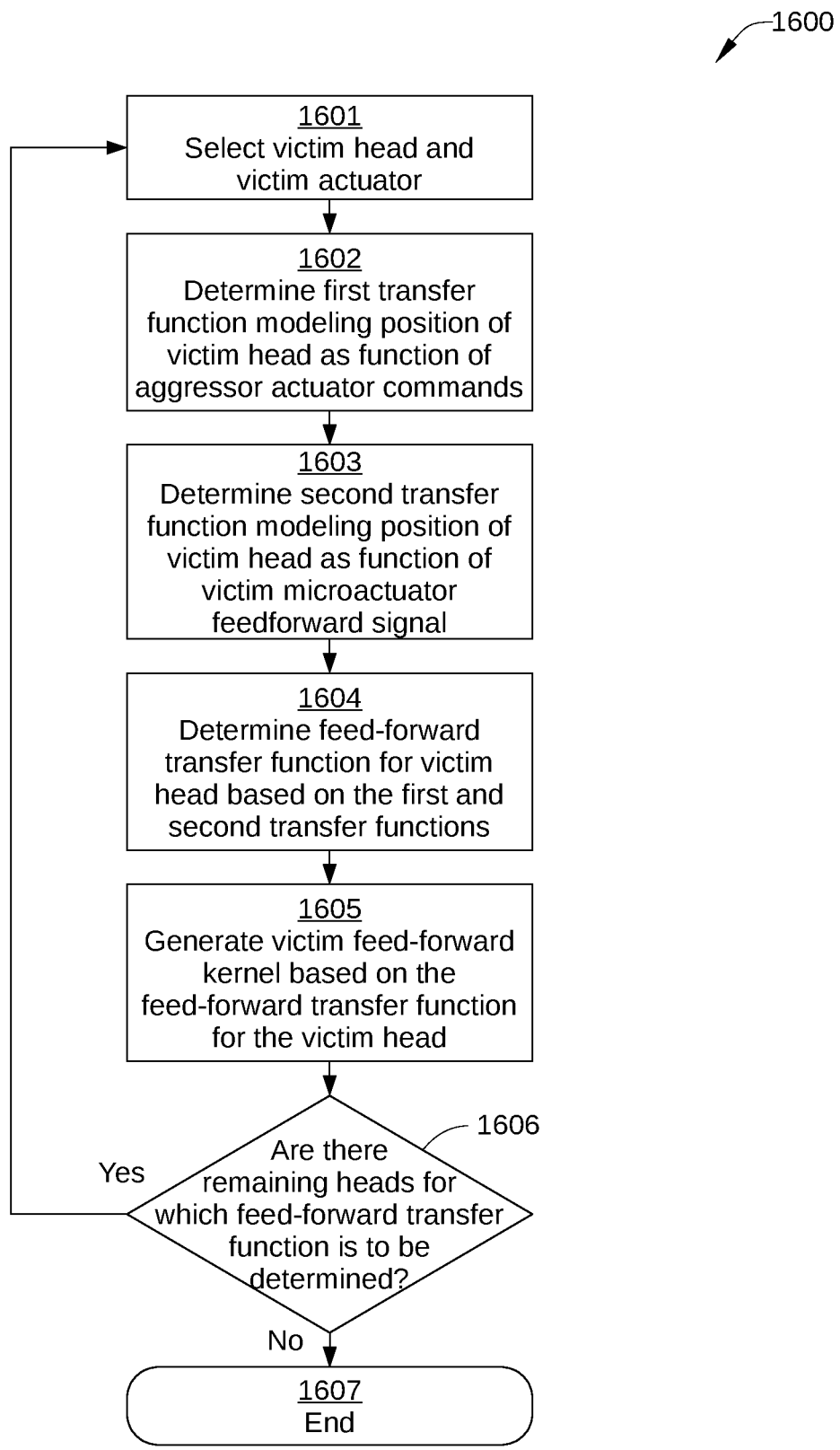
FIG. 16 sets forth a flowchart of method steps for determining values for a victim feedforward generator in a multi-actuator hard disk drive, according to an embodiment.

Prior to the method steps, values for a victim feedforward generator 783 of HDD 100 are determined, such as via method 1600 of FIG. 16. For example, in an embodiment in which HDD 100 includes N read/write heads 127, where N is a positive integer, at least N sets of values are determined and stored for use by victim feedforward generator 783. In the embodiment, each set of values corresponds to a kernel that is derived from a feedforward transfer function for a different read/write head 127. Thus, victim feedforward generator 783 can generate a different victim feedforward signal to a victim microactuator depending on which of the N read/write heads 127 of HDD 100 is currently the victim head. In such embodiments, the values for victim feedforward generator 783 for each of the N victim read/write heads 127 can be determined using the same base aggressor head. Therefore, in such embodiments, N sets of values are determined and stored for use by victim feedforward generator 783.

In some embodiments, prior to the method steps, M sets of values, where M is a positive integer, are determined and stored for use by victim feedforward generator 783 for each of the N read/write heads 127. For example, in one such embodiment, each of the M different sets of values for a particular read/write head 127 corresponds to a different temperature range in which HDD 100 may operate and for which a different victim feedforward transfer function is applicable. Thus, in the embodiment, victim feedforward generator 783 can generate M different victim feedforward signals 1003 for a single read/write head 127, depending on the temperature range in which HDD 100 is operating at the time. Alternatively or additionally, in some embodiments, prior to the method steps, K sets of values, where K is a positive integer, are determined and stored for use by victim feedforward generator 783 for each of the N read/write heads 127. For example, in one such embodiment, each of the K different sets of values for a particular read/write head 127 corresponds to a different radial location of the victim head. Thus, in the embodiment, victim feedforward generator 783 can generate K different victim feedforward signals 1003 for a single read/write head 127, depending on the radial location of the victim head at the time. Further, in some embodiments, victim feedforward generator 783 can generate K×M different victim feedforward signals 1003 for a single read/write head 127, depending on the radial location of the victim head and the temperature range in which HDD 100 is operating at the time.

A method 1400 begins at step 1401, when a suitable controller (e.g., microprocessor-based controller 133 and/or motor-driver chip 125) determines a specific set of values to be retrieved from a memory by victim feedforward generator 783 to generate an appropriate victim feedforward signal 1003. For purposes of discussion below, the specific set of values to be retrieved from a memory by victim feedforward generator 783 to generate an appropriate victim feedforward signal will be referred to as a victim feedforward kernel. The controller then retrieves the specific set of values from the appropriate memory of HDD 100.

The controller determines the specific set of values based on which of the N read/write heads 127 of HDD 100 is currently designated to be the victim head. Additionally, in some embodiments, the controller determines the specific set of values further based on which of M different predetermined temperature ranges HDD 100 is currently operating in. Additionally or alternatively, in some embodiments, the controller determines the specific set of values further based on which of K different radial locations the victim head currently occupies. Thus, in some embodiments, the controller determines the specific set of values from N different sets of values; in other embodiments, the controller determines the specific set of values from N×M different sets of values; in other embodiments, the controller determines the specific set of values from N×K different sets of values; and in yet other embodiments, the controller determines the specific set of values from N×M×K different sets of values. In yet other embodiments, the controller may determine the set of values based upon a combination of one or more of the up to N×M×K different sets of values, using interpolation between two or more sets of values, based upon temperature range, victim location, or other operating parameters.

In some embodiments, all of the disk surfaces associated with actuator arm assembly 120A (for example, recording surfaces 112A-112D in FIG. 2) are servo-written in such a manner that the servo samples are aligned in time. In other words, a servo wedge on surface 112A passes under read/write head 227A at about the same time that a servo wedge on surface 112B passes under read/write head 227B, and so on. For this reason, the timing of commands sent to VCM 128A (as part of the response of first servo controller 715 to the measured position of any read/write head associated with that VCM) should be relatively independent of which read/write head is currently under servo control. In such a case, coordination of fractional-wedge timing of an aggressor actuator and a victim actuator may not be employed for generating a victim feedforward signal.

In step 1402, the controller receives or determines a radial position generated by the victim head, such as radial position 1005, and a radial position generated by the aggressor head. Generally, the controller receives or determines the position signal generated by the victim head as the victim head passes over a servo wedge N on a recording surface 112 of HDD 100 associated with the victim head. Similarly, the controller receives or determines the position signal generated by the aggressor head as the aggressor head passes over the servo wedge N on a recording surface 112 of HDD 100 associated with the aggressor head. The position signal for the victim head is employed to enable the victim servo loop to function, and the position signal for the aggressor head is employed to enable the aggressor servo loop to function. In this description, it is assumed that the aggressor and victim pass over wedge-number N at about the same time. While this may be the case in some embodiments, in other embodiments the aggressor head may pass over wedge N at about the time that victim head passes over wedge P.

In step 1411, the controller generates an aggressor VCM control signal for moving the aggressor actuator of HDD 100. The controller generates the aggressor VCM control signal based on aggressor head position signal received in step 1402. In instances in which VCM 128A is the aggressor actuator and VCM 128B is the victim actuator, the controller generating the aggressor VCM control signal corresponds to first servo controller 715 in FIG. 7.

In step 1412, the controller generates a microactuator control signal for the aggressor head based on the radial position received or determined in step 1402.

In optional step 1415, the aggressor VCM control signal generated in step 1411 and/or the microactuator control signal for the aggressor head generated in step 1412 is modified with one or more notch filters, such as notch filters 1011 or 1012. For example, in an embodiment, a notch filter modifies the microactuator signal for the aggressor head to produce a filtered microactuator signal for the aggressor microactuator. In some embodiments, the microactuator control signal for the aggressor head passes through all portions of the notch filter, whereas in other embodiments, the microactuator control signal for the aggressor head does not pass through all filtering portions of the notch filter. Alternatively or additionally, in some embodiments, the aggressor VCM control signal for the aggressor head is processed by a notch-filter. In the embodiment of method 14 described herein, the controller operates using control diagram 1000 of FIG. 10A. In other embodiments, the controller can operate using control diagram 1050 of FIG. 10B, in which the modification of signals with notch filters can occur in a different step than step 1415.

In step 1416, the controller asserts the aggressor VCM control signal and the microactuator control signal. Thus, the aggressor VCM control signal is asserted by the aggressor actuator (e.g., VCM 128A) and the microactuator control signal for the aggressor head is asserted by the aggressor microactuator (e.g., one of microactuators 228A-D). Generally, the aggressor VCM control signal is applied to the aggressor actuator and the microactuator control signal for the aggressor head is applied to the aggressor microactuator prior to the aggressor head passing over the next servo wedge. For example, when the controller receives or determines the position signal in step 1402 immediately after the aggressor head passes over a servo wedge N, in step 1416, the controller asserts the aggressor VCM control signal and the microactuator control signal prior to the aggressor head passing over servo wedge N+1. In this way, the radial position and/or velocity profile of the aggressor head is modified prior to the aggressor head passing over servo wedge N+1. In some embodiments, the controller asserts multiple aggressor VCM control signals and the microactuator control signals in step 1416 when the servo system for the aggressor actuator is configured as a multi-rate control system.

In step 1417, the aggressor head generates another position signal as the aggressor head passes over the next servo wedge. Upon completion of step 1417, method 1400 returns back to step 1402.

It is noted that in some embodiments, step 1428 occurs substantially concurrently with step 1417. That is, in such embodiments, the victim head passes over the next servo wedge on the recording surface associated with the victim head at approximately the same time that the aggressor head passes over the next servo wedge on the recording surface associated with the aggressor head. Therefore, in such embodiments, the victim head generates another position signal for the victim head in step 1428 at approximately the same time that the aggressor head generates another position signal for the aggressor head in step 1417. In such embodiments, each servo wedge on the recording surface associated with the aggressor head is circumferentially aligned with a respective servo wedge on the recording surface associated with the aggressor head.

Step 1430 is performed upon completion of step 1415, in which an aggressor VCM control signal or signals for moving the aggressor actuator of HDD 100 is modified by (for example) notch filter 1012. In step 1430, the controller determines an interpolated aggressor VCM command(s), such as interpolated VCM command values 1240 in FIG. 12B. For example, in an embodiment, VCM command interpolator 1101 determines a single interpolated aggressor VCM command 1240 for servo wedge N when the servo system for the victim actuator is configured as a single-rate control system. In another example, VCM command interpolator 1101 determines multiple interpolated aggressor VCM commands 1240 for servo wedge N when the servo system for the victim actuator is configured as a multi-rate control system. In some embodiments, the interpolated aggressor VCM commands 1240 for servo wedge N are determined based on the aggressor modified VCM command generated in step 1415. In alternative embodiments, the input value for step 1430 is provided by step 1411 instead of step 1415. In such embodiments, the interpolated aggressor VCM commands 1240 for servo wedge N are determined in step 1430 based on the aggressor VCM command(s) that are generated by the controller for moving the aggressor actuator of HDD 100. In some embodiments, in instances in which there is no significant timing relationship difference between the current victim head and the aggressor head, interpolated aggressor VCM commands 1240 are not determined, and the aggressor the VCM command(s) that are generated by the controller for moving the aggressor actuator of HDD 100 are employed in steps 1431 and 1432.

In step 1431, the controller stores the aggressor VCM command(s) for servo wedge N in a memory of HDD 100. For example, in an instance in which VCM 128A is the aggressor actuator, the controller stores the aggressor VCM command(s) for servo wedge N in aggressor VCM command buffer 774 for first servo controller 715. In an instance in which there is a significant timing offset between the current victim head and the aggressor head, the controller stores the interpolated aggressor VCM commands 1240 that are generated in step 1430. In instances in which there is no significant timing offset between the current victim head and the aggressor head, the controller stores the aggressor the VCM command(s) that are generated by the controller in step 1411 for moving the aggressor actuator of HDD 100.

In step 1432, the controller generates a victim feedforward signal or signals for servo wedge N+W, where W is the wedge offset number for HDD 100. The controller generates the victim feedforward signal or signals based on the aggressor VCM control signal(s) stored in step 1431 and on the set of values selected in step 1401. The set of values is derived from the appropriate feedforward transfer function for the victim head. Generally, the feedforward transfer function models commands to be added to the microactuator control signal as a function of the aggressor VCM control signal generated in step 1411 and of recent previous values of that aggressor VCM control signal, e.g., the J most recent values of the aggressor VCM control signal. In some embodiments, the J most recent values of the aggressor VCM control signal are stored in a memory of HDD 100, such as aggressor VCM command buffer 774 or 784. As noted above, in instances in which there is a significant timing relationship difference between the current victim head and the aggressor head, the aggressor VCM control signals employed in step 1432 are the interpolated aggressor VCM commands 1240 that are generated in step 1430.

In some embodiments, for a particular read/write head 127, victim feedforward signal 1003 is generated using the feedforward kernel for that particular read/write head 127. In one such embodiment, a value for the victim feedforward signal is calculated using Equation 1:

$$victimFF(j) = \sum_{k=W}^{J-1} \text{Kernel}(k) * VCMCMD(j-k) \tag{1}$$

where victimFF(j) is the jth (current) value of victim feedforward signal 1003 for the particular read/write head 127, Kernel(k) is the kth kernel element, and VCMCMD(j) is the jth VCM-CMD, and W is the wedge offset number for HDD 100. According to various embodiments, wedge offset number W is an integer greater than 0. As a result, the first W victim feedforward kernel values are effectively forced to be zero. The integer J is the number of kernel elements that are included in the kernel for the particular read/write head 127. In some embodiments, J is selected so that kernel elements past Kernel(J−1) are very small. That is, generally, Kernel(j) begins with a particular magnitude (that can vary significantly from one sample to the next), and, over time, the magnitude of Kernel(j) gradually gets smaller (though possibly with increasing and decreasing oscillations). Thus, once sample #J, is reached, Kernel(j) typically approaches zero.

For the case of a multi-rate control system (for example one in which the VCM control signal 743 is updated at twice the rate at which the victim's read/write head 1005 is determined), the formula would be extended to Equation 2:

$$victimFF(j) = \sum_{k=W}^{J-1} \text{Kernel}_0(k) * VCMCMD_0(j-k) + \sum_{k=W}^{J-1} \text{Kernel}_1(k) * VCMCMD_1(j-k) \tag{2}$$

Where VCMCMD0(j) is the jth value of the first VCM-CMD of each servo sample, VCMCMD1(j) is the jth value of the second VCM-CMD of each servo sample, Kernel0(k) is the kth kernel element (applied to first VCM-CMDs), and Kernel1(k) is the kth kernel element (applied to the second VCM-CMDs).

In step 1433, the controller stores the victim feedforward signal generated in step 1432 for servo wedge N+W in a memory of HDD 100. For example, in an instance in which VCM 128A is the aggressor actuator, the controller stores the aggressor VCM control signal in victim feedforward value buffer 785 for second servo controller 716. The controller further stores a corresponding servo wedge number 1002 that indicates a servo wedge that is offset from servo wedge N by the wedge offset value W.

In step 1421, the controller generates a victim VCM control signal for moving the victim actuator of HDD 100. The controller generates the victim VCM control signal based on victim head position signal received in step 1402. In instances in which VCM 128A is the aggressor actuator and VCM 128B is the victim actuator, the controller generating the victim VCM control signal corresponds to second servo controller 716 in FIG. 7.

In step 1422, the controller generates a microactuator control signal for the victim head based on the radial position received or determined in step 1402.

In step 1423, in an instance in which there is no significant timing relationship difference between the current victim head and the aggressor head, the controller retrieves a suitable victim feedforward entry 901 for servo wedge N from a memory of HDD 100, such as victim feedforward value buffer 785. The controller determines the suitable victim feedforward entry 901 to retrieve based on servo wedge numbers 902. In some embodiments, each servo wedge number 902 indicates a respective servo wedge of a recording surface associated with the aggressor actuator. In such embodiments, the controller selects the victim feedforward entry 901 associated with the servo wedge number 902 in victim feedforward value buffer 785 that indicates a servo wedge of the recording surface associated with the aggressor actuator that is offset from the servo wedge N by the preset wedge offset value W, where servo wedge N is the servo wedge from which the position signal in step 1402 is generated. Thus, in such embodiments, the controller selects the victim feedforward entry 901 that is generated based on servo wedge N−W of the recording surface associated with the aggressor actuator. For example, when the preset wedge offset value is two, the controller selects the victim feedforward entry 901 associated with the servo wedge number 902 that indicates servo wedge N−2 of the recording surface associated with the aggressor actuator. Alternatively, in some embodiments, each servo wedge number 902 indicates a respective servo wedge of a recording surface associated with the victim actuator. In such embodiments, the controller selects the victim feedforward entry 901 associated with the servo wedge number 902 in victim feedforward value buffer 785 that indicates the servo wedge from which the position signal in step 1402 is generated, for example, servo wedge N of the recording surface associated with the victim actuator.

Alternatively, in an instance in which there is a significant timing offset between the current victim head and the aggressor head, in step 1423 the controller retrieves two suitable victim feedforward entries 901 from the memory of HDD 100. Specifically, the controller retrieves the victim feedforward entry 901 for servo wedge N and the victim feedforward entry 901 for a servo wedge that is adjacent to servo wedge N. It is noted that the victim feedforward entry 901 for servo wedge N is generated based on servo wedge N−W of the recording surface associated with the aggressor actuator. When the value of the timing offset between the victim head and the aggressor head is positive, and therefore the aggressor head crosses servo wedge N before the current victim head crosses servo wedge N, the servo wedge that is adjacent to servo wedge N is servo wedge N+1. Conversely, when the value of the timing offset between the victim head and the aggressor head is negative, and therefore the aggressor head crosses servo wedge N after the current victim head crosses servo wedge N, the servo wedge that is adjacent to servo wedge N is servo wedge N−1. As described above, the controller determines the suitable victim feedforward entries 901 to retrieve for servo wedge N based on servo wedge numbers 902.

In step 1424, in an instance in which there is a significant timing relationship difference between the current victim head and the aggressor head, the controller determines an interpolated victim feedforward signal value 1340 for servo wedge N, for example via victim feedforward signal interpolator 1103. In some embodiments, the interpolated victim feedforward signal value 1340 is based on the two victim feedforward entries 901 retrieved for servo wedge N and an adjacent wedge in step 1423. Alternatively, in an instance in which there is no significant timing relationship difference between the current victim head and the aggressor head, no interpolated victim feedforward signal value 1340 is determined for servo wedge N in step 1424. Instead, step 1424 is not performed.

In step 1425, the controller combines the victim microactuator control signal and a victim feedforward signal to produce a corrected microactuator signal. In an instance in which there is a significant timing relationship difference between the current victim head and the aggressor head, in step 1425 the controller combines the victim microactuator control signal and an interpolated victim feedforward signal to produce the corrected microactuator signal. Alternatively, in instance in which there is no significant timing offset between the current victim head and the aggressor head, in step 1425 the controller combines the victim microactuator control signal and a victim feedforward signal generated in step 1432 to produce the corrected microactuator signal.

In optional step 1426, the victim VCM control signal generated in step 1421 and/or the corrected victim microactuator control signal generated in step 1425 is modified via one or more notch filters, such as notch filters 1021 or 1022. For example, in an embodiment, a notch filter modifies the corrected microactuator signal for the victim head to produce a filtered corrected microactuator signal for the victim microactuator. In some embodiments, the corrected microactuator control signal for the victim head passes through all portions of the notch filter, whereas in other embodiments, the filtered corrected microactuator control signal for the victim head does not pass through all filtering portions of the notch filter. Alternatively or additionally, in some embodiments, the victim VCM control signal for the aggressor head is processed by a notch-filter. In the embodiment of method 14 described herein, the controller operates using control diagram 1000 of FIG. 10A. In other embodiments, the controller can operate using control diagram 1050 of FIG. 10B, in which the modification of signals with notch filters can occur in a different step than step 1426.

In step 1427, the controller asserts the victim VCM control signal and the filtered corrected microactuator control signal for servo wedge N. Thus, the victim VCM control signal is applied to the victim actuator (e.g., VCM 128B) and the filtered corrected microactuator control signal for the victim head is applied to the victim microactuator (e.g., one of microactuators 228E-H). Generally, the victim VCM control signal is applied to the victim actuator and the filtered corrected microactuator control signal for the victim head is applied to the victim microactuator prior to the victim head passing over the next servo wedge. For example, when the controller receives or determines the position signal in step 1402 immediately after the victim head passes over servo wedge N, in step 1427, the controller asserts the victim VCM control signal and the filtered corrected microactuator control signal prior to the victim head passing over servo wedge N+1. In this way, the radial position and/or velocity profile of the victim head is modified prior to the victim head passing over servo wedge N+1.

In step 1428, the victim head generates another position signal as the victim head passes over the next servo wedge. Upon completion of step 1428, method 1400 returns back to step 1402.

Implementation of method 1400 enables a suitable victim feedforward signal to be determined and added to a microactuator for a victim head, thereby reducing or eliminating the effect of aggressor actuator motion on the positioning accuracy of the victim head.

Determining Timing Relationship Differences for Feedforward Signal Generation

As noted previously, timing relationship differences between different victim and aggressor heads can occur over the life of a disk drive. Further, such timing relationship differences can be a significant fraction of the time interval required for a read/write head to move across the circumferential separation between adjacent servo wedges, and can significantly affect the accuracy of certain victim disturbance feedforward control schemes. Consequently, to compensate for such timing relationship differences, timing shifts for each read/write head of a drive are measured at certain times over the lifetime of a disk drive. The measured timing shifts can then be applied by VCM command interpolator 1101 for interpolation of VCM commands for an aggressor head and/or victim feedforward signal interpolator 1103 for interpolation of a victim feedforward signal for a victim head. One such embodiment is described below in conjunction with FIG. 15.

Figure 15:
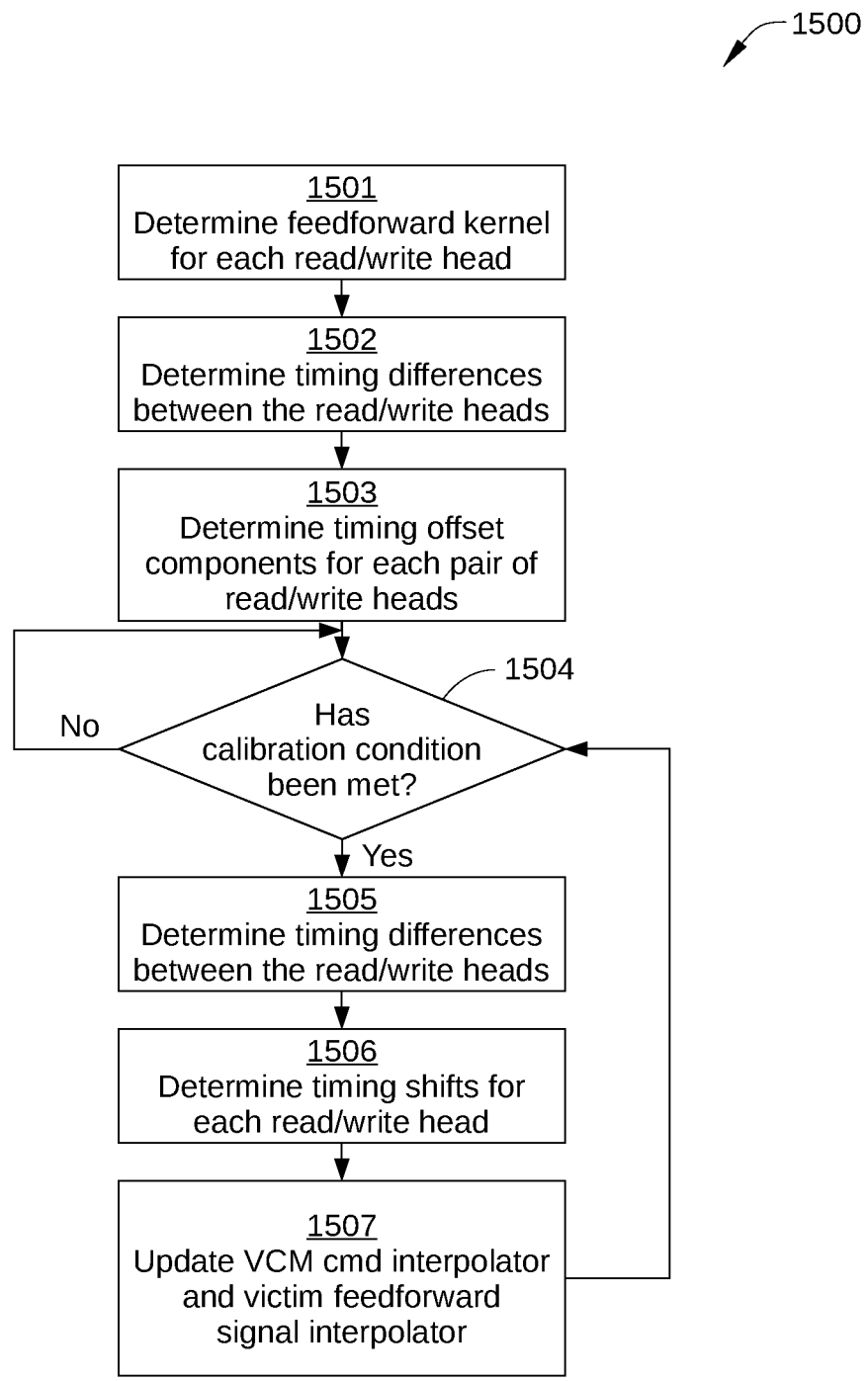
FIG. 15 sets forth a flowchart of method steps for measuring timing shifts for each read/write head of a drive, according to an embodiment.

FIG. 15 sets forth a flowchart of method steps for measuring timing shifts for each read/write head of a drive, according to an embodiment. Although the method steps are described in conjunction with HDD 100 of FIGS. 1-14, persons skilled in the art will understand that the method steps may be performed with other types of systems. The control algorithms for the method steps may reside in microprocessor-based controller 133, motor-driver chip 125, or a combination of both. The control algorithms can be implemented in whole or in part as software- or firmware-implemented logic, and/or as hardware-implemented logic circuits.

A method 1500 begins at step 1501, when a suitable controller (e.g., microprocessor-based controller 133 and/or motor-driver chip 125) determines a victim feedforward kernel 1102 for each read/write head of HDD 100. Example embodiments for the determination of the feedforward transfer function for victim feedforward kernel 1102 are described below in conjunction with FIGS. 16-18.

In step 1502, the controller determines timing differences between the read/write heads of HDD 100. Thus, for a first actuator (e.g., VCM 128A), the controller measures timing-differences between one specific read/write head on a second actuator (e.g., VCM 128B) and each read/write head on the first actuator. Thus, when the chosen head on the second actuator is (for example) head number 1 (from the multiple read/write heads of the second actuator), then the differences are represented by a set of values $TD\_b\_1_k$, where k is in the range {1:K} and K is the number of servo wedges per revolution, and b is in the range {1:B} and B is the total number of read/write heads of the first actuator. Similarly, for the second actuator, the controller measures timing-differences between one specific read/write head on the first actuator and each read/write head on the second actuator. Thus, when the chosen head on the first actuator is (for example) head number 1 (from the multiple read/write heads of the first actuator), then the differences are represented by a set of values $TD\_1\_a_k$, where a is in the range {1:A} and A is the total number of read/write heads of the second actuator. Set of values $TD\_1\_a_k$ and set of values $TD\_b\_1_k$, include sufficient information to define the timing differences between any pair of read/write head of HDD 100 (either cross-actuator head pairs or same-actuator head pairs).

In some embodiments, the timing difference values included in a particular set of values $TD\_1\_a_k$ or set of values $TD\_b\_1_k$ can be determined while servoing simultaneously on the pair of heads associated with the particular set of values being measured. In such embodiments, the timing difference values are measured via any technically feasible timing approach. For example, in some embodiments, a disk-synchronized or free-running clock included in HDD 100 can be employed to detect when a specific event occurs at a particular servo wedge for each head, such as when each head passes a rising edge, sync mark, or other feature of that particular servo wedge. Because such clocks generally include 1000 or more counts per servo wedge, in such embodiments the timing difference values so measured can indicate timing differences between two heads with high granularity.

In step 1503, the controller determines representative timing offset components for each pair of read/write heads of HDD 100. In some embodiments, the controller determines, for each pair of read/write heads of HDD 100, an average offset value (referred to herein as $TD\_AVG\_b\_1$ for the read/write heads of the first actuator and $TD\_AVG\_1\_a$ for the read/write heads of the second actuator), an "in-phase" component of sinusoidal variation at the spin-speed (referred to herein as $TD\_COS\_b\_1$ for the read/write heads of the first actuator and $TD\_COS\_1\_a$ for the read/write heads of the second actuator), and a "quadrature" component of sinusoidal variation at the spin-speed (referred to herein as $TD\_SIN\_b\_1$ for the read/write heads of the first actuator and $TD\_SIN\_1\_a$ for the read/write heads of the second actuator). In such embodiments, the average offset value, the in-phase component, and the quadrature component for a particular pair of read/write heads of HDD 100 are determined based on a timing difference data set associated with that particular pair of read/write heads. For example, such a data set includes a measured timing difference value (measured in step 1502) for K servo wedges. These representative timing offset components are the base timing difference values for each pair of read/write heads of HDD 100.

In the embodiment described above, timing differences for a particular pair of read/write heads is assumed to vary sinusoidally once per revolution of K servo wedges of a recording surface. In other embodiments, the timing differences for a particular pair of read/write heads can be assumed to vary sinusoidally multiple times per revolution of K servo wedges of a recording surface. In such embodiments, additional representative timing offset components may be computed in addition to the above-described average offset value, in-phase component value, and quadrature component value.

In step 1504, the controller determines whether a calibration condition has been met. For example, in some embodiments, a calibration condition can be the lapsing of a specific time period or the occurrence of a specific event (such as system start up, system power down, detection of a shock, determination that a specific performance threshold has not been met, and the like). In some embodiments, a calibration condition can be the determination that one or more timing shifts of a sufficient magnitude have been experienced by one or more read/write heads. In such embodiments, timing differences are measured passively by the controller during normal operation of HDD 100. If a calibration condition has been met, method 1500 proceeds to step 1505; if no calibration condition has been met, method 1500 returns to step 1504.

In step 1505, the controller determines timing differences between the read/write heads of HDD 100. In some embodiments, procedures described above in step 1502 can be performed. In such embodiments, new values for set of values $TD\_1\_a_k$ and set of values $TD\_b\_1_k$ are determined. Alternatively, in some embodiments, timing differences are measured passively by the controller during normal operation of HDD 100. In such embodiment, step 1505 is not performed. In such embodiments, timing differences between whichever read/write heads of HDD 100 are currently being used can be measured using procedures described above in step 1502 to determine the requisite values for set of values $TD\_1\_a_k$ and set of values $TD\_b\_1_k$.

In step 1506, the controller determines timing shifts of each read/write head of HDD 100. In some embodiments, such timing shifts are determined based on the information included in set of values $TD\_1\_a_k$ and set of values $TD\_b\_1_k$, which is collected in step 1505. For example, in an embodiment, the base values in set of values $TD\_1\_a_k$ and set of values $TD\_b\_1_k$ are subtracted from the values collected in 1505, thereby determining $\Delta TD\_1\_a_k$ and $\Delta TD\_b\_1_k$. In some embodiments, a set of simultaneous equations can be constructed and solved to provide values for the absolute time shift of each read/write of each actuator using $\Delta TD\_1\_a_k$ and $\Delta TD\_b\_1_k$. In such embodiments, values indicating the absolute time shift of each read/write head of each actuator are represented by: $\Delta T\_AVG\_ACT1\_b$ and $\Delta T\_AVG\_ACT2\_a$, $\Delta T\_COS\_ACT1\_b$ and $\Delta T\_COS\_ACT2\_a$, and $\Delta T\_SIN\_ACT1\_b$ and $\Delta T\_SIN\_ACT2\_a$.

With the introduction of one additional constraint, one of skill in the art can apply any suitable method to solve the above-described simultaneous equations to determine the values of $\Delta T\_AVG\_ACT1\_b$ and $\Delta T\_AVG\_ACT2\_a$, $\Delta T\_COS\_ACT1\_b$ and $\Delta T\_COS\_ACT2\_a$, and $\Delta T\_SIN\_ACT1\_b$ and $\Delta T\_SIN\_ACT2\_a$. For example, in some embodiments, the additional constraint can be that the average of all of the values in the set of values $\Delta T\_AVG\_ACT1\_b$ and all of the values in the set of values $\Delta T\_AVG\_ACT2\_a$ is zero. Alternatively, in some embodiments, the additional constraint can be that the sum of all of the values in the set of values $\Delta T\_AVG\_ACT1\_b$ and all of the values in the set of values $\Delta T\_AVG\_ACT2\_a$ is zero. Alternatively, in some embodiments, the additional constraint can be provided by minimizing the absolute timing offset of the worst timing offset of the drive. Thus, in such embodiments, the largest-magnitude value in the two sets of values $\Delta T\_AVG\_ACT1\_b$ and $\Delta T\_AVG\_ACT1\_b$ is minimized.

Alternatively, in some embodiments, in step 1506, the controller determines timing shifts of each read/write head of HDD 100 based on an absolute timing reference. For example, in such embodiments, a timing difference for each read/write head of HDD 100 can be determined based on a timing difference between rising edges of a servo gate signal and an edge of a back-EMF (electro-motive force) zero crossing signal from spindle motor 114.

In step 1507, the controller updates VCM command interpolator 1101 and victim feedforward signal interpolator 1103. For example, in some embodiments, the values of $\Delta T\_AVG\_ACT1\_b$ and $\Delta T\_AVG\_ACT2\_a$, $\Delta T\_COS\_ACT1\_b$ and $\Delta T\_COS\_ACT2\_a$, and $\Delta T\_SIN\_ACT1\_b$ and $\Delta T\_SIN\_ACT2\_a$ are used by VCM command interpolator 1101 for generating the timing offsets that VCM command interpolator 1101 employs to interpolate VCM command values, such as VCM command values 1200. Specifically, in such embodiments, these values are added to the base values of TD_AVG_ACT1_b, TD_AVG_ACT2_a, TD_COS_ACT1_b, TD_COS_ACT2_a, TD_SIN_ACT1_b, and TD_SIN_ACT2_a, and the timing offsets for interpolating VCM command values are generated.

Additionally or alternatively, in some embodiments, the values of $\Delta T\_AVG\_ACT1\_b$ and $\Delta T\_AVG\_ACT2\_a$, $\Delta T\_COS\_ACT1\_b$ and $\Delta T\_COS\_ACT2\_a$, and $\Delta T\_SIN\_ACT\_1\_b$ and $\Delta T\_SIN\_ACT2\_a$ are used by victim feedforward signal interpolator 1103 for generating the timing offsets that victim feedforward signal interpolator 1103 employs to interpolate values of victim feedforward signal, such as modifies values of victim feedforward signal 1003. Method 1500 then returns to step 1504.

Determination of Victim Feedforward Signal Transfer Function

FIG. 16 sets forth a flowchart of method steps for determining values for a victim feedforward generator in a multi-actuator HDD, according to an embodiment. In the embodiment, a different set of values for the victim feedforward transfer function is determined for each magnetic head of the multi-actuator HDD. In some embodiments, the method steps are performed in HDD 100 as part of a calibration/start-up process. Although the method steps are described in conjunction with HDD 100 of FIGS. 1-10B, persons skilled in the art will understand that the method steps may be performed with other types of systems. The control algorithms for the method steps may reside in microprocessor-based controller 133, motor-driver chip 125, or a combination of both. The control algorithms can be implemented in whole or in part as software- or firmware-implemented logic, and/or as hardware-implemented logic circuits.

A method 1600 begins at step 1601, when a suitable controller (i.e., microprocessor-based controller 133 and/or motor-driver chip 125) selects a victim read/write head 127 from the read/write heads associated with VCM 128A or VCM 128B. The selected read/write head 127 and associated actuator (either VCM 128A or VCM 128B) are then designated as the victim head and the victim actuator, respectively, while another actuator is designated as the aggressor actuator.

In step 1602, the controller determines a first transfer function that models the radial position of the victim head as a function of a control signal applied to the aggressor actuator. In some embodiments, in an instance in which VCM 128A is the aggressor actuator and VCM 128B is the victim actuator, the first transfer function models radial position 1005 of the currently active read/write head associated with VCM 128B as a function of VCM control signal 743 applied to VCM 128A. In one such embodiment, the first transfer function can model radial position 1005 as a function of filtered VCM control signal 743, which is VCM control signal 743 after passing through notch filter 1012. Alternatively, in another embodiment, the first transfer function models radial position 1005 as a function of VCM control signal 1047 prior to being processed by notch filter 1012. One process by which the controller determines the first transfer function is described below in conjunction with FIG. 17.

In step 1603, the controller determines a second transfer function that models the radial position of the victim head as a function of a feedforward signal added to the control signal that is applied to a microactuator 228 and/or 229 for positioning the victim head. For example, in an instance in which VCM 128A is the aggressor actuator and VCM 128B is the victim actuator, in some embodiments the second transfer function models radial position 1005 of the currently active read/write head associated with VCM 128B as a function of victim feedforward signal 1003 for microactuator 1028B. One process by which the controller determines the second transfer function is described below in conjunction with FIG. 18.

In step 1604, the controller determines a feedforward transfer function for the current victim head. The feedforward transfer function models a feedforward correction signal for the victim head as a function of a control signal supplied to the aggressor actuator. For example, in an instance in which VCM 128A is the aggressor actuator and VCM 128B is the victim actuator, in some embodiments the feedforward transfer function models victim feedforward signal 1003 (the output of the feedforward transfer function) as a function of filtered VCM control signal 743 for VCM 128A (the input of the feedforward transfer function). In some embodiments, the controller determines a feedforward transfer function for the current victim head based on a ratio of the first transfer function determined for the victim head in step 1602 and the second transfer function determined for the victim head in step 1603. So that the feedforward transfer function substantially cancels the effect of filtered VCM control signal 743, the feedforward transfer function is multiplied by −1.

In step 1605, the controller generates a victim feedforward kernel for the current victim head. In some embodiments, the victim feedforward kernel is based on the feedforward transfer function determined in step 1604. For example, in one such embodiment, the controller generates a plurality of values for the victim feedforward kernel for the current victim head by determining an inverse discrete Fourier transform of values associated with the first transfer function. The controller then stores the plurality of values for the victim feedforward kernel in a memory of HDD 100, such as RAM 134 and/or flash memory device 135. Alternatively or additionally, the plurality of values can be programmed into one or more control algorithms of HDD 100.

In step 1606, the controller determines whether there are any remaining read/write heads 127 in HDD 100 for which a feedforward transfer function is to be determined. If yes, method 1600 returns to step 1601; if no, method 1600 proceeds to step 1607 and terminates.

In some embodiments, a feedforward transfer function is determined not only for each different read/write head 127 of HDD 100, but also for each read/write head 127 at each of multiple temperature ranges. Thus, temperature variations in the mechanical coupling between a victim actuator and an aggressor actuator can be accurately accounted for. In such embodiments, a different iteration of method 1600 is performed for each of the multiple temperature ranges. Thus, a different transfer function for the same read/write head 127 is determined for each of the different temperature ranges. For example, in one such embodiment, a different iteration of method 1600 is performed for each of the following temperature ranges of HDD 100: −5 ŁC to +5 ŁC; +5 ŁC to +15 ŁC; +15 ŁC to +25 ŁC; +25 ŁC to +35 ŁC. In other embodiments, a different iteration of method 1600 is performed for any other temperature ranges, including larger temperature ranges than those described above, smaller temperature ranges than those described above, temperature ranges spanning different thermal ranges, etc. In other embodiments, a different iteration of method 1600 is performed for one or more temperature ranges, and kernel values are determined for those temperature ranges, plus other temperature ranges, using methods of interpolation or extrapolation known to one of skill in the art.

In some embodiments, a feedforward transfer function is determined not only for each different read/write head 127 of HDD 100, but also for various radial locations of each read/write head 127. Thus, variations in the mechanical coupling between a victim actuator and an aggressor actuator that depend upon the radial location of the victim head can be accurately accounted for. In such embodiments, a different iteration of method 1600 is performed for each of the multiple radial locations (e.g., proximate the ID, proximate the OD, and/or proximate a mid-diameter region). Thus, a different transfer function for the same read/write head 127 is determined for each of the different radial locations.

Figure 17:
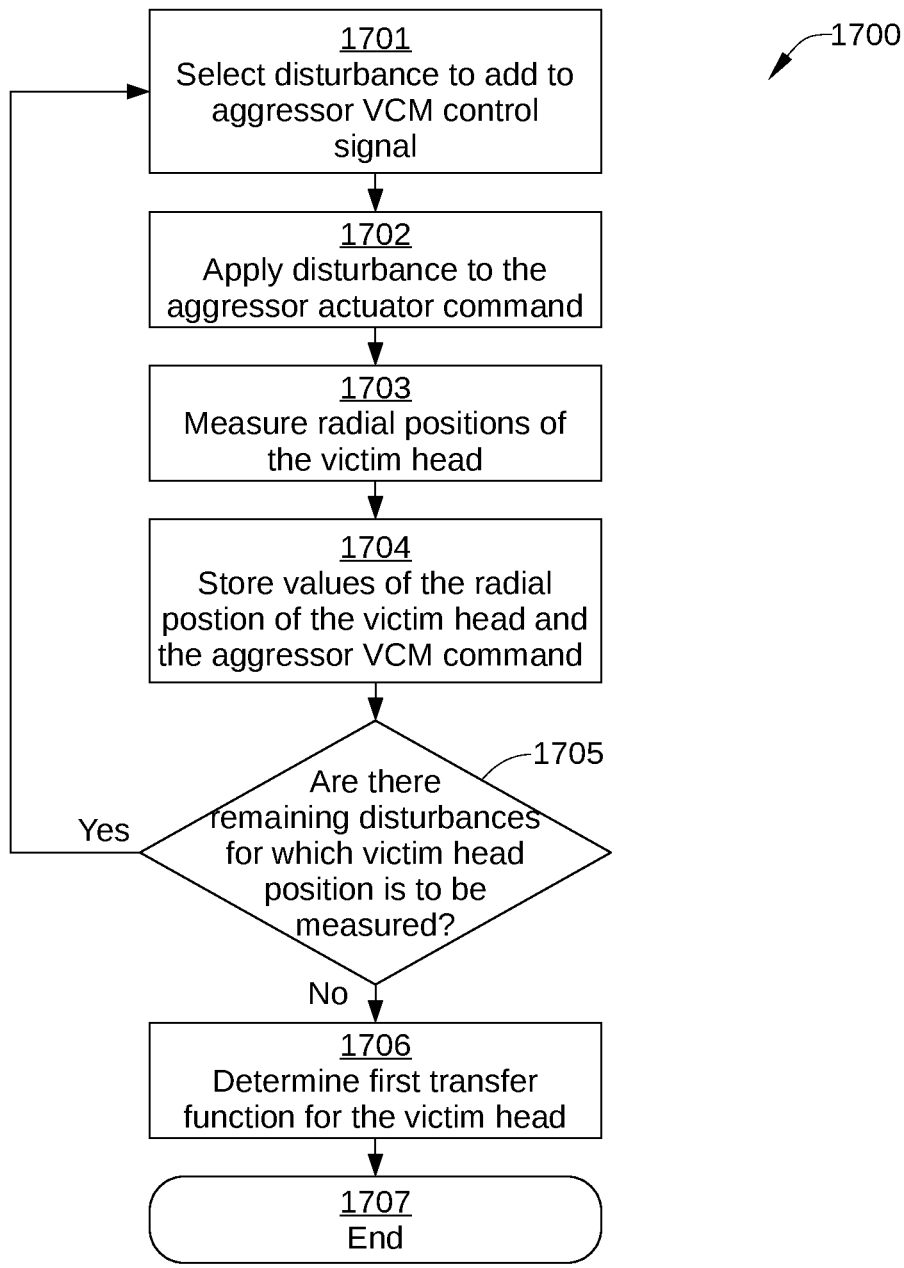
FIG. 17 sets forth a flowchart of method steps for determining a transfer function that models the radial position error of a victim head as a function of a control signal applied to an aggressor actuator, according to an embodiment.

FIG. 17 sets forth a flowchart of method steps for determining a transfer function that models the radial position of a victim head as a function of a control signal applied to an aggressor actuator, according to an embodiment. For consistency with the description of method 1600 in FIG. 16, such a transfer function is described herein as the "first transfer function." In some embodiments, the method steps are performed in HDD 100 as part of a calibration/start-up process. For example, the method steps of FIG. 17 may be implemented in step 1602 of method 1600. Although the method steps are described in conjunction with HDD 100 of FIGS. 1-10B, persons skilled in the art will understand that the method steps may be performed with other types of systems. The control algorithms for the method steps may reside in microprocessor-based controller 133, motor-driver chip 125, or a combination of both. The control algorithms can be implemented in whole or in part as software- or firmware-implemented logic, and/or as hardware-implemented logic circuits.

A method 1700 begins at step 1701, when a suitable controller (i.e., microprocessor-based controller 133 and/or motor-driver chip 125) selects a disturbance to be injected into or otherwise added to a control signal for an actuator that is currently designated as the aggressor actuator. For example, in an instance in which VCM 128A is the aggressor actuator and VCM 128B is the victim actuator, the controller selects a disturbance to be added to filtered VCM control signal 743 before being applied to VCM 128A. It is noted that VCM control signal 1047 is generated as part of the closed loop servo control of the aggressor head and then modified to filtered VCM control signal 743. Generally, the controller selects the disturbance to be added to the VCM command from a plurality of disturbances that together facilitate the determination of the first transfer function. For example, the plurality of disturbances may include a range of different acceleration values that are each to be individually applied to the aggressor actuator during implementation of method 1700.

In some embodiments, the plurality of disturbances is selected to excite the mechanical systems of first control loop 1020 and second control loop 1030 over all frequencies of interest. In this way, the first transfer function measured in method 1700 more accurately captures the response of the mechanical and control systems of first control loop 1020 and second control loop 1030. In some embodiments, the different disturbances to be applied to VCM control signal 743 can be part of a sinusoidal waveform, a pulse of acceleration values, and/or selected from random or pseudo-random noise. For example, in one embodiment, each disturbance to be applied to VCM control signal 743 is a sinewave of a different frequency. When each such disturbance is applied to VCM control signal 743, a complete spectrum of the first transfer function can be measured.

In some embodiments, a control signal for an aggressor actuator (e.g., VCM control signal 743) may be updated at the same rate at which the read/write head position 1005 is determined for a victim actuator. Such systems are generally referred to as single-rate control systems. In other embodiments, a control signal for an aggressor actuator may be updated at a higher rate than the rate at which the read/write head position 1005 is determined for the victim actuator. For example, in an embodiment, the control signal for an aggressor actuator might be updated at twice the rate at which the read/write head position 1005 for the victim actuator is measured. Such systems are generally referred to as multi-rate control systems, and are known to one of skill in the art. For such systems, the relationship between the control signal for the aggressor actuator and the read/write head position 1005 of the victim actuator can be represented by multiple transfer functions. For the example described above (in which VCM commands are updated at twice the rate at which the read/write head position is determined), the relationship between the aggressor control signal (e.g., VCM control signal 743) and the read/write head position (e.g., radial position 1005) can be represented by two transfer functions; one transfer function between a signal that is made up of a first VCM control signal 743 that is sent to the aggressor VCM (VCM 128A) each servo sample and the victim's read/write head position 1005, and a second transfer-function between a signal that is made up of a second VCM control signal 743 that is sent to the aggressor VCM (VCM 128A) each servo sample and the victim read/write head position (radial position 1005). For such systems, the disturbances to be applied to VCM control signal 743 could include disturbances to only the first of the two control signals for each servo sample, disturbances to only the second of the two control signals, or to both simultaneously. For such systems, determining the two transfer-functions could involve measuring the aggressor VCM control signal 743 and the response of the victim read/write head position to two or more different disturbance signals, and simultaneously solving for the two transfer-functions, based upon the results of the multiple experiments. Such signal processing is known to one of skill in the art.

Continuing with the case of a multi-rate control system, the processing that was previously described for FIG. 16 is extended to apply to two first transfer functions. In step 1602, the first transfer function would consist of two transfer functions. In step 1604, determining the feedforward transfer function for the victim head would consist of two transfer functions. In step 1605, the victim feedforward kernel would consist of two kernels; one which is applied to the first VCM control signal 743 that is applied to VCM 12A8 each servo sample, and another which is applied to the second VCM control signal 743 that is applied to VCM 128A each servo sample.

In step 1702, the controller applies the selected disturbance to the VCM command for the aggressor VCM. For example, in an instance in which VCM 128A is the aggressor actuator and VCM 128B is the victim actuator, the disturbance is added to filtered VCM control signal 743 before VCM control signal 743 is applied to VCM 128A. In one such embodiment, the disturbance is added to filtered VCM control signal 743 at injection point 1029.

In step 1703, the controller measures the radial position of a read/write head 127 that is currently designated as the victim head. That is, the controller measures the response of the victim head (i.e., radial positions of the victim head over a certain time interval) to the disturbance applied in step 1702. The controller also measures the VCM commands applied to the aggressor actuator. For example, in an instance in which VCM 128A is the aggressor actuator and VCM 128B is the victim actuator, the controller measures radial position 1005 of the currently active read/write head associated with VCM 128B (i.e., the victim head), and the commands that were applied to the VCM 128A (i.e., VCM control signal 743). The commands applied to the aggressor actuator are collected in step 1703 since such commands are not based solely on the selected disturbance applied in step 1702; such commands include controller-determined feedback values as well.

In some embodiments, the controller performs steps 1702 and 1703 multiple times to reduce the influence of random noise and other non-repeatable runout on the measured radial position of the victim head. For example, the controller may perform steps 1702 and 1703 over a plurality of rotations of a storage disk 110. Alternatively or additionally, in some embodiments, the controller performs steps 1702 and 1703 at multiple circumferential locations of a recording surface 112 to reduce the influence of repeatable runout on the measured radial position of the victim head. In such embodiments, the controller may also perform steps 1702 and 1703 over a plurality of rotations of a storage disk 110.

In some embodiments, the effects of synchronous runout (also known as "written-in runout") on the accuracy of measurements of the first transfer function are reduced. In such embodiments, the measurements associated with steps 1702 and 1703 are made in pairs. In such embodiments, each pair of measurements is performed with added disturbances of equal amplitude and shape, but opposite sign, and with starting times that are separated by an integer number of revolutions of the storage disk 110. The difference between the resulting victim position (e.g., victim PES 1005) for such a pair of experiments should, to first order, be devoid of effects of synchronous runout, which might otherwise degrade the accuracy of the transfer-function measurement. The difference between the resulting commands that were applied to the aggressor actuator should similarly be, to first order, devoid of effects of synchronous runout.

In step 1704, the controller stores the values of the measured position of the victim head over the time extent of the experiment, and stores the values of the commands that were applied to the aggressor actuator over that same time extent. In some embodiments, the values stored are based on multiple measurements made when the controller performs steps 1702 and 1703 multiple times.

In step 1705, the controller determines whether there are any remaining disturbances for which a resultant radial position of the victim head is to be measured. If yes, method 1700 returns to step 1701; if no, method 1700 proceeds to step 1706.

In step 1706, the controller derives the first transfer function for the victim head based on the values stored over the multiple iterations of step 1704. In some embodiments, the transfer function is determined as the ratio of the spectrum of the victim measured position to the spectrum of the commands applied to the aggressor actuator. Method 1700 then proceeds to step 1707 and terminates.

Figure 18:
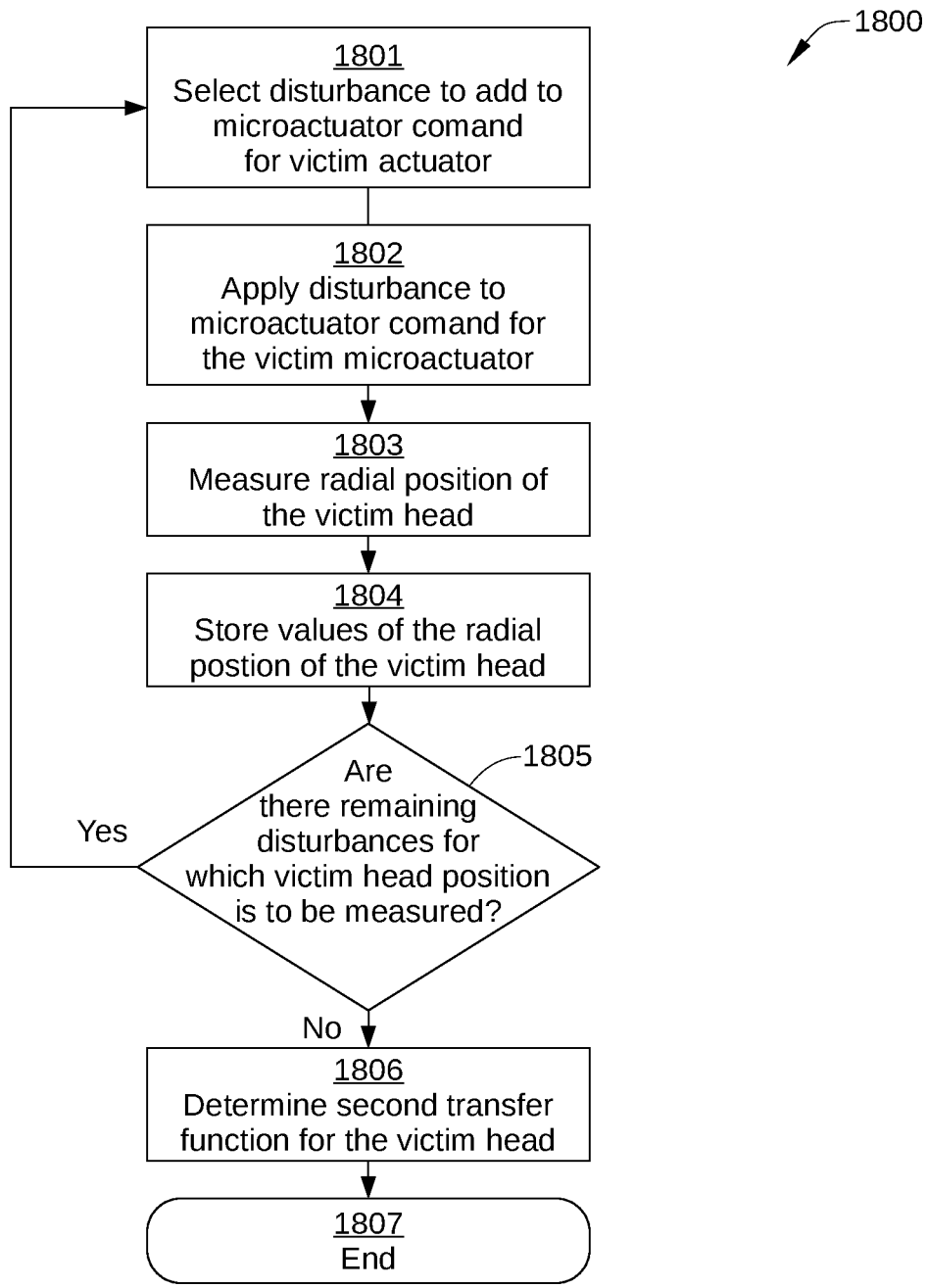
FIG. 18 sets forth a flowchart of method steps for determining a transfer function that models the radial position of a victim head as a function of a disturbance added to a control signal that is applied to a microactuator for positioning the victim head, according to an embodiment.

FIG. 18 sets forth a flowchart of method steps for determining a transfer function that models the radial position of a victim head as a function of a disturbance added to a control signal that is applied to a microactuator for positioning the victim head, according to an embodiment. For consistency with the description of method 1600 in FIG. 16, the transfer function is described herein as the "second transfer function." In some embodiments, the method steps are performed in HDD 100 as part of a calibration/start-up process. For example, the method steps of FIG. 18 may be implemented in step 1603 of method 1600. Although the method steps are described in conjunction with HDD 100 of FIGS. 1-17, persons skilled in the art will understand that the method steps may be performed with other types of systems. The control algorithms for the method steps may reside in microprocessor-based controller 133, motor-driver chip 125, or a combination of both. The control algorithms can be implemented in whole or in part as software- or firmware-implemented logic, and/or as hardware-implemented logic circuits.

A method 1800 begins at step 1801, when a suitable controller (i.e., microprocessor-based controller 133 and/or motor-driver chip 125) selects a disturbance (or microactuator control signal) for a microactuator that is configured to position a read/write head 127 currently designated as the victim head. For example, in an instance in which VCM 128A is the aggressor actuator and VCM 128B is the victim actuator, the controller selects a disturbance to microactuator control signal 745, which is to be applied to microactuator 1028B. Generally, the controller selects the disturbance from a plurality of disturbances that together facilitate the determination of the second transfer function. For example, the plurality of microactuator commands may include a range of different acceleration values that are each to be individually applied to the microactuator during implementation of method 1800. In some embodiments, the different disturbances to be applied to microactuator control signal 745 can be part of a sinusoidal waveform, a pulse of acceleration values, and/or selected from random noise. For example, in one embodiment, each disturbance to be applied to microactuator control signal 745 is a sinewave of a different frequency. Further, any of the other techniques described above in conjunction with method 1700 for measuring the first transfer function can be employed for measuring the second transfer function in method 1800.

In step 1802, the controller adds the selected disturbance to the microactuator control signal for positioning the victim head. For example, in an instance in which VCM 128A is the aggressor actuator and VCM 128B is the victim actuator, the disturbance is added to microactuator control signal 745, which is then applied to microactuator 1028B. In the embodiment illustrated in FIG. 10A, the disturbance can be injected between second servo controller 716 and notch filter 1021. In the embodiment illustrated in FIG. 10B, the disturbance can be injected between notch filter 1021 and microactuator 1028B. In some embodiments, the selected disturbance is modified by a notch filter before being applied to the microactuator, and in other embodiments, the selected disturbance is modified by a second filtering portion of a notch filter before being applied to the microactuator.

In step 1803, the controller measures the radial position of a read/write head 127 that is currently designated as the victim head. For example, in an instance in which VCM 128A is the aggressor actuator and VCM 128B is the victim actuator, the controller measures radial position 1005 of the currently active read/write head associated with VCM 128B (i.e., the victim head).

In some embodiments, the controller performs steps 1802-1804 multiple times to reduce the influence of random noise and other non-repeatable runout on the measured radial position of the victim head. For example, the controller may perform steps 1802-1804 over a plurality of rotations of a storage disk 110.

In step 1804, the controller stores the value of the measured position of the victim head over the time extent of the experiment. In some embodiments, the value stored is based on multiple measurements made when the controller performs steps 1802 and 1803 multiple times.

In step 1805, the controller determines whether there are any remaining disturbances for which a resultant radial position of the victim head is to be measured. If yes, method 1800 returns to step 1801; if no, method 1800 proceeds to step 1806.

In step 1806, the controller derives the second transfer function for the victim head based on the values stored over the multiple iterations of step 1804. In some embodiments, the transfer function is determined as the ratio of the spectrum of the victim measured position to the spectrum of the added disturbance. Method 1800 then proceeds to step 1807 and terminates.

While the foregoing is directed to embodiments of the present invention, other and further embodiments of the invention may be devised without departing from the basic scope thereof, and the scope thereof is determined by the claims that follow.

I claim:

1. A computer-implemented method of controlling magnetic head position in a disk drive that includes a first head for accessing a first recording surface and a second head for accessing a second recording surface, the method comprising:
   determining first and second control signals that each cause a first actuator to position the first head relative to the first recording surface, wherein the first control signal is based on a first position signal generated by the first head passing over a first servo wedge disposed on the first recording surface and the second control signal is based on a second position signal generated by the first head passing over a second servo wedge disposed on the first recording surface;
   determining a feedforward value that modifies a third control signal that is determined based on a third position signal, wherein the third position signal is generated by the second head passing over a third servo wedge disposed on the second recording surface and the third control signal causes a second actuator that is coupled to the second head to position the second head relative to the second recording surface;
   determining that the third position signal is generated by the second head passing over the third servo wedge; and
   modifying the third control signal with the feedforward value in response to the second head passing over the third servo wedge,
   wherein the feedforward value is generated based on the first and second control signals.

2. The computer-implemented method of claim 1, wherein the feedforward value is generated further based on a timing offset between the first head and the second head.

3. The computer-implemented method of claim 2, wherein the timing offset is less than a time interval separating a first time when the first head passes over the first servo wedge and a second time when the first head passes over the second servo wedge.

4. The computer-implemented method of claim 2, further comprising generating the feedforward value by interpolating between a first value associated with the first control signal and a second value associated with the second control signal, wherein the interpolating is based on the timing offset.

5. The computer-implemented method of claim 1, wherein determining the feedforward value comprises:
   determining an interpolated control signal value that is interpolated between a first value associated with the first control signal and a second value associated with the second control signal; and
   determining the feedforward value based on the interpolated control signal.

6. The computer-implemented method of claim 5, further comprising:
   determining that a current timing offset value between the first head and the second head has changed from a previous timing offset value between the first head and the second head; and
   that at least a portion of the current timing offset value is caused by a timing shift associated with the first head.

7. The computer-implemented method of claim 5, wherein determining the feedforward value based on the interpolated control signal comprises generating the feedforward signal based on a first transfer function that models the feedforward signal as a function of the interpolated control signal.

8. The computer-implemented method of claim 1, wherein determining the feedforward value comprises:
   determining a first feedforward value based on the first control signal and a second feedforward value based on the second control signal; and
   determining the feedforward value based on the first feedforward value and the second feedforward value.

9. The computer-implemented method of claim 8, wherein determining the feedforward value based on the first feedforward value based and the second feedforward value comprises interpolating between the first feedforward value and the second feedforward value.

10. The computer-implemented method of claim 8, further comprising:
   determining that a current timing offset value between the first head and the second head has changed from a previous timing offset value between the first head and the second head; and
   that at least a portion of the current timing offset value is caused by a timing shift associated with the second head.

11. The computer-implemented method of claim 8, wherein:
   determining the first feedforward value based on the first control signal comprises generating the first feedforward signal based on a transfer function that models a feedforward signal as a function of a control signal associated with the first head passing over a servo wedge disposed on the first recording surface; and
   determining the second feedforward value based on the second control signal comprises generating the second feedforward signal based on the transfer function.

12. The computer-implemented method of claim 1, further comprising, after modifying the third control signal with the feedforward value, applying the third control signal to the second actuator.

13. The computer-implemented method of claim 12, wherein applying the third control signal to the second actuator comprises applying the second control signal to the second actuator before the second head passes over a fourth servo wedge that is disposed on the second recording surface and is circumferentially adjacent to the third servo wedge.

14. The computer-implemented method of claim 1, wherein the second actuator is configured to radially position the second head and not the first head.

15. The computer-implemented method of claim 1, wherein the first actuator includes a voice coil motor that is configured to radially position the first head and not the second head.

16. A disk drive, comprising:
   a first head for accessing a first recording surface of the disk drive and a second head for accessing a second recording surface of the disk drive; and
   a controller configured to perform the steps of:
      determining first and second control signals that each cause a first actuator to position the first head relative to the first recording surface, wherein the first control signal is based on a first position signal generated by the first head passing over a first servo wedge disposed on the first recording surface and the second control signal is based on a second position signal generated by the first head passing over a second servo wedge disposed on the first recording surface;
      determining a feedforward value that modifies a third control signal that is determined based on a third position signal, wherein the third position signal is generated by the second head passing over a third servo wedge disposed on the second recording surface and the third control signal causes a second actuator that is coupled to the second head to position the second head relative to the second recording surface;
      determining that the third position signal is generated by the second head passing over the third servo wedge; and
      modifying the third control signal with the feedforward value in response to the second head passing over the third servo wedge,
      wherein the feedforward value is generated based on the first and second control signals.

17. The disk drive of claim 16, wherein the feedforward value is generated further based on a timing offset between the first head and the second head.

18. The disk drive of claim 17, wherein the timing offset is less than a time interval separating a first time when the first head passes over the first servo wedge and a second time when the first head passes over the second servo wedge.

19. The disk drive of claim 17, the steps further comprising generating the feedforward value by interpolating between a first value associated with the first control signal and a second value associated with the second control signal, wherein the interpolating is based on the timing offset.

20. The disk drive of claim 16, wherein determining the feedforward value comprises:
   determining an interpolated control signal value that is interpolated between a first value associated with the first control signal and a second value associated with the second control signal; and
   determining the feedforward value based on the interpolated control signal.

* * * * *